United States Patent
Kozuka et al.

(10) Patent No.: US 11,914,750 B2
(45) Date of Patent: Feb. 27, 2024

(54) INFORMATION MANAGEMENT DEVICE AND INFORMATION MANAGEMENT METHOD

(71) Applicant: Panasonic Intellectual Property Management Co., Ltd., Osaka (JP)

(72) Inventors: Masayuki Kozuka, Osaka (JP); Kohsuke Yamamoto, Osaka (JP); Tomoki Ogawa, Osaka (JP); Masaya Yamamoto, Kyoto (JP); Junya Suzuki, Kyoto (JP); Hiroki Urabe, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 280 days.

(21) Appl. No.: 17/613,739

(22) PCT Filed: Nov. 8, 2019

(86) PCT No.: PCT/JP2019/043853
§ 371 (c)(1),
(2) Date: Nov. 23, 2021

(87) PCT Pub. No.: WO2020/240888
PCT Pub. Date: Dec. 3, 2020

(65) Prior Publication Data
US 2022/0237321 A1    Jul. 28, 2022

Related U.S. Application Data

(60) Provisional application No. 62/865,076, filed on Jun. 21, 2019, provisional application No. 62/855,359, filed on May 31, 2019.

(51) Int. Cl.
*G06Q 30/0201* (2023.01)
*G06F 21/62* (2013.01)
(Continued)

(52) U.S. Cl.
CPC ........ *G06F 21/6245* (2013.01); *G06F 21/602* (2013.01); *G06Q 30/0201* (2013.01); *H04L 12/2816* (2013.01)

(58) Field of Classification Search
None
See application file for complete search history.

(56) References Cited

U.S. PATENT DOCUMENTS

2018/0255160 A1* 9/2018 Dooley .............. G06Q 30/0201

FOREIGN PATENT DOCUMENTS

JP         6566278 B1      8/2019

OTHER PUBLICATIONS

International Search Report and Written Opinion dated Feb. 10, 2020 in International Patent Application No. PCT/JP2019/043853; with partial English translation.

* cited by examiner

*Primary Examiner* — Cai Y Chen
(74) *Attorney, Agent, or Firm* — Rimon P.C.

(57) ABSTRACT

An information management device includes: an obtainer that obtains first company information and personal information from a first company, the first company information relating to a first product or service of the first company, the personal information relating to a user who has purchased the first product or who has been provided with the service; a company information storage that stores the first company information obtained; a personal information storage that stores the personal information obtained; an integrator that integrates the company information and the personal information based on a purchase record or a use record to generate integrated information, the purchase record indicating that the user has purchased the first product, the use record indicating that the user has used the service; and a manager that manages an output of the integrated informa- (Continued)

tion based on restriction information for restricting an output destination of the integrated information.

12 Claims, 48 Drawing Sheets

(51) Int. Cl.
*G06F 21/60* (2013.01)
*H04L 12/28* (2006.01)

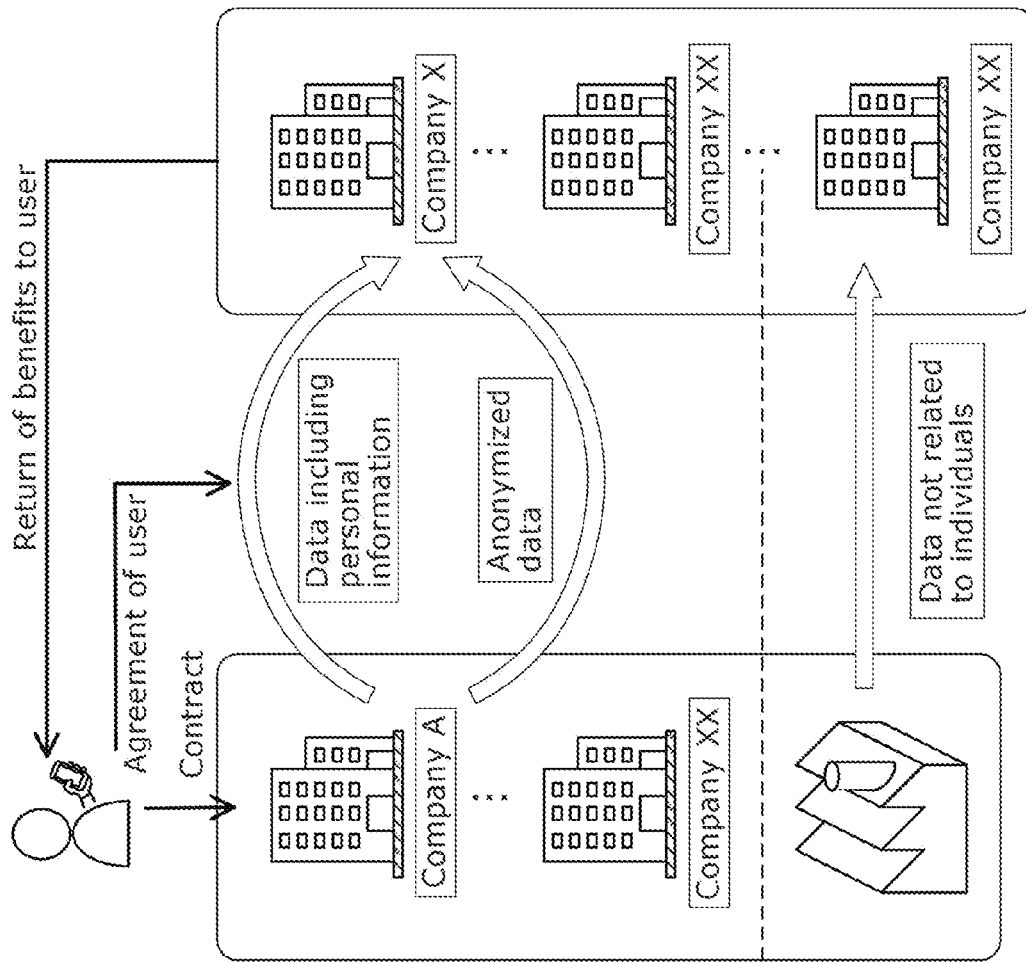
FIG. 1
Prior Art
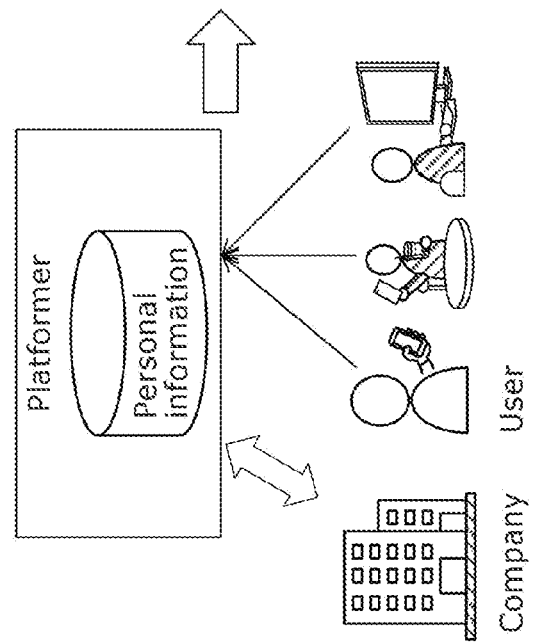

FIG. 11

| | | | Major EC company | Supermarket/ convenience store | Online supermarket | Co-op | Small store |
|---|---|---|---|---|---|---|---|
| Digital coordination | For consumers | API coordination | \multicolumn{5}{c}{Mechanism for achieving this API coordination} | | | | |
| | | Publish on own website | Purchase history is checkable on website | ✕ | Purchase history is checkable on website | Purchase history is checkable on website | ✕ |
| | For companies | POS with individual identification | Individual is identifiable at time of EC sale | ✕ | Purchase history is checkable on website | Purchase history is checkable on website | △ |
| | | POS (sales management) | ✓ | ✓ | ✓ | ✓ | △ |
| | | RF tag | | | | | |
| | | BC, QR etc. via smartphone | | | | | |
| | | IoT home appliance | | | | | |
| Real coordination | | None | | | | | |

FIG. 16

| Distributor ID | Customer ID | Store ID | Product code | Product name | Unit price | Number | Price | Category | Purchase date | Authorization flag |
|---|---|---|---|---|---|---|---|---|---|---|
| AON | 123 xxx | XXX | 49xxxxxxxx1x | Product A | 300 | 1 | 300 | Vegetable | 20xx/xx/xx | ✓ x ✓ xx |
| AON | 123 xxx | YYY | 49xxxxxxxx2x | Product B | 950 | 1 | 950 | Clothing | 20xx/xx/xx | ✓ x ✓ xx |
| AON | 123 xxx | YYY | 49xxxxxxxx3x | Product C | 250 | 2 | 500 | Beverage | 20xx/xx/xx | ✓ x ✓ ✓ x |
| COP | ABC xxx | ZZZ | 49xxxxxxxx4x | Product D | 450 | 2 | 900 | Fish | 20xx/xx/xx | ✓ ✓ ✓ ✓ x |
| COP | ABC xxx | ZZZ | 49xxxxxxxx5x | Product E | 1050 | 2 | 2100 | Meat | 20xx/xx/xx | ✓ x ✓ ✓ x |

FIG. 17

| Distributor ID | Customer ID | Store ID | Product code | Product name | Unit price | Number | Price | Category | Purchase date |
|---|---|---|---|---|---|---|---|---|---|
| AON | 123xxx | XXX | 49xxxxxxxx1x | Product A | 300 | 1 | 300 | Vegetable | 20xx/xx/xx |
| AON | 123xxx | YYY | 49xxxxxxxx3x | Product C | 250 | 2 | 500 | Beverage | 20xx/xx/xx |
| COP | ABCxxx | ZZZ | 49xxxxxxxx4x | Product D | 450 | 2 | 900 | Fish | 20xx/xx/xx |
| COP | ABCxxx | ZZZ | 49xxxxxxxx5x | Product E | 1050 | 2 | 2100 | Meat | 20xx/xx/xx |

FIG. 19

| Distributor ID | Customer ID | Store ID | Product code | Product name | Unit price | Number | Price | Category | Purchase date |
|---|---|---|---|---|---|---|---|---|---|
| COP | ABCxxx | ZZZ | 49xxxxxxxx4x | Product D | 450 | 2 | 900 | Fish | 20xx/xx/xx |

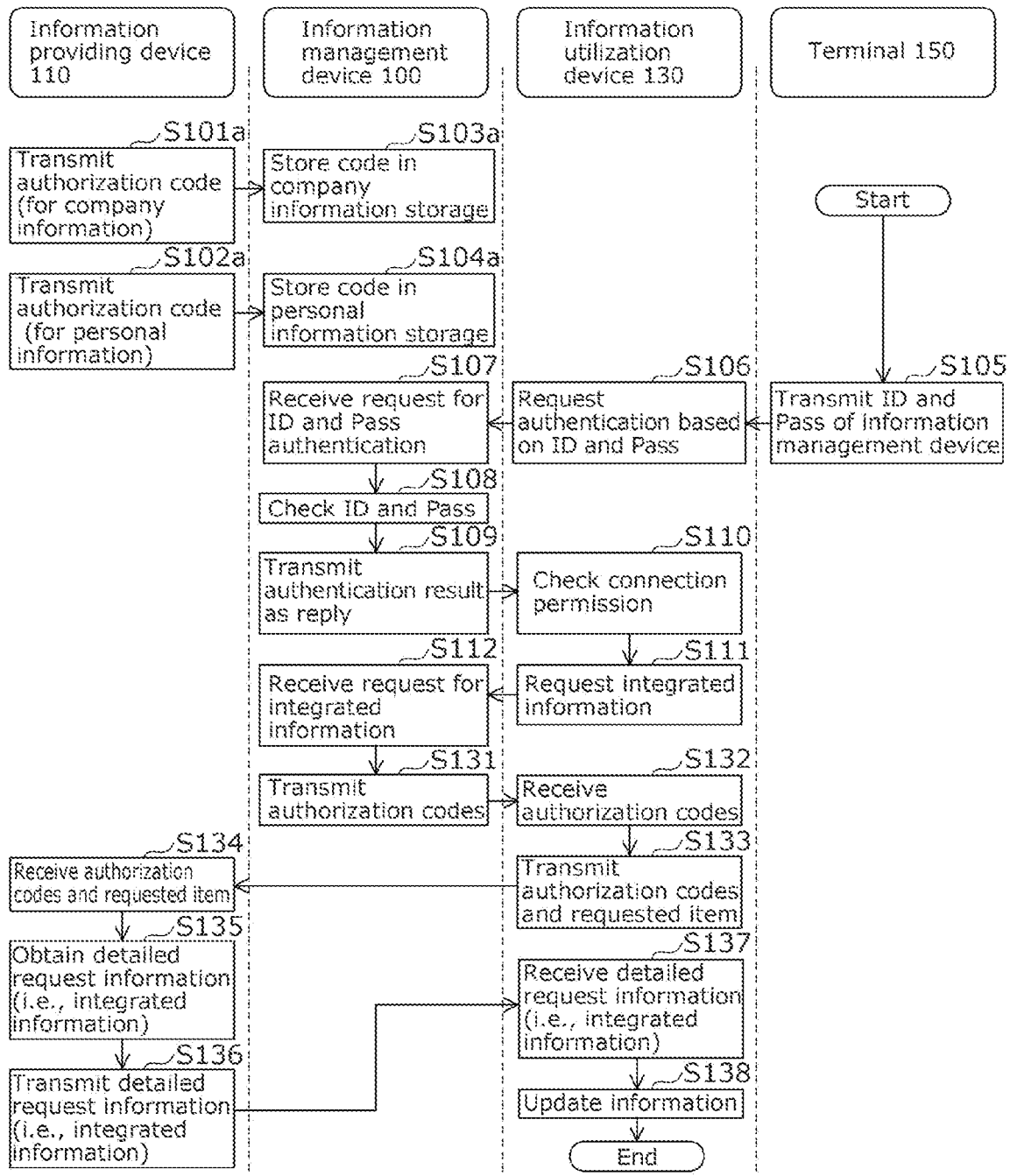

FIG. 25

| Distributor name | Store name | Product name | Price | Date | Expense item |
|---|---|---|---|---|---|
| WEL | Store S | Sugar cone | 278 | 2018/05/04 | Food expense |
| WEL | Store S | Fizzing candies | 400 | 2018/05/04 | Food expense |

FIG. 26

| Distributor name | Store name | Visit time |
|---|---|---|
| WEL | Store S | 2018/05/04 15:05 |
| SJIS | Store I | 2018/05/04 18:13 |

| Company name | Industry code | Public key |
|---|---|---|
| Company A | 0x0001 (Processed food manufacturer) | 0x123456789... |
| Company B | 0x0001 (Processed food manufacturer) | 0xabcdefabcdef... |
| Company C | 0x0002 (Fishery) | 0x987654321... |
| ⋮ | | |

INFORMATION MANAGEMENT DEVICE AND INFORMATION MANAGEMENT METHOD

CROSS-REFERENCE OF RELATED APPLICATIONS

This application is the U.S. National Phase under 35 U.S.C. § 371 of International Patent Application No. PCT/JP2019/043853, filed on Nov. 8, 2019, which in turn claims the benefit of U.S. Provisional Application No. 62/855,359, filed on May 31, 2019 and U.S. Provisional Application No. 62/865,076, filed on Jun. 21, 2019, the entire disclosures of which Applications are incorporated by reference herein.

TECHNICAL FIELD

The present disclosure relates to an information management device and an information management method.

BACKGROUND ART

Patent Literature (PTL) 1 discloses a personal data management system that manages personal information.

CITATION LIST

Patent Literature

[PTL 1] Japanese Patent No. 6566278

SUMMARY OF INVENTION

Technical Problem

However, the technique according to PTL 1 fails to sufficiently utilize company information as well as the personal information.

To address the problem, the present disclosure provides an information management device, for example, that allows sufficient utilization of company information as well as personal information.

Solution to Problem

An information management device according to an aspect of the present disclosure includes: an obtainer that obtains first company information and personal information from a first company, the first company information relating to a first product or service of the first company, the personal information relating to a user who has purchased the first product or who has been provided with the service; a company information storage that stores the first company information obtained; a personal information storage that stores the personal information obtained;

an integrator that integrates the first company information and the personal information, based on a purchase record or a use record to generate integrated information, the purchase record indicating that the user has purchased the first product, the use record indicating that the user has used the service; and a manager that manages an output of the integrated information based on restriction information for restricting an output destination of the integrated information.

The general and specific aspect may be implemented using a method, a system, an integrated circuit, a computer program, or a computer-readable recording medium such as a CD-ROM, or any combination of methods, systems, integrated circuits, computer programs, or recording media.

Advantageous Effect of Invention

The information management system according to the present disclosure allows sufficient utilization of company information as well as personal information.

BRIEF DESCRIPTION OF DRAWINGS

FIG. 1 illustrates the background of the present disclosure.

FIG. 11 is a table showing the relationship of a digital coordination in an ecosystem.

FIG. 16 is a table showing an example configuration of integrated information.

FIG. 17 is a table showing an example configuration of consumer product information extracted by information utilization device 130 of company P.

FIG. 19 is a table showing an example configuration of consumer product information extracted by information utilization device 140 of company C.

FIG. 22 is a table showing example authorization codes.

FIG. 23 is a sequence diagram showing an example operation of information management system 1 according to Embodiment 5.

FIG. 25 is a table showing an example configuration of the company information and personal information held in information providing device 190 of an application development company.

FIG. 26 is a table showing an example configuration of related information as of purchase.

DESCRIPTION OF EMBODIMENTS

Figure 2:
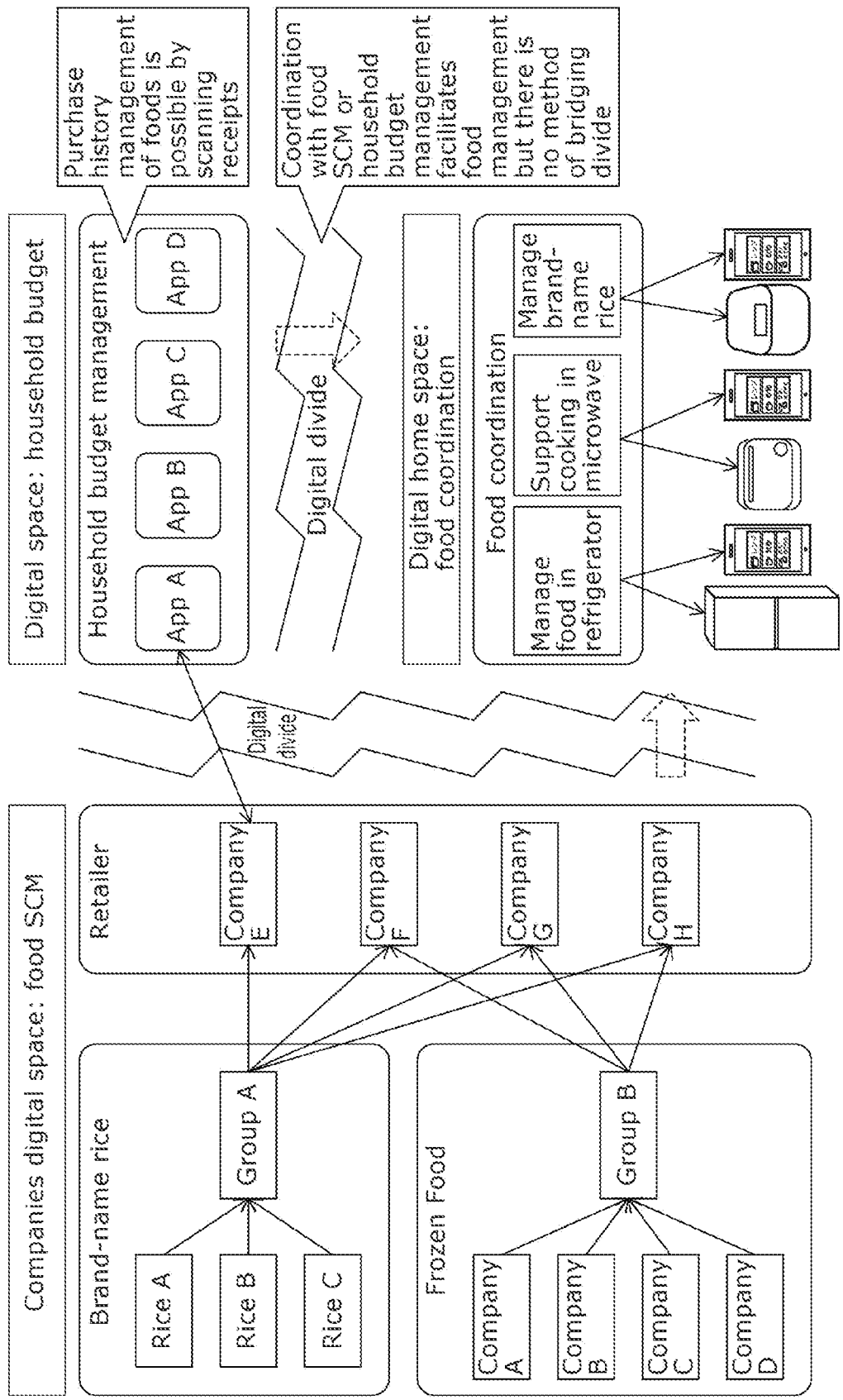
FIG. 2 shows example digital data management forms at companies and at a user.

An information management device according to an aspect of the present disclosure includes: an obtainer that obtains first company information and personal information from a first company, the first company information relating to a first product or service of the first company, the personal information relating to a user who has purchased the first product or who has been provided with the service; a company information storage that stores the first company information obtained; a personal information storage that stores the personal information obtained;

an integrator that integrates the first company information and the personal information, based on a purchase record or a use record to generate integrated information, the purchase record indicating that the user has purchased the first product, the use record indicating that the user has used the service; and a manager that manages an output of the integrated information based on restriction information for restricting an output destination of the integrated information.

This configuration restricts the output destination of the integrated information obtained by integrating the personal information and the company information based on the restriction information. A company safely provides the company information. The company information can thus be sufficiently utilized as well as the personal information. In this manner, the personal information and the company information are integrated to be managed. There is thus no need for an individual user or a company that wishes to utilize the personal information and the company information to obtain information from various information management devices. Instead, the individual user or the company efficiently obtains desired information from the information management device. Accordingly, the individual user or the company collects the information at a lower processing load on a terminal, resulting in a lower power consumption of the terminal.

The information management device may further include: a determiner that determines whether the personal information includes information on a company attribute. The manager may output, based on the restriction information, the personal information determined to include the company attribute by the determiner.

This configuration determines whether the personal information includes the information corresponding to the company information. Out of the personal information including the information corresponding to the company information, the access to the part corresponding to the company information can thus be restricted based on the restriction information. Accordingly, the company information owned by the company can be protected so that the company safely provides the company information.

When outputting the integrated information, the manager may further output identification information indicating that the integrated information includes the personal information.

This configuration informs the user of the fact that the integrated information includes the personal information, and encourages the user to appropriately manage the integrated information.

The obtainer may further obtain, from the first company, an authorization code to be used for directly obtaining information including the first company information from the first company. The manager may further output, to an information processing device of the user, the authorization code obtained.

The obtainer may further obtain, from a second company, record information on the purchase record or the use record. The integrator further integrates the record information obtained, with the first company information and the personal information, to generate the integrated information.

This configuration allows generation of highly reliable integrated information.

The restriction information may include a flag indicating whether an output to a third company is permitted. When the flag indicates that the output to the third company is not permitted, the manager may prohibit the output of the integrated information to the third company.

The company information storage may store the first company information encrypted using a public key generated by the information processing device. The personal information storage may store the personal information encrypted using the public key. The manager may manage the output of the integrated information including the first company information encrypted and the personal information encrypted.

This configuration allows secure passing of the integrated information.

The first company information may include purchase information indicating that the user has purchased the first product. The obtainer may further obtain setting information from a company that manufactured or sold the first product. The setting information indicates a most suitable setting when the first product according to the purchase information is used in a home appliance of the user. The manager may output, to the information processing device, the setting information obtained.

This configuration allows a home appliance of a user to operate at a most suitable setting based on the setting information easily obtained by the user. There is thus no need for the user to find a most suitable setting on the terminal, thereby reducing the processing load on the terminal. As a result, the power consumption of the terminal decreases.

The first product may include a processed food which is heated up to be finished. The home appliance may be a microwave oven. The setting information may include an output level and a cooking time that are most suitable for heating up the processed food in the microwave oven.

With this configuration, a user allows the microwave oven to easily heat up the purchased processed food at a most suitable setting without checking most suitable setting information for heating up the purchased processed food in the microwave oven.

The first product may include a perishable product. The home appliance may be a refrigerator. The setting information may include a temperature most suitable for keeping the perishable product frozen or refrigerated in the refrigerator.

With this configuration, a user allows the refrigerator to easily store the purchased perishable food at a most suitable setting without checking most suitable setting information for keeping the purchased perishable product frozen or refrigerated in the refrigerator.

The first company information may include subscription information indicating that the user subscribes to the first product from the first company. The obtainer may obtain purchase information indicating that the user has purchased a second product from a fourth company. If the first product and the second product are of a same type, the manager may reduce an amount of the first product under subscription or increase an interval of the subscription to change the subscription information, and output, to the first company, the subscription information changed.

This configuration changes the amount of the subscription product, the product itself, or the subscription interval in accordance with the purchase record at a physical store, for example.

These general and specific aspects may be implemented using a method, a system, an integrated circuit, a computer program, or a computer-readable recording medium such as a CD-ROM, or any combination of methods, systems, integrated circuits, computer programs, or recording media.

Now, the embodiments will be described in detail with reference to the drawings as appropriate. However, unnecessarily detailed description may be omitted. For example, detailed description of already well-known matters or duplicated description of substantially the same configurations may be omitted. This is to avoid unnecessarily redundant description and for easier understanding of those skilled in the art.

The inventors provide the appended figures and the following description to make those skilled in the art sufficiently understand the present disclosure and not to limit the subject matters recited in the claims.

The background of the present invention and an objective of the present invention will now be described in detail first, and then the embodiments will be described.

BACKGROUND OF INVENTION

FIG. 1 illustrates the background of the present disclosure.

As shown in the left of FIG. 1, some giant platformers collect massive various personal information from a lot of people. Most companies have to be subordinate to the giant platformers in terms of data.

Pointed out here is the importance of building the mechanism providing service for improving the customer convenience, by establishing the economic bloc of fairly distributing the digital data owned by companies. Under the mechanism, not the relationship in which some giant platformers exclusively own digital data and the other companies are subordinate to the platformers, but a fair relationship among the group of companies participating in the digital data distribution bloc is necessary. For example, as shown in the right of FIG. 1, assume that a user purchases a product from a company or provided with service under the contract with the group of companies, for example. Each company accumulates the information including the obtained product purchase record or service use record of the user. The accumulated information includes personal information. The company that owns the accumulated information provides data including the personal information to the other companies with the agreement of the user. Accordingly, the companies provide the user with the service for improving the user convenience. For example, the data including the personal information includes the movement history, activity history, purchase history, and attribute information on the user, and the data obtained from a device of the user. Each company may provide the other companies with anonymized data obtained by processing the accumulated information not to identify individuals. Each company may provide the other companies with the company information not related to the individuals. For example, the company information includes the data detected by an IoT device at a production site or sensing data from an IoT device placed in a building.

In Japan, there have been moves to establish a data distribution bloc not dominated by giant platformers by forming the following mechanism that derives from the British MiData. Individuals store their own personal information, particularly focusing on privacy protection, in a personal data store (PDS). The individuals deposit the data to a data depositary agent such as the Personal Data Trust Bank after designating how to utilize data, and earns a part of the benefits obtained by the operation, in the form of convenience.

There are two types of PDSs, a decentralized type and a centralized type. In a decentralized PDS, individuals store their own personal information. In a centralized PDS, individuals entrust the storage of their own personal information to a trader. Both are the systems excellent in terms of the personal information protection and the utilization, but lack an incentive for companies to provide personal data.

It may be difficult for individuals to utilize their own data in a PDS. The mechanism operated by a broker such as the Personal Data Trust Bank or a data exchange market may be used for utilizing the data within a PDS. Based on the PDSs, both are the systems excellent in terms of the personal information protection and the utilization, but lack an incentive for companies to provide personal data.

Companies promote business digitalization to ride the tide of digital transformation. For the purpose, the companies accumulate digital data as trade secret information of the companies. Required in the distribution business is the supply chain management (SCM) connecting the upstream and downstream ends via digital data. In the field of food distribution, further advanced traceability is required. In view of food safety, digital data for more advanced traceability is managed under the hazard analysis critical control point (HACCP) plan, for example.

However, the digital data accumulated in each company is the trade secret of the company and not personal information. In the example of the food distribution shown in FIG. 2, the digital coordination through the SCM is established on the upstream side. This example allows the following to improve the customer convenience and customer retention. The management of the purchase histories of rewards card customers is partially possible at point of sale (POS) terminals. Association between personal information and SCM information is also technically possible. FIG. 2 shows example digital data management forms at companies and at a user.

For example, assume that electronic commerce (EC) or a PoS system and a membership system serve as a bridge between a data group associated with individuals and the ecosystem of post-sales digital data (e.g., household budget management or food coordination management at home in this example) in the form of digital data. Advanced digital data utilization may be then possible. In the present circumstances, however, there is no approach connecting both but a digital divide exists therebetween.

Figure 3A:
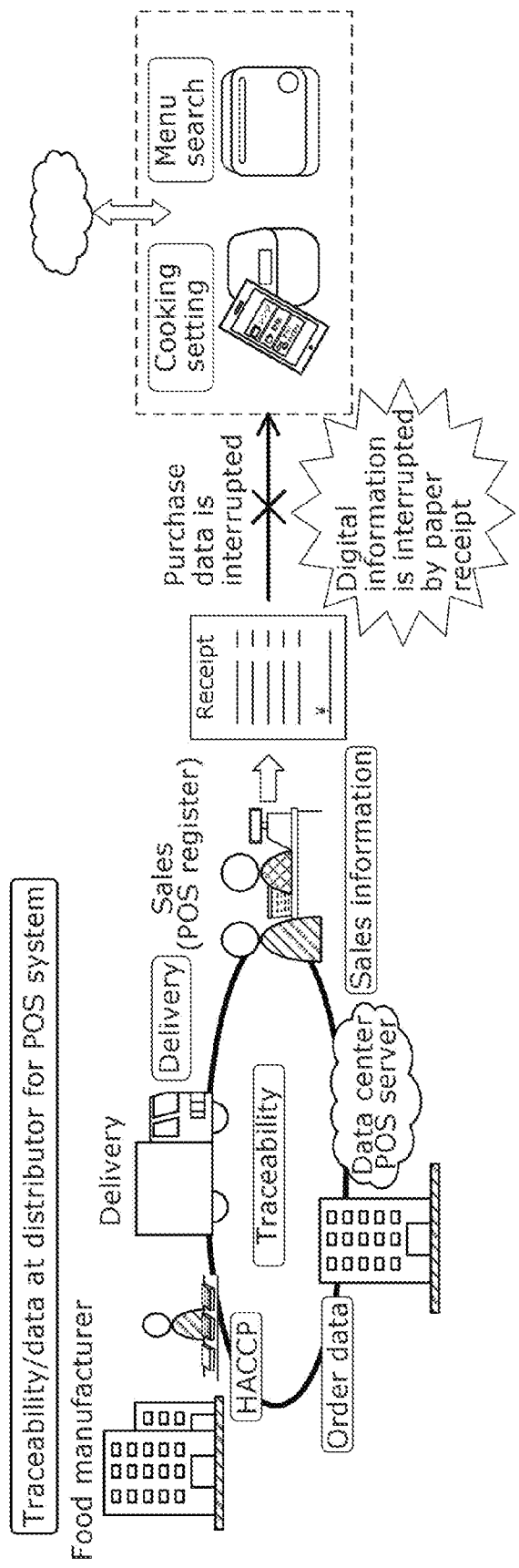
FIG. 3A shows an outline of digital management of data on product distribution at a distributor.
Figure 3B:
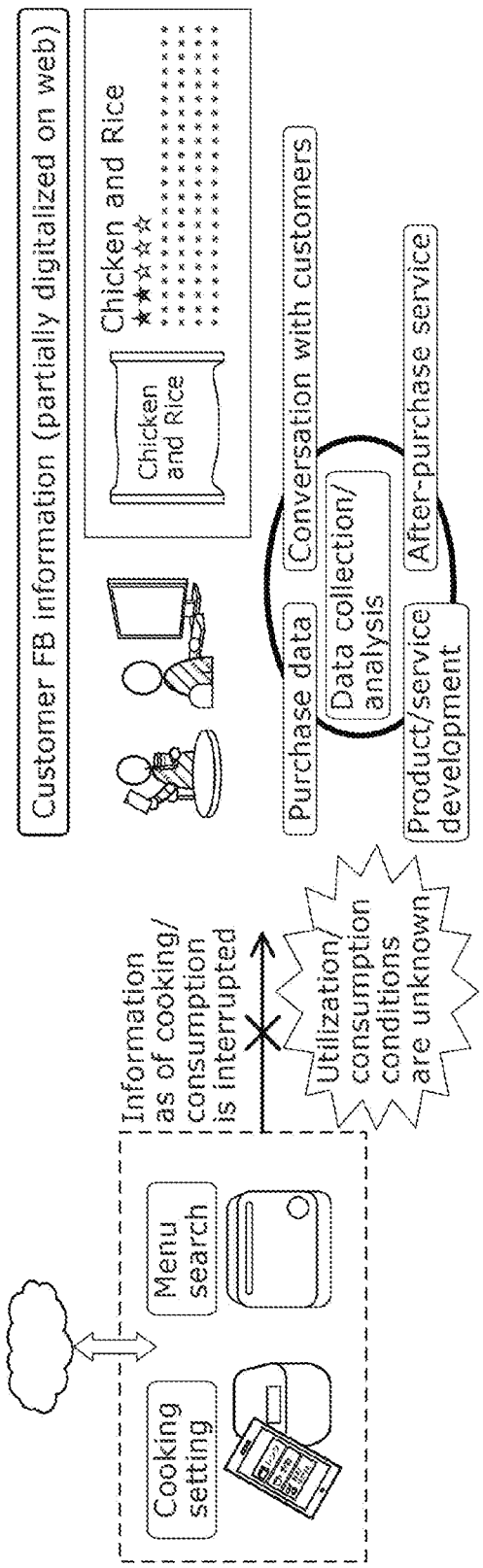
FIG. 3B shows an outline of digital management of data on purchased product at a consumer.

FIG. 3A shows an outline of digital management of data on product distribution at a distributor. FIG. 3B shows an outline of digital management of data on a purchased product at a consumer.

A home appliance for food mainly used in a kitchen is connected to a network or service with a smartphone through touch communication (near field communication) to facilitate menu search or cooking settings. This improves the convenience of the function of the home appliance.

Across the food industry, as shown in FIG. 3A, the "digital management" of the data on food distribution proceeds at a distributor because the traceability in the hygiene management technique, such as the HACCP plan, is obligated. On the other hand, as shown in FIG. 3B, digitalization proceeds, although partially, at a consumer. For example, customer feedback or customer information at the time of consumption (i.e., point of use (POU)) is transferred to a company.

As seen from the distributor, after the sale of a product (i.e., the POS), the purchase data is not transferred to the customer, which interrupts the digital management of the purchase data. In the present circumstances, the service, such as food service or food management, in coordination with a home appliance is not provided.

Figure 4:
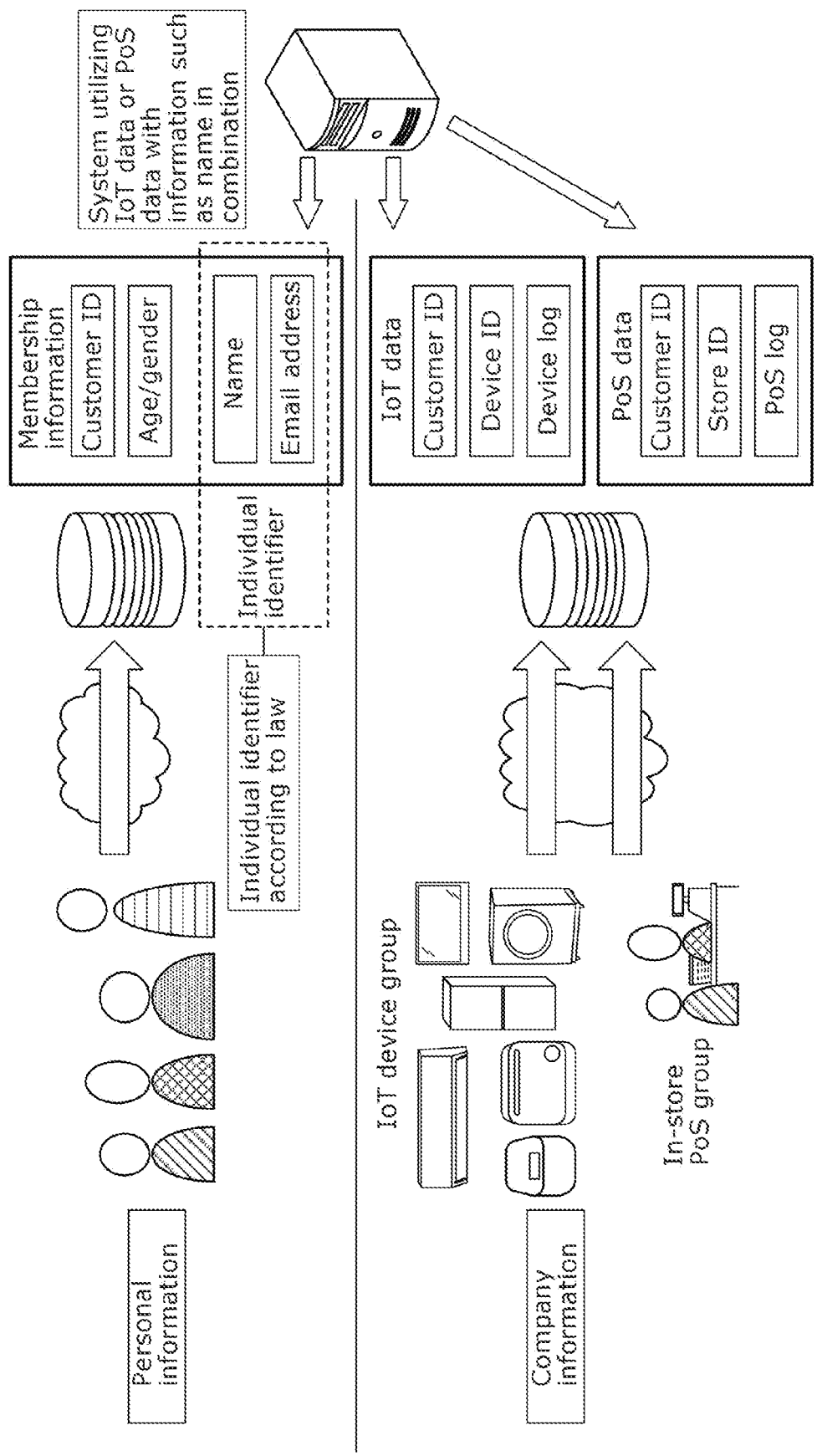
FIG. 4 illustrates a relationship between in-house data management and personal information protection.

FIG. 4 illustrates a relationship between in-house data management and personal information protection.

The data managed within a company includes two types of information, personal information and company information.

The personal information is the data associated with an individual, for example, member data, membership rewards, and purchase history. The personal information may be the data associated with an individual identifier for identifying an individual. For example, the individual identifier may be an individual identifier according to law or may be the name, or an email address, for example. In Europe, a company which owns personal information is obliged to provide the personal information to an individual, when requested by the individual under the general data protection regulation (GDPR).

The company information is the trade secret information of a company, and includes SCM data, PoS data, product data, and IoT data, for example. The company information is also referred to as "non-personal information". The PoS data includes the customer ID of the customer who has purchased a product, the store ID of the store which has sold the product, and a PoS log. The IoT data includes the customer ID of the customer who owns an IoT device, the device ID of the IoT device, and the device log of the IoT device including sensing data obtained by various sensors or operation history. There is no need for each company to disclose the company information. The company information is thus managed separately from customer relationship management (CRM) information that is the personal information.

While some companies, such as EC site operators, providing all purchase history information exist exceptionally, other companies manage personal information and company information separately. Since no company information is provided, even if an individual requests personal information from the company, useful company information is unutilized.

As shown in FIG. 4, assume that an information device is managed with two types of in-house data, personal information and company information are accessed in combination. There is an obligation to manage the personal information including the company information. In this case, the company information needs to be handled as the personal information.

A company is obliged to provide an individual when requested by the individual under the GDPR in Europe. Accordingly, the company may manage the personal information and the company information not to be accessible in combination but separately, using the information device.

Such restrictions may be found in a trust/management institution, such as the Personal Data Trust Bank, for personal information. That is, when company information is provided in association with personal information to a trust institution of digital information, the associated company information is handled as the personal information. There is thus a risk that the entrusted company information depends on the individual intention of the owner of the personal information regardless of the intention of the company that has provided the data. Accordingly, the company may not provide the company information in association with the personal information to the outside.

Figure 5:
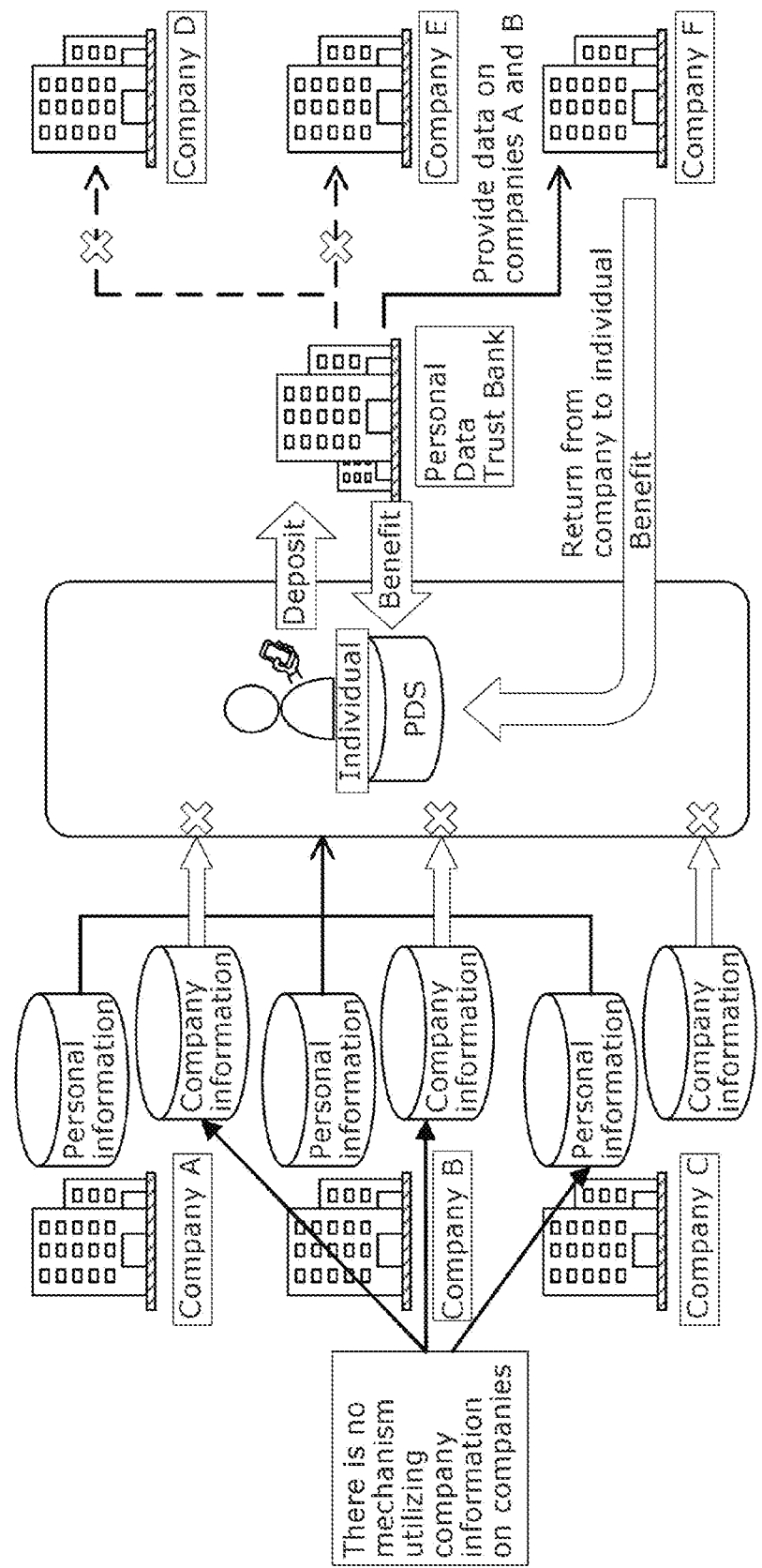
FIG. 5 illustrates a problem of the Personal Data Trust Bank.

FIG. 5 illustrates a problem of the Personal Data Trust Bank.

As shown in FIG. 5, the Personal Data Trust Bank is assumed to keep the personal information collected from companies, as a system called a "PDS". There is no mechanism of protecting and utilizing company information. If a company provides personal information and company information in combination to an individual, and the individual stores the information in a PDS, the information including the company information is managed as the personal information, and the company information is not protected from a viewpoint of the company. In view of data utilization, there has been a fear that only the least data is utilized, although more advanced digital information utilization may be possible by managing the personal information and the company information in combination.

Figure 6:
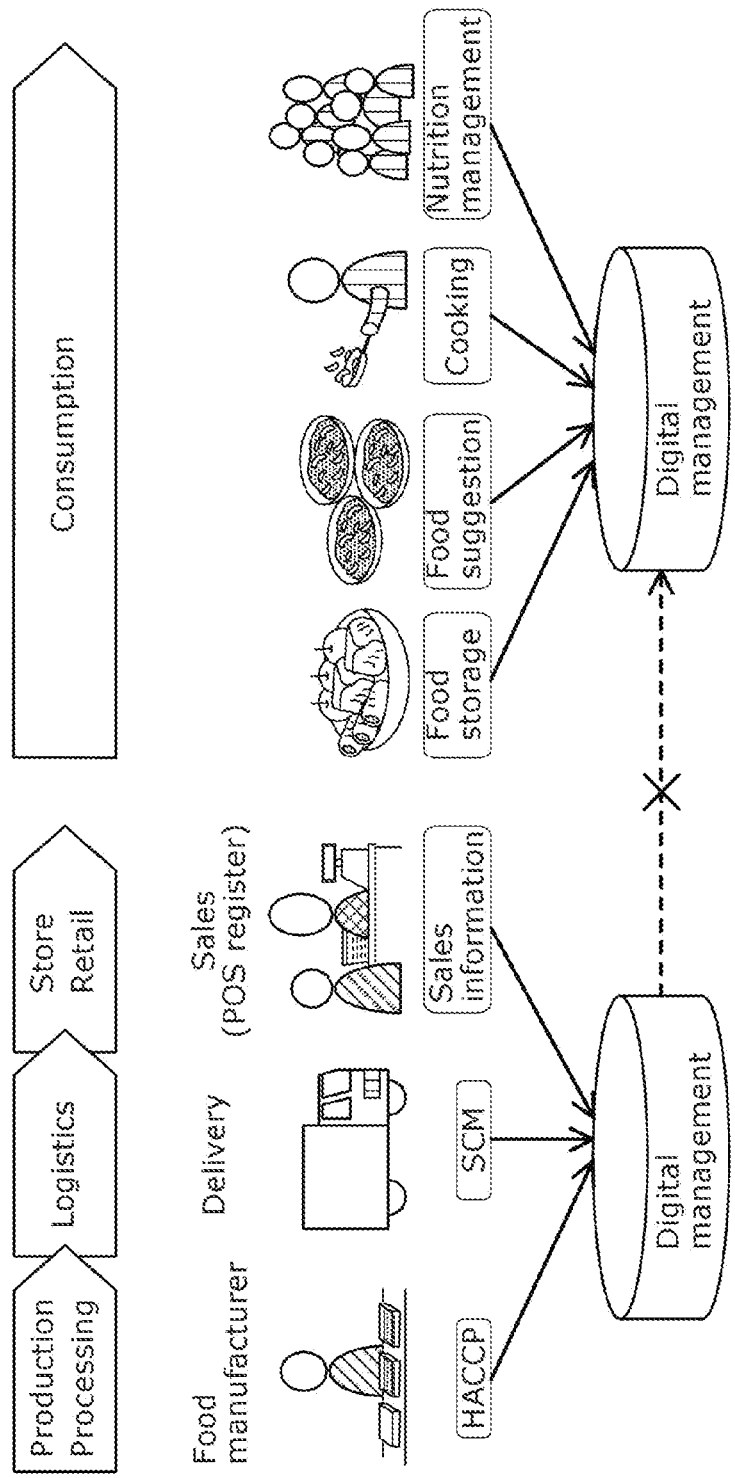
FIG. 6 illustrates problems of digital management between a distributor and a consumer.

FIG. 6 illustrates problems of digital management between a distributor and a consumer.

As shown in FIG. 6, in view of a value chain for food, digital data for traceability under the SCM in logistics and under the HACCP in food distribution is managed. Here, a POS system or associated membership information is used as a bridge between a data group associated with individuals and the ecosystem of post-sales digital data in the form of digital data. Advanced digital data utilization may be then possible. Examples of the ecosystem of post-sales digital data include food management, food suggestion, cooking, or nutrition management. In the present circumstances, however, the digital management at the distributor and the digital management at the consumer remain divided.

In particular, in view of the digital transformation of home appliance business, food coordination in the field of the consumption may be used most frequently. In this manner, in view of providing new valuable business/service, utilization of upstream digital management information is necessary.

In order to actively utilize data, data is stored in a data utilization institution/organization such as the Personal Data Trust Bank. In this case, in addition to the personal information protection using the PDS, introduction of a proper means for protecting company information is conceivable to share the data that is worth sharing, out of the company information stored in a company. Accordingly, more advanced data utilization can be promoted. In addition, company data is appropriately protected and appropriately utilized so that the company safely provides the data to the data utilization institution/organization.

A company obtains digital data such as the purchase information associated with an individual with the agreement of the individual, utilizing the data utilization institution/organization such as the Personal Data Trust Bank. Accordingly, the company utilizes, as post-sales digital data, the digital data on the individual purchase.

As a result, the society is achieved in which companies and individuals are promoted to fairly provide data and mutually utilize the provided data, without being subordinate to any giant platformer.

Here, the Personal Data Trust Bank will be described. The Personal Data Trust Bank has the following mechanism. The bank manages data on individuals utilizing a system such as a PDS under the contract with the individuals for data utilization. In place of the individuals, the bank determines the adequacy of providing information in accordance with instructions of the individuals or under predetermined conditions, and provides the data on the individuals to a third party (another company) in accordance with the determination result. This mechanism allows the utilization of the personal information in each company but fails to allow sharing and utilization of the company information stored in the company and worth sharing, because there is no mechanism that allows the company to safely deposit the data.

There is also a mechanism called "information trust business" like the Personal Data Trust Bank. In this mechanism, the deposited and utilized data is not personal information but store data. In general, an information trust bank centrally manages personal information in place of the owner and provides the information to a third party under the contract with the personal information provider. However, the information trust business is targeted not at personal information but at the store data mainly centering on small and mid-sized individual's store. That is, the information trust business is a mechanism handling company information but neither handles personal information nor combines company information and personal information for advanced data utilization.

There is a mechanism called "electronic receipts" indicating purchase history data on a customer. Before the employment of electronic receipts, purchase history data was generated in formats different from company to company and efficient utilization was difficult. On the other hand, the shopping receipts issued by stores are digitalized under the standard specifications, that is, in a common format into electronic receipts, and accumulated in an information terminal of an individual. Accordingly, the individual integrally manages electronic receipts issued by various stores. The electronic receipts are used in coordination with various applications or service with the agreement of the individual under a standard API.

However, since the specifications of electronic receipts not easily changeable but fixed, there is no room for freely utilizing data. Using electronic receipts, it is difficult to add or obtain the new information necessary for data utilization.

Barcodes include, as in-house product codes for a retail company, private codes called "in-store marking" for freely setting/managing perishable products. These codes are freely set and managed at individual supermarkets, and thus no useful information is obtained from receipts. In order to obtain information, coordination among companies and sharing of individually allotted codes are necessary.

For electronic receipts, a POS system according to the electronic receipt format needs to be introduced, but the integrated platform (PF) for electronic receipts is not yet ready. There are various POS systems on the market already. It is thus difficult for companies to actively introduce a POS system according to the electronic receipt format without any clear benefit. It may also be difficult for users to actively use the system because there are few benefits such as rewards. A mechanism for more flexible data utilization is required.

There is a data management mechanism using a cloud-based data management foundation that immediately collects and analyzes massive various data to achieve the coordination with an external system. The data management foundation is a data platform for changing data to business values. This data management allows integration of the customer data (e.g., access history/browsing/search on a website) managed by a company and the data managed by another company in a database. With the use of this database, various strategies (e.g., advertisement distribution, various types of marketing, or analysis) can be made.

In this data management, for example, the ID issued by the data management foundation is added to various data (e.g., a web browser, a mobile App, CRM data, IoT device data) managed by a company and collected real time data is transmitted to the data management foundation. In this data management, a second or third party's DMP not owned by the company is associated with an ID and transmitted to the data management foundation.

In this data management, data coordination is established between companies that introduce the data management foundation for real time marketing or recommendations, for example. In this manner, there is a need to make a contract between the companies to handle external data. The data to be disclosed needs to be determined between the companies.

In this manner, the data management mechanism described above provides the platform service targeted only at a company without the intention or agreement of a user. This basically differs from the idea of the Personal Data Trust Bank that the user data belongs to the users.

Embodiment 1

Figure 7:
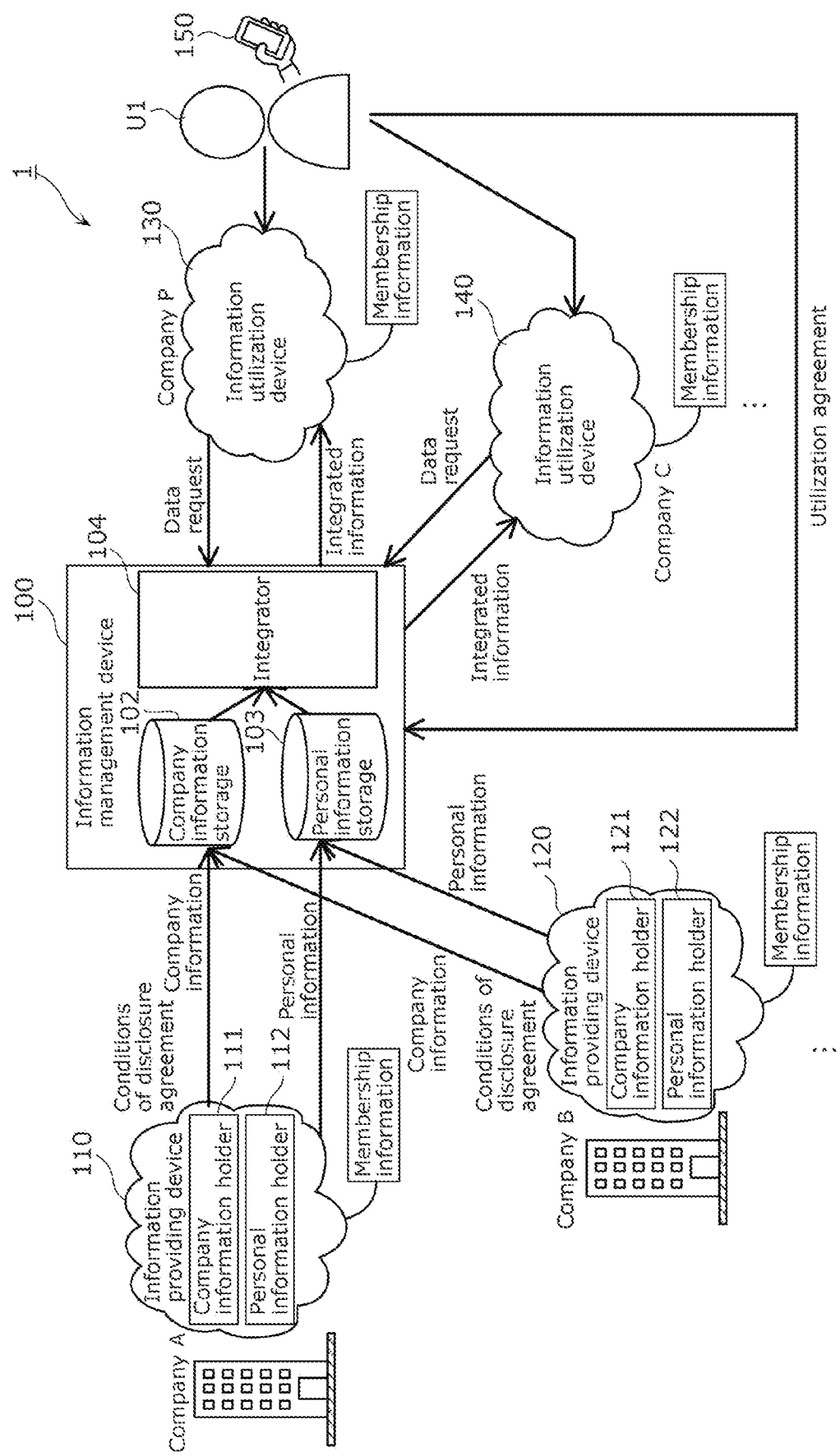
FIG. 7 shows an example of information management system 1 according to Embodiment 1.

FIG. 7 shows an example of information management system 1 according to Embodiment 1.

In addition to the mechanism, such as the Personal Data Trust Bank, that keeps digital data and manages personal information using a PDS, the following mechanism may be introduced. A corporate data store (CDS) manages, out of company information, the data which may be valuable if deposited to a data utilization institution and utilized. Accordingly, a company safely deposits, to the data utilization institution, the company information suitable for utilization. The company dynamically, appropriately, and temporarily combines the data stored in the PDS and the CDS of the data utilization institution to provide the combined data to a data user who is a third party. Accordingly, more advanced data utilization of personal information and company information is achieved.

As shown in FIG. 7, information management system 1 includes information management device 100, information providing devices 110 and 120, and information utilization devices 130 and 140.

FIG. 7 shows that information management device 100 includes company information storage 102, personal information storage 103, and integrator 104. Information management device 100 is located in a digital data utilization institution. A detailed configuration of information management device 100 will be described later with reference to FIG. 8.

Information providing device 110 includes company information holder 111 and personal information holder 112. Company information holder 111 holds the company information obtained by company A. Personal information holder 112 holds the personal information obtained by company A.

Like information providing device 110, information providing device 120 includes company information holder 121 and personal information holder 122. Company information holder 111 holds the company information obtained by company B. Personal information holder 112 holds the personal information obtained by company B.

Specific examples of the company information and the personal information will be described later.

Information utilization device 130 exchanges information with terminal 150 of user U1 to transmit a data request for integrated information from information management device 100. Accordingly, information utilization device 130 obtains the integrated information from information management device 100. Information utilization device 130 is owned by company P that provides service for which user U1 is registered as a member, for example.

Information utilization device 140 exchanges information with terminal 150 of user U1 to transmit a data request for integrated information from information management device 100. Accordingly, information utilization device 140 obtains the integrated information from information management device 100. Information utilization device 140 is owned by company C that provides service for which user U1 is registered as a member, for example.

Each of information management device 100, information providing devices 110 and 120, and information utilization devices 130 and 140 is a computer, for example. Information management device 100, information providing devices 110 and 120, and information utilization devices 130 and 140 may serve as a single computer or a plurality of computers. In addition, information management device 100, information providing devices 110 and 120, and information utilization devices 130 and 140 are communicatively connected to each other via a network. The network may be the general-purpose Internet or an exclusive communication line.

Figure 8:
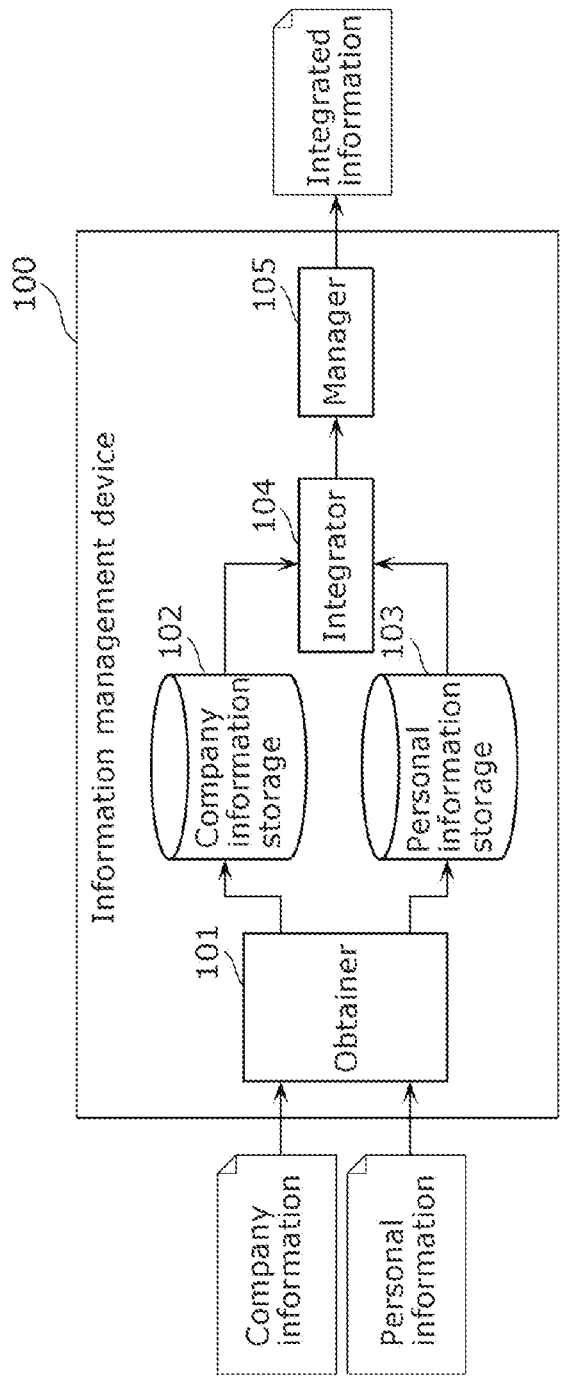
FIG. 8 is a block diagram showing an example configuration of an information management device according to Embodiment 1.

FIG. 8 is a block diagram showing an example configuration of the information management device according to Embodiment 1.

Information management device 100 includes obtainer 101, company information storage 102, personal information storage 103, integrator 104, and manager 105.

Obtainer 101 obtains company information and personal information from a company. The company information relates to the products or service of the company. The personal information relates to the users who have purchased the products or who has been provided with the service. The company information is held in, for example, company information holder 111 of information providing device 110 of company A or company information holder 121 of information providing device 120 of company B.

Company information storage 102 stores the obtained company information. Company information storage 102 is a CDS. Company information storage 102 is a storage device such as a hard disk drive (HDD) or a solid-state drive (SSD).

Personal information storage 103 stores the obtained personal information. Personal information storage 103 is a PDS. Personal information storage 103 is a storage device such as a hard disk drive (HDD) or a solid-state drive (SSD).

Integrator 104 integrates the company information and the personal information based on the purchase record indicating that a user has purchased a product or the use record indicating that a user is provided with service to generate integrated information. Specifically, integrator 104 integrates the company information on company A and the personal information on user U1 based on the purchase record indicating that user U1 has purchased a product of company A to generate integrated information. Alternatively, integrator 104 may integrate the company information on company B and the personal information on user U1 based on the use record indicating that user U1 is provided with service by company B to generate integrated information.

Manager 105 manages the output of the integrated information based on restriction information for restricting the output destinations of the integrated information. Specifically, the restriction information is in the form of a blacklist that prohibits the output of the company information on a certain company to the listed companies. The restriction information in this case includes, for example, the information indicating the prohibition of the output of the company information on company A to company C that is a competitor of company A. In this case, manager 105 outputs the company information on the certain company to the companies not listed on the blacklist.

Alternatively, the restriction information may be in the form of a whitelist that allows the output of the company information on a certain company to the listed companies. The restriction information in this case includes, for example, the information indicating the permission of the output of the company information on company A to company P. In this case, manager 105 does not output the company information on the certain company to the companies not listed on the whitelist.

The restriction information includes an authorization code indicating whether a company is authorized to obtain information. An authorized company is the information provided company whose access to company information is permitted by the information providing company.

Note that information management device 100 obtains the agreement of the users in advance to utilize the personal information on users.

Figure 9:
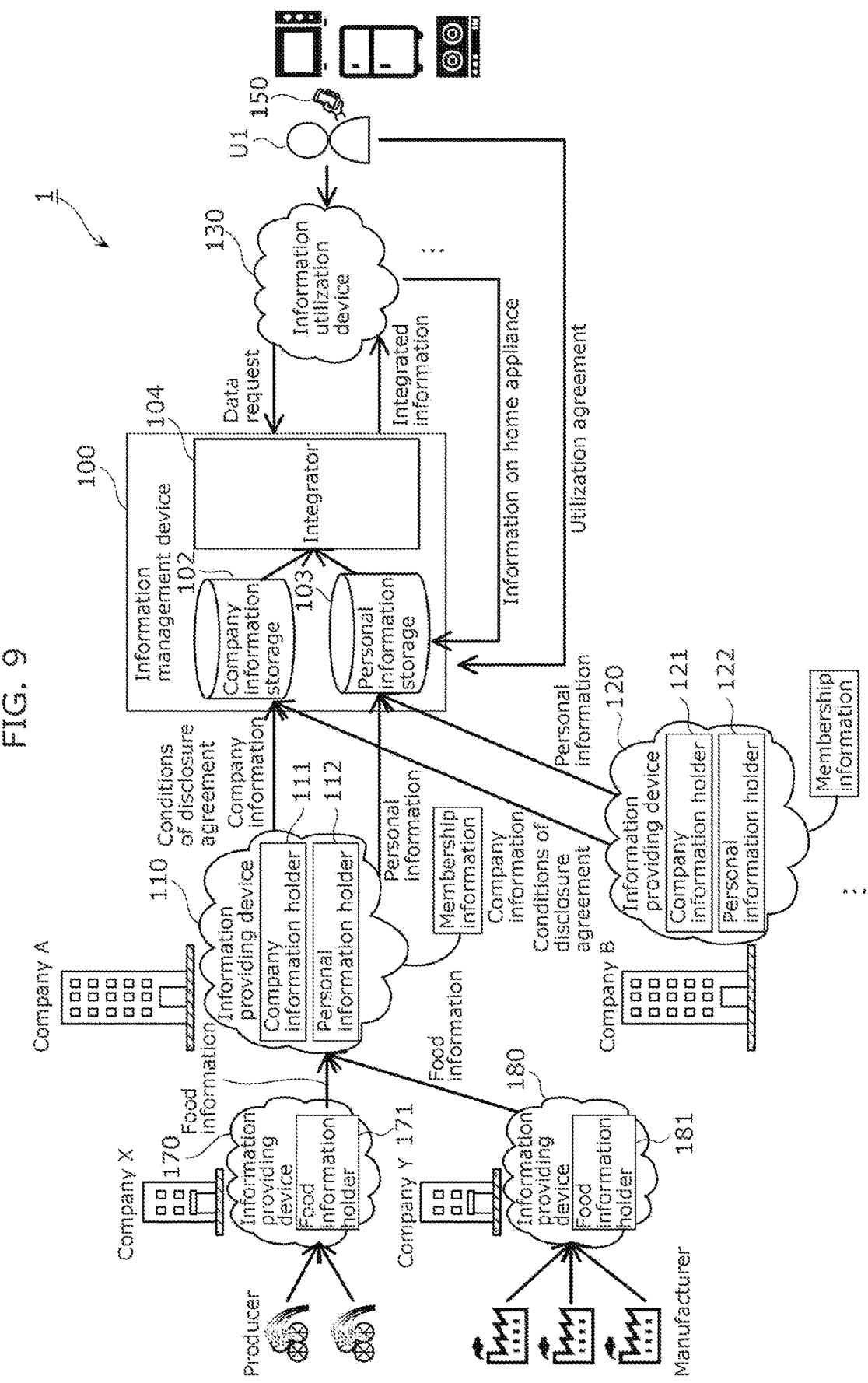
FIG. 9 shows another example of information management system 1 according to Embodiment 1.

FIG. 9 shows another example of information management system 1 according to Embodiment 1.

The example shown in FIG. 9 further includes information providing devices 170 and 180.

Information providing device 170 includes food information holder 171. Food information holder 171 holds food information that is the information on the foods sold by company X. The foods sold by company X have been produced by a producer. For example, the foods may be agricultural products or fishery products produced in the primary industry.

Information providing device 180 includes food information holder 181. Food information holder 181 holds food information on the foods sold by company Y. The foods sold by company Y are processed foods, such as frozen foods or lunch boxes, produced by a producer.

In the example of FIG. 9, the digital data utilization institution that owns information management device 100 is entrusted with the management of the information on a home appliance of user U1. Thus, information management device 100 obtains the information on the home appliance of user U1 from information utilization device 130 and holds the information. Information management device 100 of the digital data utilization institution obtains the company information on companies. Accordingly, information management device 100 uses the information on the home appliance and the company information in combination to enable more advanced data utilization and service coordination. Note that the information on the home appliance includes, for example, information on the home appliance of user U1 and the information on the settings at the time of utilizing the home appliance.

Now, a specific example of the CDS will be described. The CDS is an example of company information storage 102.

Unlike a PDS that manages personal information, the CDS is assumed to store the following plurality of data with different attributes. The following various data stored in the CDS is an example of company information.

The attributes of the data held in the CDS include static data and dynamic data. The static data does not change in principle after being provided by a company. The dynamic data is dynamically generated and temporarily stored upon request by a third party through information management device 100 of the digital data utilization institution. That is, a plurality of attributes as CDS data (hereinafter referred to as "CDS data attributes") include static attributes and dynamic attributes.

Examples of the static attributes include the ID of a product (i.e., a product ID), the attributes (e.g., the cleaning performance or the size) of the product, and the performance of the product (e.g., operation information on an IoT device: a heating time or how to heat).

The dynamic attributes include: a purchasing transaction ID, a product ID or a traceability ID, and information associated with the best-before date of a product or information such as the best-before date of eggs, milk, or medicines, for example.

The storage period for storing data in a CDS may be the best-before period (e.g., a long term of one to eight years) of a product. The storage period may be a short term or the period until the utilization of the data. For example, the storage period may be the period until the best-before date of a food.

Examples of CDS data attributes will be listed below.

In the example of food distribution (e.g., at a supermarket), examples of the CDS data attributes include the company name, the store name, the address of the store, the contact information on the store, and the store code. The CDS data attributes also include stocking information such as the order/delivery date, the supplier, and the HACCP management ID. The CDS data attributes also include store management information such as the processing date, the processor, the in-store management record, product attributes (e.g., the in-store marking and the barcode), the expiration date, the best-before period, the sales quantity, and the selling price. The CDS data attributes also include the member ID (i.e., internal management information).

In the example of food (e.g., frozen food) manufacturing, examples of the CDS data attributes include the manufacturer, the address of the manufacturer, and the contact information on the manufacturer. The CDS data attributes also include product information such as the product name, the product code, the product attributes (e.g., the in-store marking). The CDS data attributes also include product management information such as the processing/production date, the expiration date, and how to cook.

In the example of a home appliance (e.g., a microwave oven), examples of the CDS data attributes include the manufacturer, the address of the manufacturer, and the contact information on the manufacturer. The CDS data attributes also include product information such as the product name, the product ID, the product attributes (e.g., the size and performance information), and the product performance (e.g., how to operate). The CDS data attributes also include product management information such as the processing/manufacture date and the durable life.

Note that the CDS data attributes include information included in company information.

Now, a specific example of a PDS will be described. The PDS is an example of personal information storage 103.

A PDS is assumed to store, in addition to personal information, a plurality of data added to the personal information by coordination services that manage the information. The following various data stored in the PDS is an example of personal information.

The attributes of the data held in a PDS include personal data on a certain individual, personal data provided to the certain individual by a company, and personal data that is also company information related to the certain individual. Examples of the personal data on a certain individual include personal information such as the name, the address, the age, and the family structure, and information on the use records (e.g., the membership, history, and rewards). Examples of the personal data provided to a certain individual by the company include the purchase history, activity information, and other related information. Example of the personal data that is also the company information related to a certain individual include the operation mode of a home appliance and the operation time and power consumption of each device. In this manner, a plurality of attributes as PDS data (hereinafter referred to as "PDS data attributes") include the three types of personal data described above.

The storage period for storing data in a PDS may be the best-before period (e.g., a long term of one to eight years) of a certain product or service. The storage period may be a short term or the period until the data utilization. For example, the storage period may be the period until the best-before date of a food.

Examples of PDS data attributes will be listed below.

In the example of food distribution (e.g., at the time of purchase at a supermarket), examples of the PDS data attributes include personal information such as membership information or membership rewards (i.e., history). The PDS data attributes also include the purchase history such as the company name, the store name, the purchased product, the number, and the price.

In the example of a home appliance (e.g., the use information on the owned home appliance), the PDS data attributes include personal information such as the membership information, the use history (e.g., settings), and detailed guarantee information. The PDS data attributes also include owned product information such as the product name, the product ID, the manufacturing information, the operation information, the setting information, the use history, the use period, the use time, the power consumption, the location, the repair records, and the fixture records.

In the example of a housing (e.g., information on a housing), the PDS data attributes include personal information such as the address and the telephone number. The PDS data attributes include housing information such as the area, the layout, the age, the information on infrastructure (e.g., water, power, gas, and telephone), and the facility information on each room.

Figure 10:
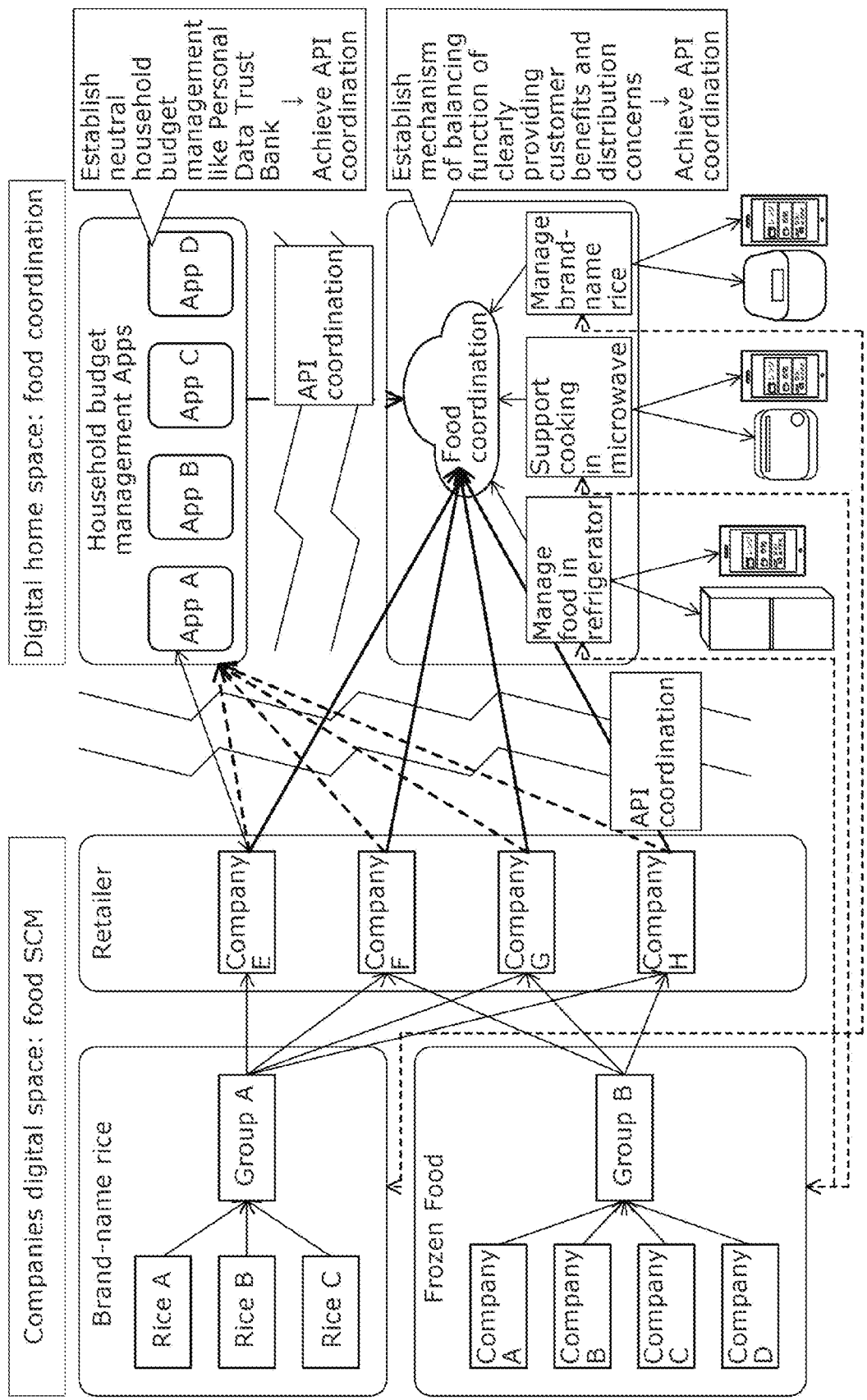
FIG. 10 illustrates a coordination for bridging the digital divide between companies and home.

FIG. 10 illustrates a coordination for bridging the digital divide between companies and home.

FIG. 10 shows an example where an API coordination bridges the digital divide in the example of the food distribution shown in FIG. 2. As shown in FIG. 10, a household budget management application establishes neutral household budget management like the Personal Data Trust Bank. Between a home appliance and the application, food coordination can be established by balancing the function clearly providing customer benefits and concerns of a distributor. In this manner, the digital API coordination beneficial to both the customer and the distributor allows incorporation of the purchase history information into the food coordination.

FIG. 11 is a table showing the relationship of a digital coordination in an ecosystem.

In particular, if personal data such as the purchase history on an EC site is available for a member, for example, the obtainment may be prohibited under data license agreement, on the alert for the data taken out of another program (e.g., a cloud system or an APP on a smartphone) connected via a network by web scraping (e.g., Crawler or a Web spider).

In information management system 1 described above, if a company, as a CDS, deposits company information, there are concerns about disadvantages in business such as transfer of the deposited information to a competitor. In order to dispel such concerns of the company that is the utilizer may be designated and the range of the data to be utilized with the agreement may be determined when depositing the company information. Note that the range of the data may be the data on some specific attributes of the CDS data attributes, for example.

Assume that information management device 100 at an entrusted data utilization institution such as the Personal Data Trust Bank integrates company information and personal information to fairly utilize the company information in each company, and manage the integrated information as the personal information. In this case, information management device 100 may pause, stop, or cancel the utilization of the company information out of the integrated information. That is, in this case, assume that information management device 100 receives an instruction for pausing, stopping, or canceling the provision of the company information from an information providing device of the company that has provided the company information. Information management device 100 may pause, stop, or cancel the provision of the company information on the company as instructed, to the other companies or individuals in accordance with the instruction.

Assume that information management device 100 at an entrusted data utilization institution such as the Personal Data Trust Bank integrates company information and personal information to fairly utilize the company information in each company, and manage the integrated information as the personal information. In this case, information management device 100 may manage the handling of the integrated information so that utilization of the integrated information does not cause the individual privacy problem.

Figure 12:
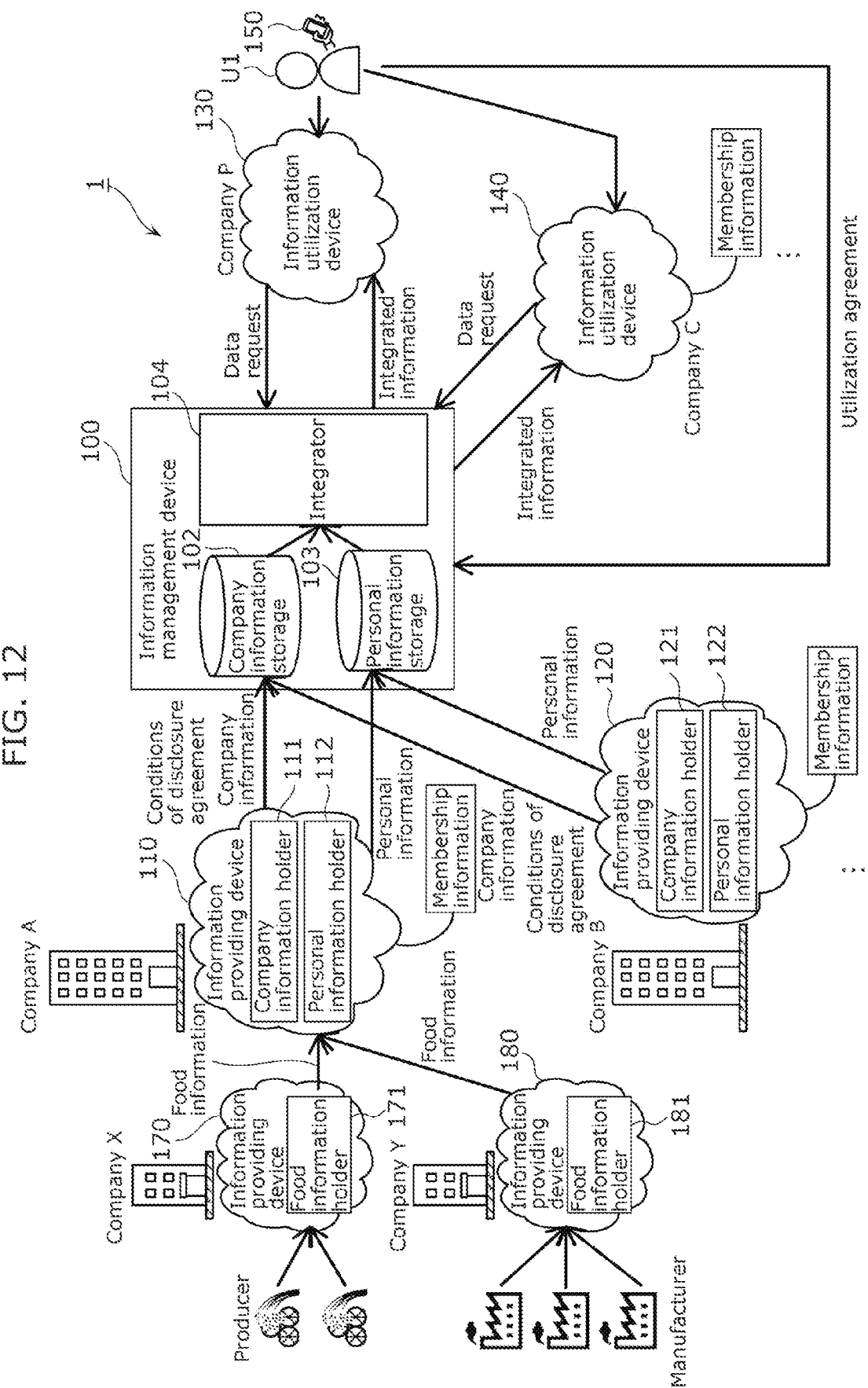
FIG. 12 shows further another example of information management system 1 according to Embodiment 1.

FIG. 12 shows further another example of information management system 1 according to Embodiment 1.

In the example of FIG. 12, information management system 1 in the example of FIG. 7 further includes information providing devices 170 and 180 shown in the example of FIG. 9.

As shown in FIG. 12, for example, company information holder 111 of information providing device 110 of company A accumulates the purchase information, the SCM information, the account information, and the sales information, for example, on company A. Personal information holder 112 stores the payment information and the PoS data, for example, owned by company A and associated with individuals and members.

The personal information held in personal information holder 112 is, as personal information based on certain individuals, deposited to the digital data utilization institution with the agreement of the individuals so as to be transmitted to information management device 100. In information management device 100, the personal information obtained from information providing device 110 is stored in personal information storage 103.

The company information held in company information holder 111 is also deposited to the digital data utilization institution so as to be transmitted to information management device 100. The company information is then stored in company information storage 102 in information management device 100.

Information management device 100 aggregates the company information and personal information owned by a plurality of companies including company A. The data (e.g., the member data, the purchase histories, and the membership rewards) associated with the personal information is stored in personal information storage 103. The company information such as individual data (e.g., product sales data) associated with a product or the information for purchase data utilization is stored in company information storage 102. Information management device 100 holds, together with other information, restriction information indicating the restriction of the information disclosure destinations or the details of the information to be disclosed.

For example, company information holder 111 of company A holds food information in association with product information corresponding to company information. The food information is held in food information holder 171 of information providing device 170 of company X that is a food wholesaler handling perishable products, for example. Note that the food information held in food information holder 171 relates to the foods handled by company X. If polished rice is handled, for example, the food information includes the producers/places of production, and the HACCP information and traceability information on the polished rice.

On the other hand, company information holder 111 also holds another food information in association with another product information corresponding to company information. The food information is held in food information holder 181 of information providing device 180 of company Y that is a food processing company handling frozen foods. Note that the food information held in food information holder 181 relates to the foods handled by company Y. If frozen foods are handled, for example, the food information includes the manufacturing companies, their HACCP information, traceability information, and certain product information.

User U1 who entrusts personal information transmits a data request for the sales information on company A from information management device 100 through information utilization device 130 of company P, using terminal 150. In this case, information management device 100 checks the restriction information for the company information (i.e., the purchase data) on company A stored in company information holder 111. If the restriction information indicates that the information is available for company P, information management device 100 integrates the sales information on company A in company information storage 102 and the personal information on user U1 in personal information storage 103 to generate integrated information, and provides the integrated information to terminal 150 of user U1. For example, information utilization device 130 may be merely software or an application for managing the purchase history of user U1. The company information on company A to be collected and utilized by information utilization device 130 may be utilized only for the convenience for user U1.

Next, user U1 transmits a data request for the sales information on company A from information management device 100 through information utilization device 140 of company C, using terminal 150. In this case, information management device 100 checks the restriction information for the sales information on company C stored in company information storage 102. Assume that the restriction information indicates that the information is not available for company C as a result of the check. The restriction information is for designating an information provided company and setting the range of the data to be utilized with the agreement. For example, in a possible case, company C is a retailer such as a supermarket, whereas company A is a competitive retailer for company C and does not wish to provide information corresponding to trade secret to company C.

In this manner, the mechanism is introduced which allows information providers to restrict information disclosure destinations and the details of the information to be disclosed. This achieves a digital data utilization institution (e.g., the Personal Data Trust Bank) taking the information providers into account. In this manner, the mechanism is established which allows the information providers such as company A and company B to control the information destinations via information management device 100 of the digital data utilization institution. This mechanism allows the information providers to restrict to which extent the information held by the information providers is to be disclosed. In addition, information management system 1 has the mechanism of safely providing information to the other companies or individuals beneficial for the information providers. The mechanism allows the information providers to safely provide the information to information management device 100.

In information management device 100, the personal information and the company information are integrated to be managed. There is thus no need for an individual user or a company that wishes to utilize the personal information and the company information to obtain information from various information management systems. Instead, the individual user or the company efficiently obtains desired information from information management device 100. Accordingly, the individual user or the company collects the information at a lower processing load on the terminal.

Figure 13:
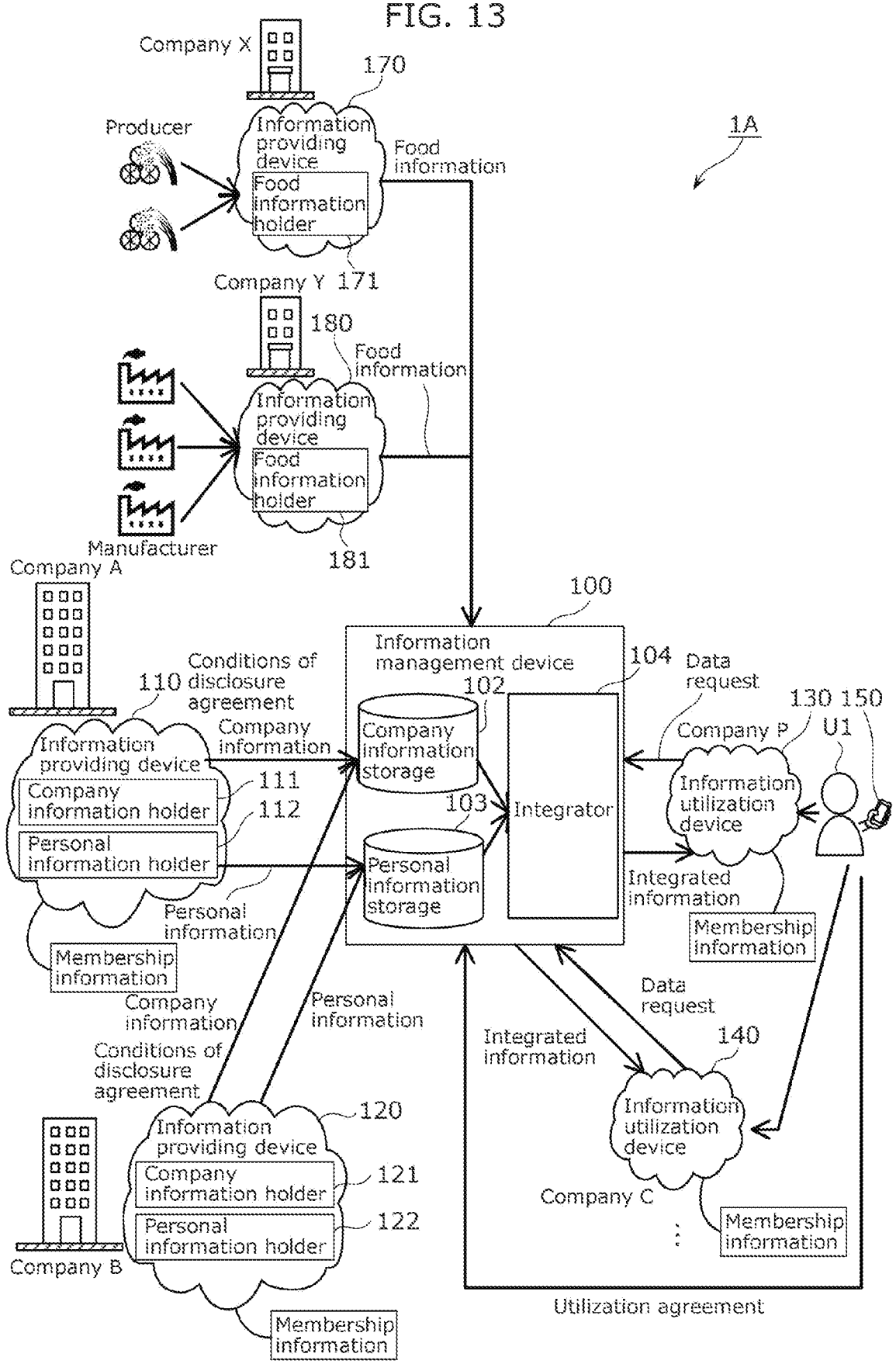
FIG. 13 shows an example of information management system 1A according to a variation of Embodiment 1.

FIG. 13 shows an example of information management system 1A according to a variation of Embodiment 1.

While information management system 1 described above associates the food information on company X that is a food wholesaler handling perishable products and company Y that is a food processing company handling frozen foods, for example, with the company information on company A. The configuration is not limited thereto. For example, like information management system 1A shown in FIG. 13, the management of the food information held in information providing device 170 of company X and information providing device 180 of company Y may be directly entrusted to a digital data utilization institution. In this case, information management device 100 directly obtains the food information from each of information providing devices 170 and 180. Similarly, producers or manufacturing companies may directly entrust the management of the information to the digital data utilization institution and directly transmit the information to information management device 100.

Figure 14:
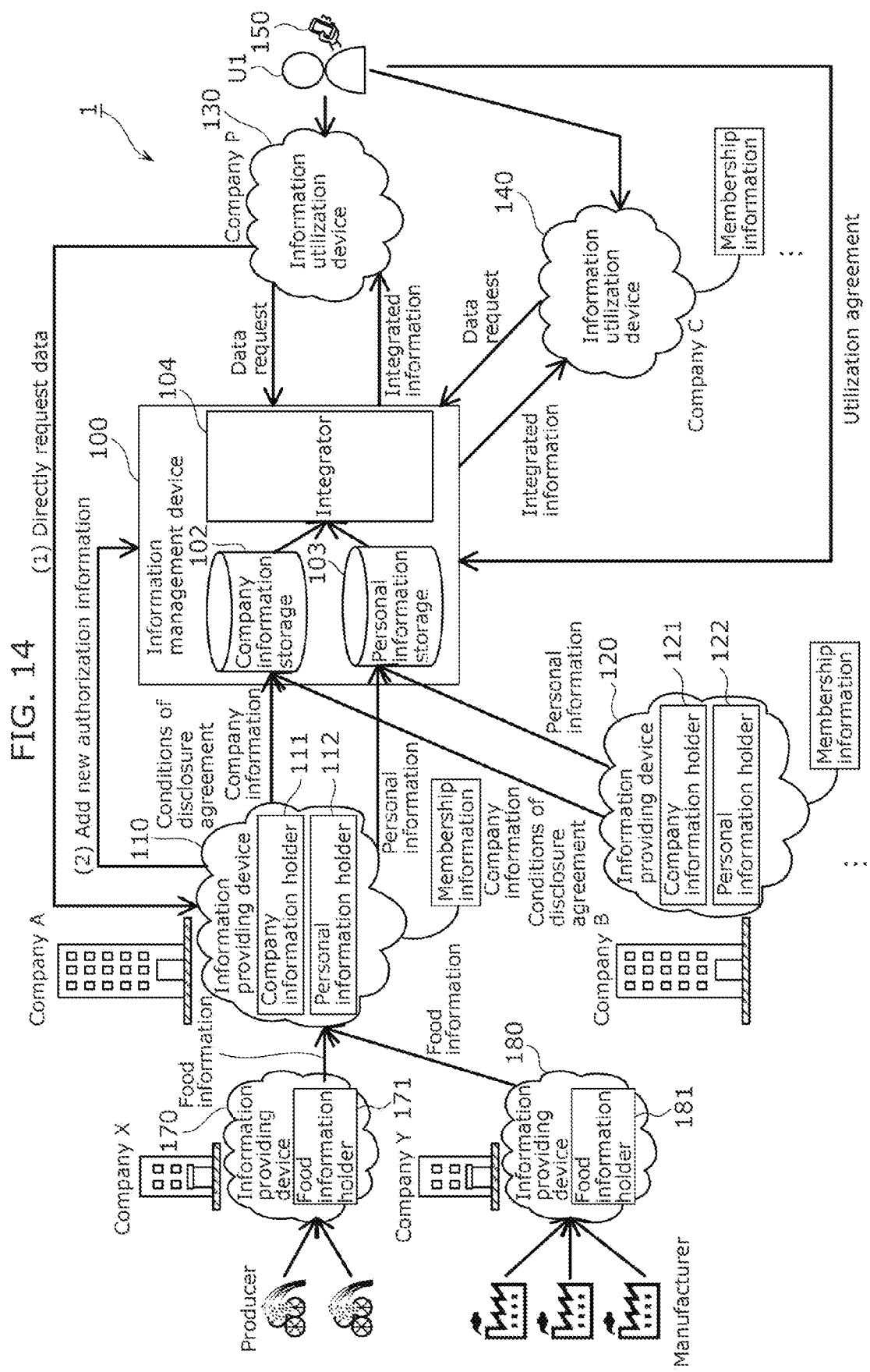
FIG. 14 shows yet another example of information management system 1 according to Embodiment 1.

FIG. 14 shows yet another example of information management system 1 according to Embodiment 1.

In the example of FIG. 12, the restriction information on the information disclosure destinations and the details of the information to be disclosed are registered in information management device 100. In this case, however, the company (a data utilizing company) which owns information utilization device 130 is not registered as an information destination and no access to the information is permitted. The information may thus not be provided from information management device 100.

In this case, as indicated by (1) in FIG. 14, information utilization device 130 may directly request data from information providing device 110 of company A. As indicated by (2) in FIG. 14, information providing device 110 of company A may provide new authorization information to information management device 100. Addition of such the mechanism allows information utilization device 130 of a company to obtain the integrated information including the company information on company A from information management device 100 even if the company is not registered in information management device 100 and no access to the information is permitted. As a result, the integrated information is utilized well.

Embodiment 2

Figure 15:
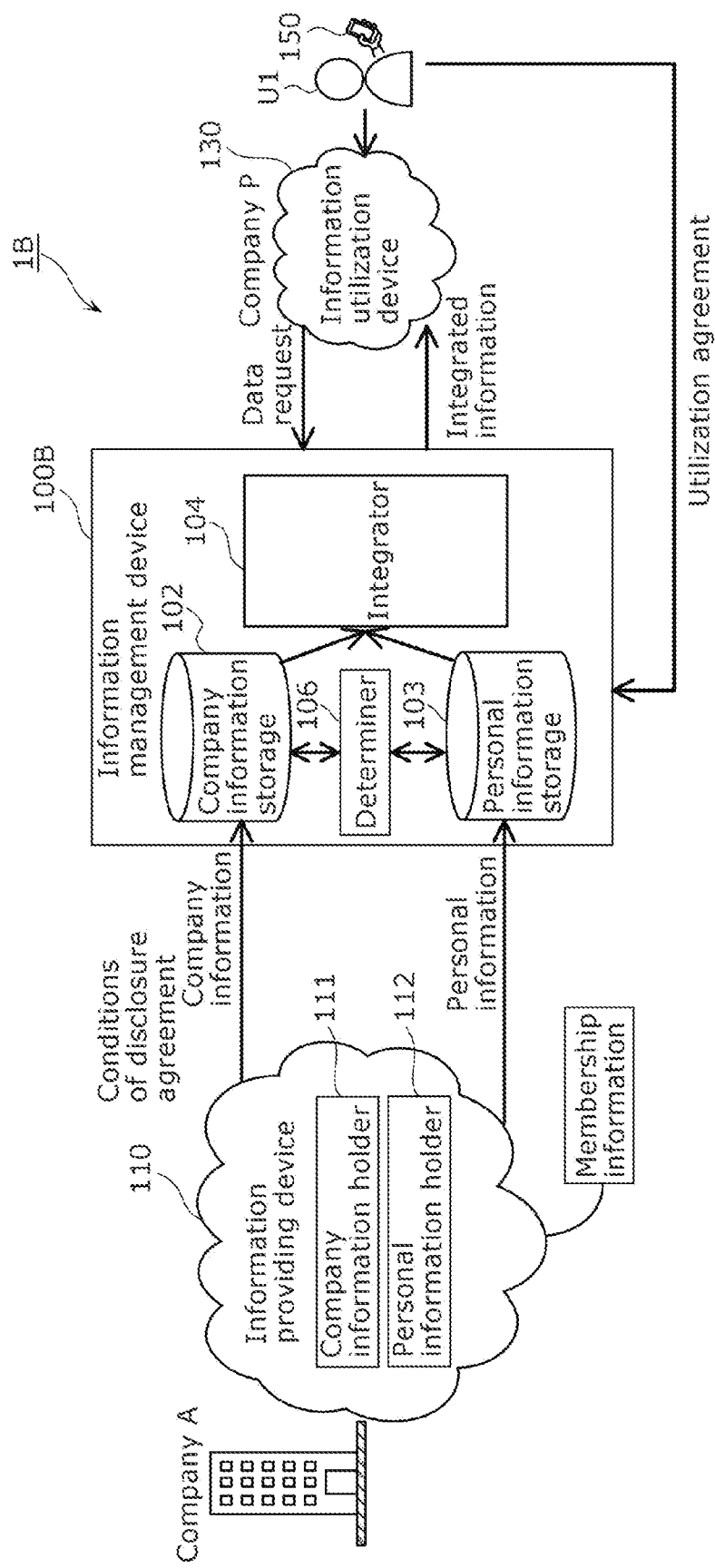
FIG. 15 shows an example of information management system 1B according to Embodiment 2.

FIG. 15 shows an example of information management system 1B according to Embodiment 2.

In Embodiment 1, the restriction information on the information disclosure destinations and the details of the information to be disclosed is registered in information management device 100 at the time of depositing information. In this case, based on the restriction information for the company information stored in company information storage 102 of information management device 100, the information disclosure destinations are designated and the range of data disclosed to the information disclosure destinations is determined. However, for example, the personal information may include, in association with the personal information, the information corresponding to the company information, which may be managed as the personal information by personal information storage 103.

To address the problem, information management device 100B of information management system 1B further includes determiner 106 in addition to the configuration of information management device 100.

Determiner 106 determines whether the personal information includes information on a company attribute. In this case, if determiner 106 refers to company information storage 102 and personal information storage 103 and determines that the personal information includes the information corresponding to the company information, manager 105 outputs the personal information based on the restriction information. That is, based on the restriction information, manager 105 may pause, stop, or cancel the utilization of the part corresponding to the company information out of the personal information including the information corresponding to the company information. This configuration protects the company information owned by an information provider so that the information provider safely provides the information to information management device 100B.

Embodiment 3

In Embodiment 1, the restriction information on the information disclosure destinations and the details of the information to be disclosed is registered in information management device 100 at the time of depositing information. In this case, based on the restriction information for the company information stored in company information storage 102 of information management device 100, the information disclosure destinations are designated and the range of data disclosed to the information disclosure destinations is determined. However, for example, the personal information may include, in association with the personal information, the information corresponding to the company information, which may be managed as the personal information by personal information storage 103.

In this case, when providing the integrated information, information management device 100 may also notify information utilization device 130 that is the information destination, of the fact that the integrated information is to be handled only as the personal information (i.e., privacy management information). That is, when outputting the integrated information, manager 105 of information management device 100 may output identification information indicating that the integrated information includes the personal information. Accordingly, information utilization device 130 is notified of the fact that the integrated information includes the personal information, and is encouraged to appropriately manage the integrated information.

Embodiment 4

Figure 18:
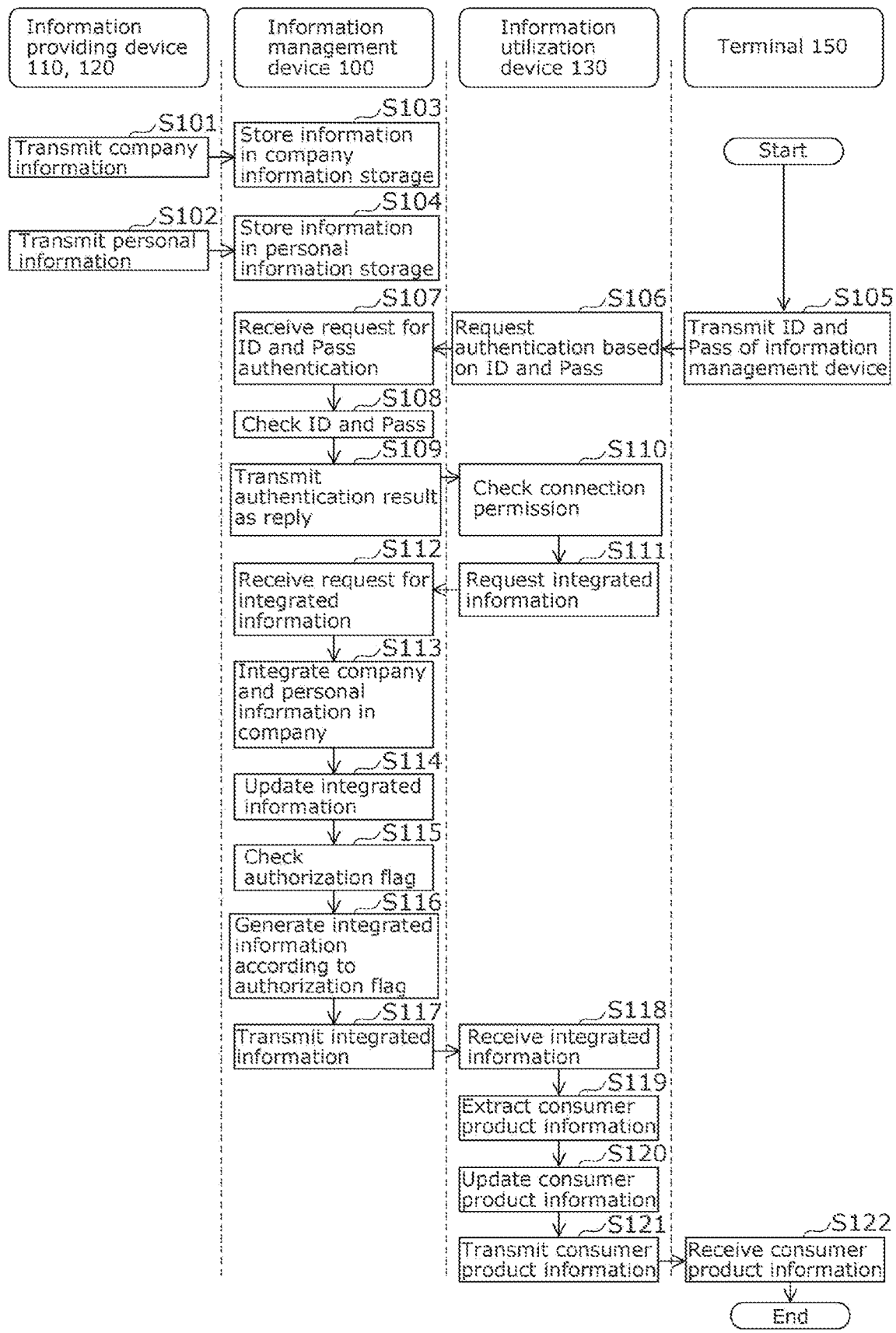
FIG. 18 is a sequence diagram showing an example operation of information management system 1 according to Embodiment 4.

FIG. 16 is a table showing an example configuration of integrated information. FIG. 17 is a table showing an example configuration of consumer product information extracted by information utilization device 130 of company P. FIG. 18 is a sequence diagram showing an example operation of information management system 1 according to Embodiment 4. FIG. 19 is a table showing an example configuration of consumer product information extracted by information utilization device 140 of company C.

Here, first, assume that user U1 who entrusts personal information requests sales information on company A and company B from information management device 100 via information utilization device 130 of company P, using terminal 150.

Each of information providing devices 110 and 120 transmits company information and personal information to information management device 100 (S101 and S102).

Next, information management device 100 obtains the company information and the personal information from each of information providing devices 110 and 120, and stores the company information in company information storage 102 and the personal information in personal information storage 103 (S103 and S104).

Then, user U1 operates terminal 150 so that terminal 150 transmits the ID and password (Pass) for utilizing information management device 100 to information utilization device 130 (S105).

After that, information utilization device 130 requests the authentication of information management device 100 from information management device 100, using the ID and password received from terminal 150 (S106).

Next, information management device 100 receives, from information utilization device 130, the request for the authentication using the ID and the password (S107), and checks the ID and password against the authentication information stored in advance in information management device 100 (S108). Then, information management device 100 transmits the authentication result as a reply to information utilization device 130 (S109). If the authentication has failed, the processing ends. Now, a case will be described where the authentication is successful.

If the authentication is successful as a result of the authentication, information utilization device 130 confirms the permission of the connection to information management device 100 (S110). Then, information utilization device 130 requests integrated information from information management device 100 (S111).

After that, information management device 100 receives, from information utilization device 130 (S112), the request for the integrated information, and integrates the company information and personal information owned by companies (S113). Information management device 100 then updates the original integrated information based on the obtained integrated information (S114). For example, information management device 100 integrates the sales information on company A and company B in company information storage 102 and the personal information on user U1 in personal information storage 103 to generate the integrated information as shown in FIG. 16.

Next, information management device 100 checks an authorization flag added to the generated integrated information (S115). If the authorization flag indicates that the information is available for company P, information management device 100 provides the integrated information to information utilization device 130 (S117). Here, if the authorization flag indicates that a part of the integrated information is available for company P, the following may be performed prior to step S117. The part of the integrated information to which access is permitted by the authorization flag is extracted from the integrated information generated in step S113 to generate the integrated information according to the authorization flag (S116). In this manner, the restriction information may include an authorization flag indicating whether the output is permitted to a predetermined company. Note that manager 105 of information management device 100 prohibits the output of the integrated information to the predetermined company, if the authorization flag indicates that not output is permitted for the predetermined company. That is, in this case, information management device 100 transmits no integrated information to information utilization device 130. Now, a case will be described where information management device 100 transmits the integrated information to information utilization device 130.

Information utilization device 130 receives the integrated information from information management device 100 (S118). Then, information utilization device 130 extracts the consumer product information shown in FIG. 17 from the received integrated information (S119), and updates the original consumer product information with the extracted consumer product information (S120). After that, information utilization device 130 transmits the updated consumer product information to information utilization device 130 (S121).

Next, terminal 150 receives the consumer product information from information utilization device 130 (S122).

For example, information utilization device 130 may be merely software or an application for managing the purchase history of user U1. The company information on companies A and B to be collected and utilized by information utilization device 130 may be utilized only for the convenience for user U1.

Here, assume that the authorization flag indicates that company A rejects providing data to company C while company B limits the data to be provided to company C. In this case, in step S119, as shown in FIG. 19, the integrated information on company A is excluded, and the consumer product information is generated by extracting the integrated information on company B.

In this manner, information providers can restrict information disclosure destinations and the details of the information to be disclosed, which achieves a digital data utilization institution (e.g., the Personal Data Trust Bank) taking the information providers into account. In this manner, the mechanism is established which allows the information providers such as company A and company B to control the information destinations via information management device 100 of the digital data utilization institution. This mechanism allows the information providers to restrict to which extent the information held by the information providers is to be disclosed. In addition, information management system 1 has the mechanism of safely providing information to the other companies or individuals beneficial for the information providers. The mechanism allows the information providers to safely provide the information to information management device 100.

Embodiment 5

Figure 20:
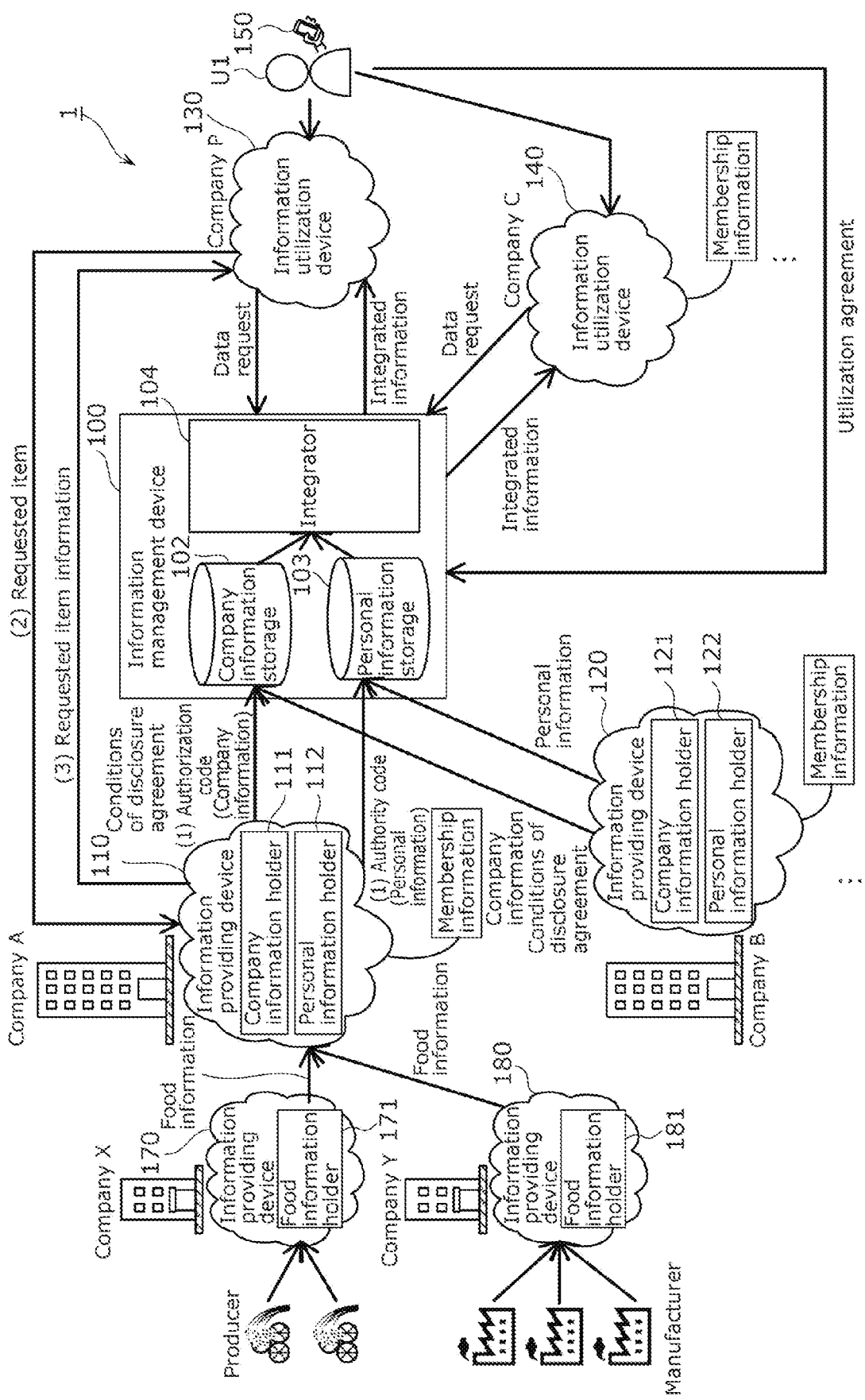
FIG. 20 shows an example of information management system 1 according to Embodiment 5.
Figure 21:
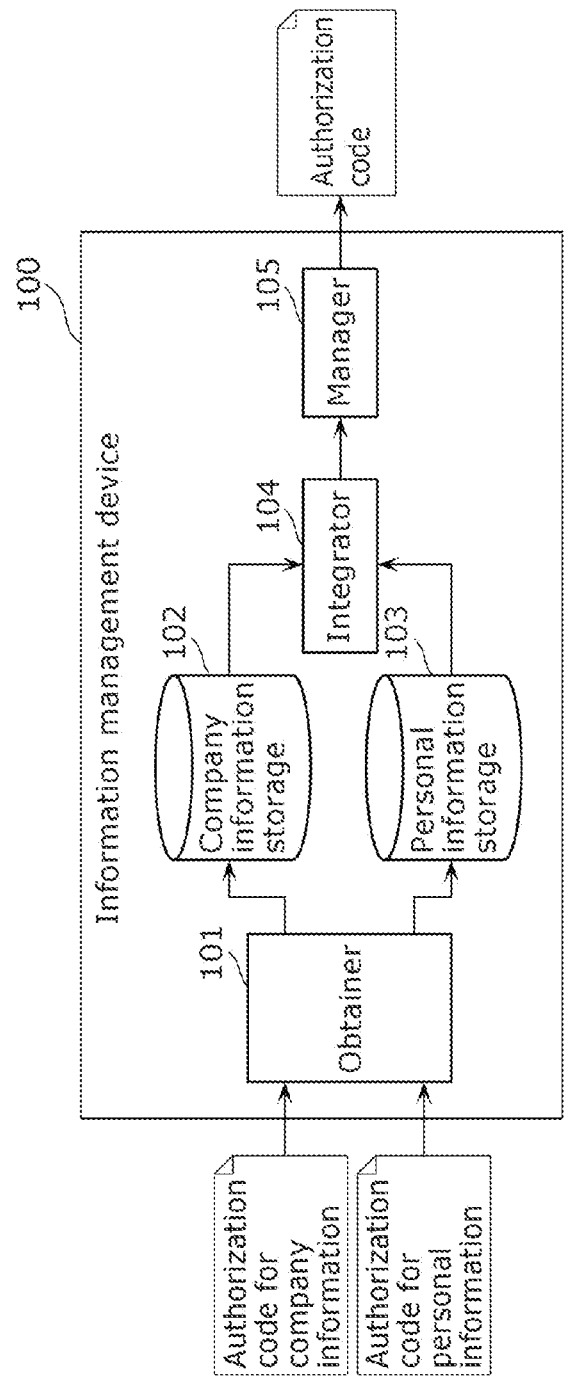
FIG. 21 is a block diagram showing an example configuration of an information management device according to Embodiment 5.

FIG. 20 shows an example of information management system 1 according to Embodiment 5. FIG. 21 is a block diagram showing an example configuration of an information management device according to Embodiment 5. FIG. 22 is a table showing example authorization codes. FIG. 23 is a sequence diagram showing an example operation of information management system 1 according to Embodiment 5.

In the example of FIG. 12, the personal information and company information related to an individual are deposited to a digital data utilization institution with the agreement of the individual so as to be transmitted to information management device 100. In this case, however, some information disclosing companies may wish not to disclose the data to a company that owns the information utilization device, that is, a specific company that utilizes data. Similarly, the data utilizing company may wish to be provided with the minimum information required for the purpose.

In this case, in FIG. 20, for example, information providing device 110 of company A provides the personal information and company information related to an individual to information management device 100 with the agreement of the individual. At this time, as indicated by (1) in FIG. 20, information providing device 110 of company A transmits, in place of the personal information and the company information, authorization codes to information management device 100 (S101a and S102a). The authorization codes are for directly requesting the company information and the personal information from company A. As the authorization codes, those shown in FIG. 22 are available, for example.

Next, in information management device 100, obtainer 101 obtains the authorization codes for the company information and the personal information from information providing device 110 as also shown in FIG. 21. Obtainer 101 then stores the authorization code for the company information in company information storage 102 and the authorization code for the personal information in personal information storage 103 (S103a and S104a).

Terminal 150, information utilization device 130, and information management device 100 then perform the same processing as in steps S105 to S112 shown in FIG. 18.

After step S112, in information management device 100, manager 105 transmits the authorization codes for the company information and the personal information to information utilization device 130 (S131).

Next, information utilization device 130 receives the authorization codes from information management device 100 (S132), and directly transmits a requested data item together with the received authorization codes to information providing device 110 as indicated by (2) in FIG. 20 (S133).

After that, information providing device 110 receives the authorization codes and the requested item from information utilization device 130 (S134). Information providing device 110 obtains detailed request information (i.e., integrated information) according to the requested item from the storage device (i.e., the memory) of information providing device 110 (S135). Then, information providing device 110 transmits the obtained detailed request information to information utilization device 130 (S136). That is, as indicated by (3) in FIG. 20, information providing device 110 transmits the information requested by information utilization device 130 of company P to information utilization device 130 upon receipt of a data request from information utilization device 130.

Next, information utilization device 130 receives the detailed request information from information providing device 110 (S137), and updates original information with the received detailed request information (S138).

In this manner, obtainer 101 of information management device 100 obtains, from information providing device 110, the authorization codes used for directly obtaining information including the company information on company A from information providing device 110 of company A. Then, manager 105 of information management device 100 outputs the obtained authorization codes to information utilization device 130. Like in Embodiment 1, manager 105 manages the output of the authorization codes based on restriction information for restricting the output destinations of the integrated information. Note that information utilization device 130 is an example of an information processing device of user U1.

Embodiment 6

Figure 24:
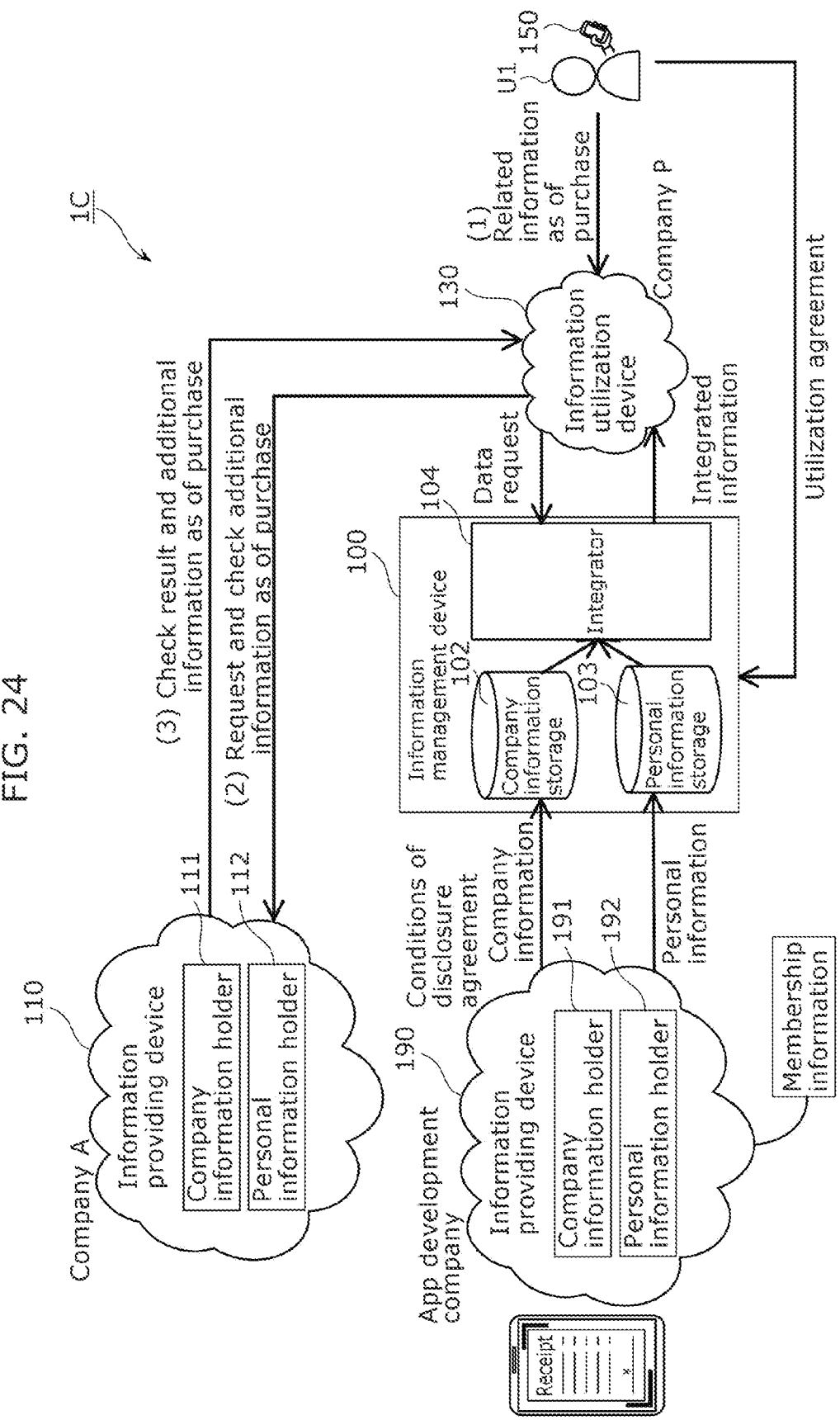
FIG. 24 shows an example of information management system 1C according to Embodiment 6.
Figure 27:
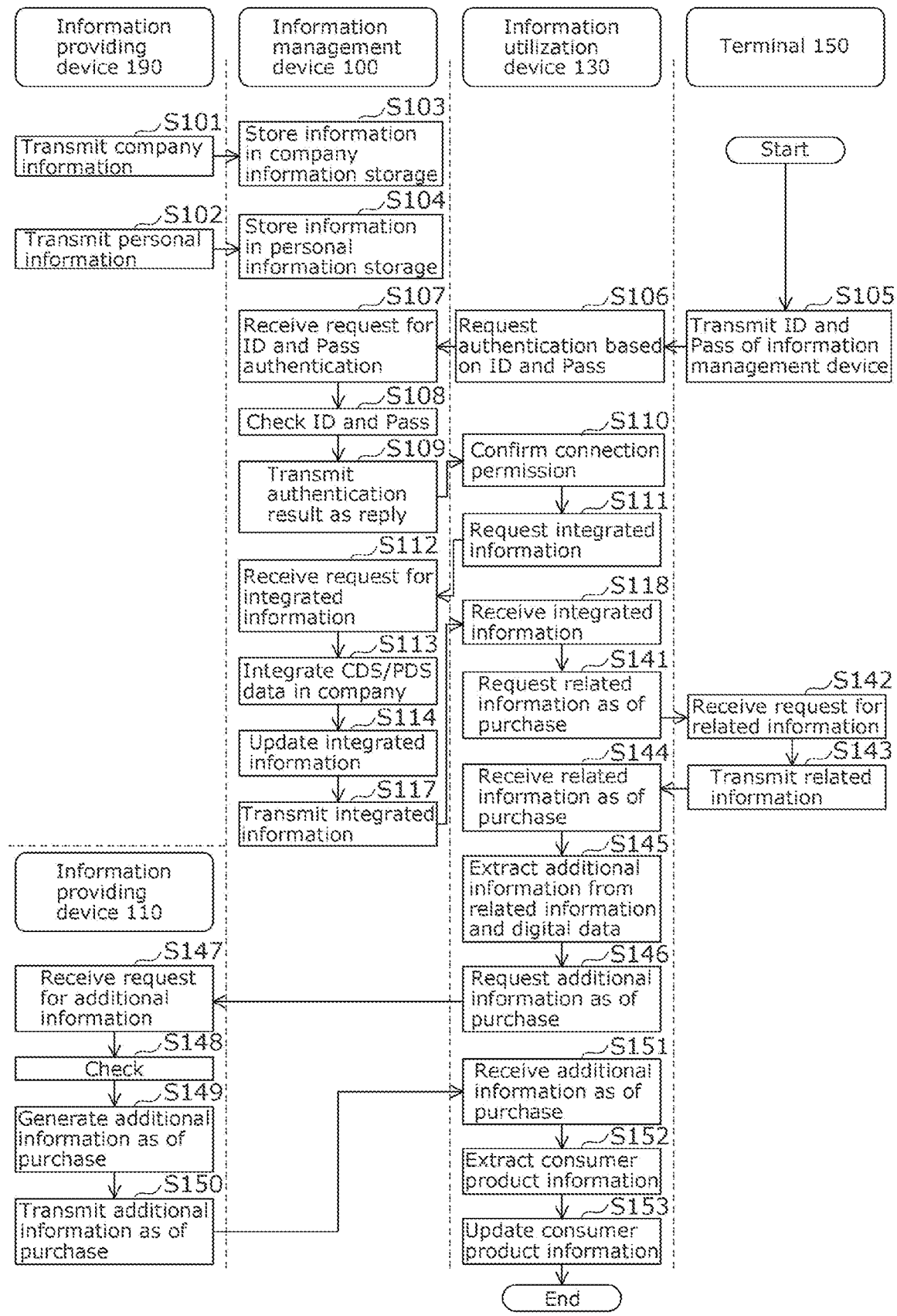
FIG. 27 is a sequence diagram showing an example operation of information management system 1C according to Embodiment 6.

FIG. 24 shows an example of information management system 1C according to Embodiment 6. FIG. 25 is a table showing an example configuration of the company information and personal information held in information providing device 190 of an application development company. FIG. 26 is a table showing an example configuration of related information as of purchase. FIG. 27 is a sequence diagram showing an example operation of information management system 1C according to Embodiment 6.

In information management system 1C, information providing device 190 of the application development company provides information management device 100 with the company information held in company information holder 191 of information providing device 190 and the personal information held in personal information holder 192 of information providing device 190.

Company information holder 191 accumulates the purchase information, the account information etc., which correspond to electronic or paper receipts, obtained through an application of the application development company. Personal information holder 192 stores the payment information associated with individuals and members and owned by the application development company.

The information held in personal information holder 192 is provided as the personal information related to an individual to information management device 100 with the agreement of the individual, and is stored in personal information storage 103 of information management device 100. In addition, the data held in company information holder 191 is also provided to information management device 100, and is accumulated in company information storage 102.

This information management system 1C performs steps S101 to S118 shown in FIG. 19. Note that the sequence diagram shown in FIG. 27 differs from that in FIG. 19 as follows. In steps S101 and S102, the subject of the operation is information providing device 190 in place of information providing device 110.

Information utilization device 130 obtains the integrated information based on the information provided by the application development company as shown in FIG. 25. However, the information provided by the application development company may lack the details of the data. Information utilization device 130 may thus directly request additional information on a product as of purchase from information providing device 110 of company A, for example.

For the purpose, first, after step S118, information utilization device 130 requests the related information as of purchase from terminal 150 of user U1 (S141).

Next, terminal 150 receives, from the information utilization device, the request for the related information (S142), transmits the related information to information utilization device 130 as indicated by (1) in FIG.

(S143). For example, assume that the application development company has obtained the digital data from the purchase information and account information, which correspond to electronic or paper receipts, on company A. In this case, information utilization device 130 requests the related information as of purchase (i.e., support data, such as location information, at the time of purchase) from terminal 150, and obtains the related information from terminal 150.

Then, information utilization device 130 receives the related information as of purchase from terminal 150 (S144), and extracts additional information from the received related information and digital data (S145). After that, information utilization device 130 requests the additional information as of purchase as indicated by (2) in FIG. 24 (S146). For example, information utilization device 130 directly requests the additional information as of purchase from company A together with the related information and the digital data from the application development company.

Next, information providing device 110 receives, from information utilization device 130, the request for the additional information as of purchase (S147), and checks the request for the additional information against the information stored in information providing device 110 (S148). As a result of the check, information providing device 110 generates the additional information as of purchase (S149), and transmits the generated additional information to information utilization device 130 as indicated by (3) in FIG. 24 (S150).

Then, information utilization device 130 receives the additional information as of purchase (S151), and extracts consumer product information from the received integrated information and additional information (S152). After that, information utilization device 130 transmits the updated consumer product information to information utilization device 130 (S153).

Accordingly, information management device 100 causes information utilization device 130 to directly request the information lacking in information management device 100 from another information providing device 110 to advantageously obtain, complement, and utilize the information.

Embodiment 7

Figure 28:
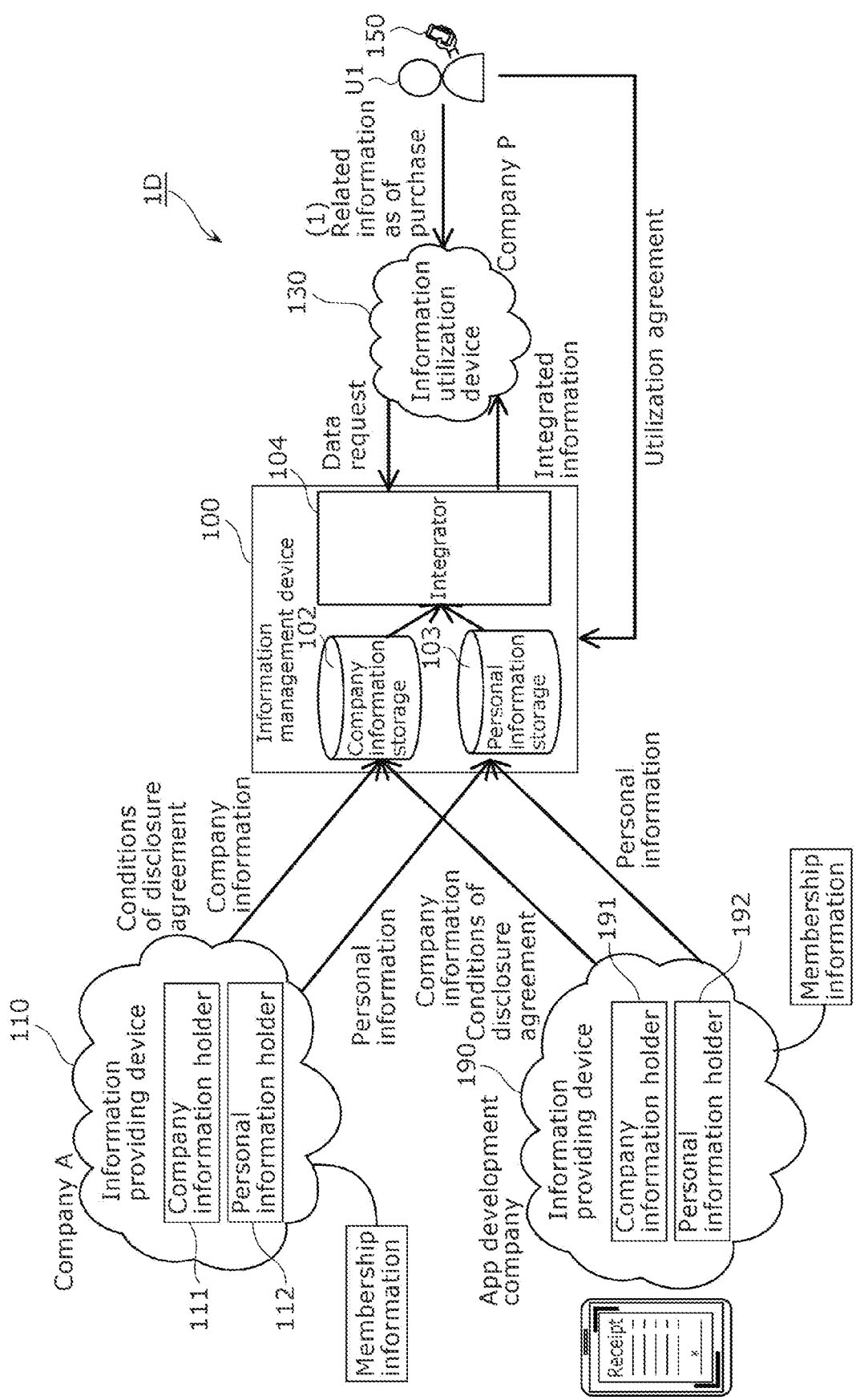
FIG. 28 shows an example of information management system 1D according to Embodiment 7.
Figure 29:
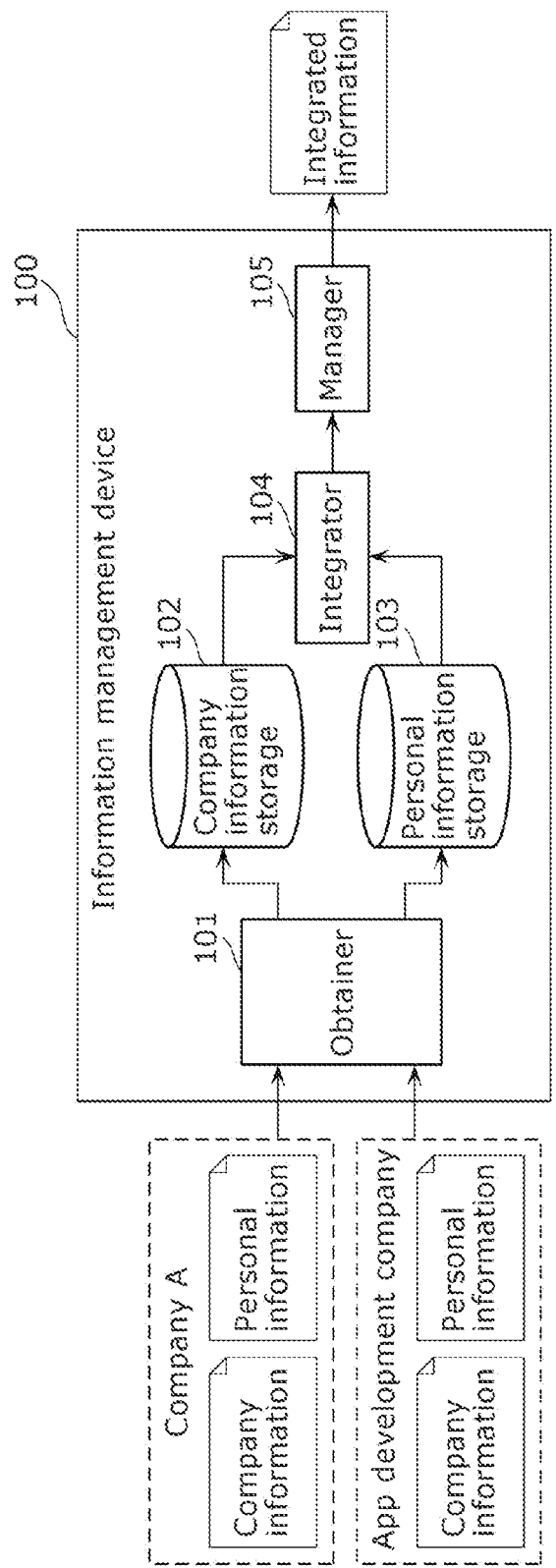
FIG. 29 is a block diagram showing an example configuration of an information management device according to Embodiment 7.

FIG. 28 shows an example of information management system 1D according to Embodiment 7. FIG. 29 is a block diagram showing an example configuration of an information management device according to Embodiment 7.

Information management system 1D according to Embodiment 7 differs from information management system 1C according to Embodiment 6 as follows. Information providing device 110 provides information management device 100 with company information and personal information.

For example, assume that an application development company has obtained the digital data from the purchase information and account information, which correspond to the electronic or paper receipts, on company A. In this case, information management device 100 checks the restriction information for the purchase data on company A in company information storage 102. If the restriction information indicates that the information is available for company P, information management device 100 associates the personal information in the application development company and company A in personal information storage 103 with each other. Information management device 100 then refers to the purchase data (i.e., the additional information) on company A in company information storage 102 for the data lacking in the purchase data on the application development company in company information storage 102. Information management device 100 then integrates the purchase data and personal information in the application development company and the purchase data (i.e., the additional information) on company A that are associated with each other. Information management device 100 provides the obtained integrated information via information utilization device 130 to terminal 150 of user U1.

In this manner, in information management device 100, obtainer 110 obtains company information and personal information from each of the application development company and company A. The company information relates to the products or service of the company. The personal information relates to the users who have purchased the products or who has been provided with the service. That is, obtainer 110 obtains the additional information as the record information on the purchase or use record from company A different from the application development company.

Integrator 104 integrates the company information and personal information on the application development company and further the obtained additional information to generate the integrated information. After that, manager 105 outputs the integrated information to information utilization device 130.

In order to check the digital data on the application development company against the purchase information on company A, the related information as of purchase (i.e., support data, such as location information, at the time of purchase) at terminal 150 of user U1 may be used, for example.

Embodiment 8

Figure 30:
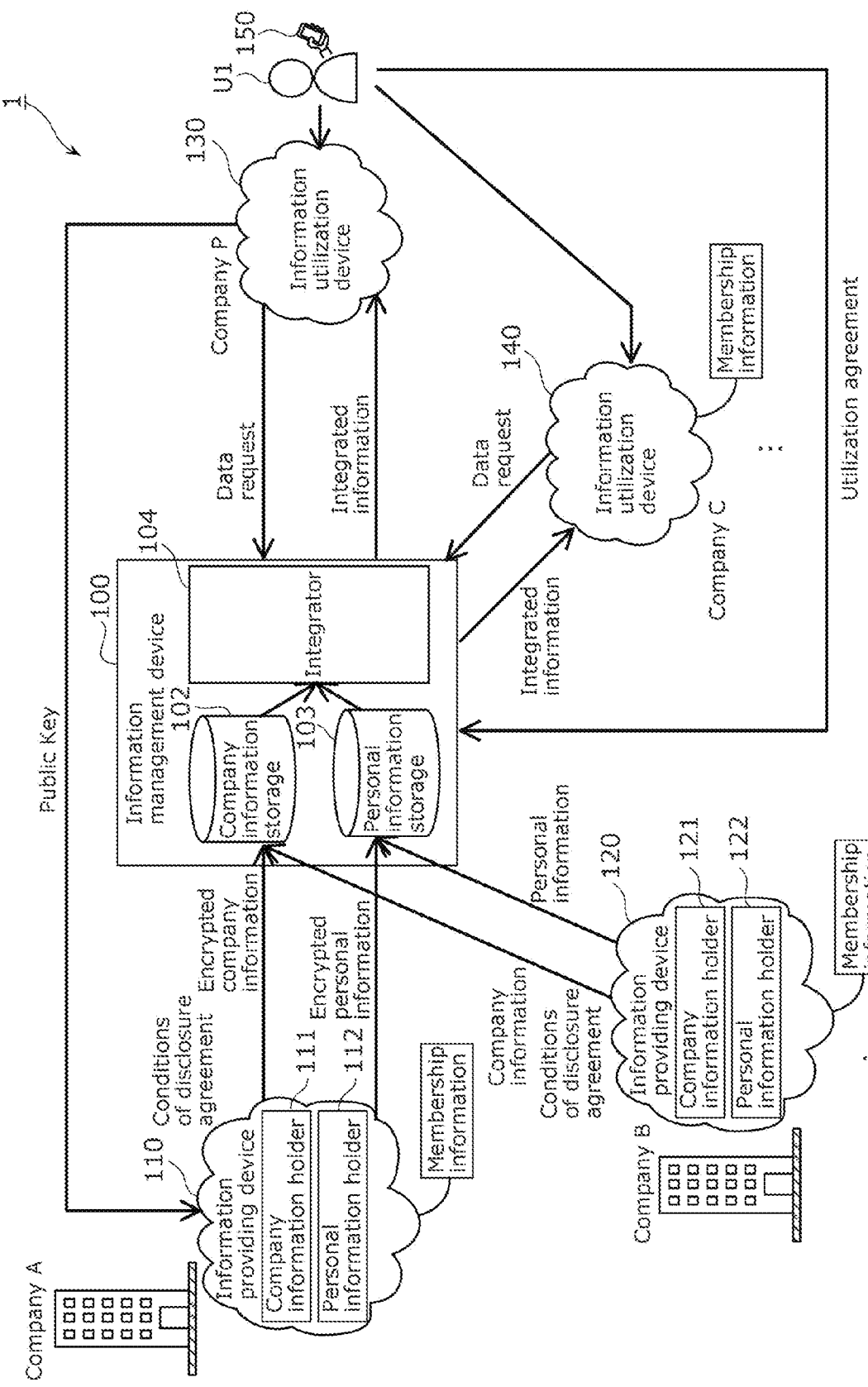
FIG. 30 shows an example of information management system 1 according to Embodiment 8.
Figures 31, 32:
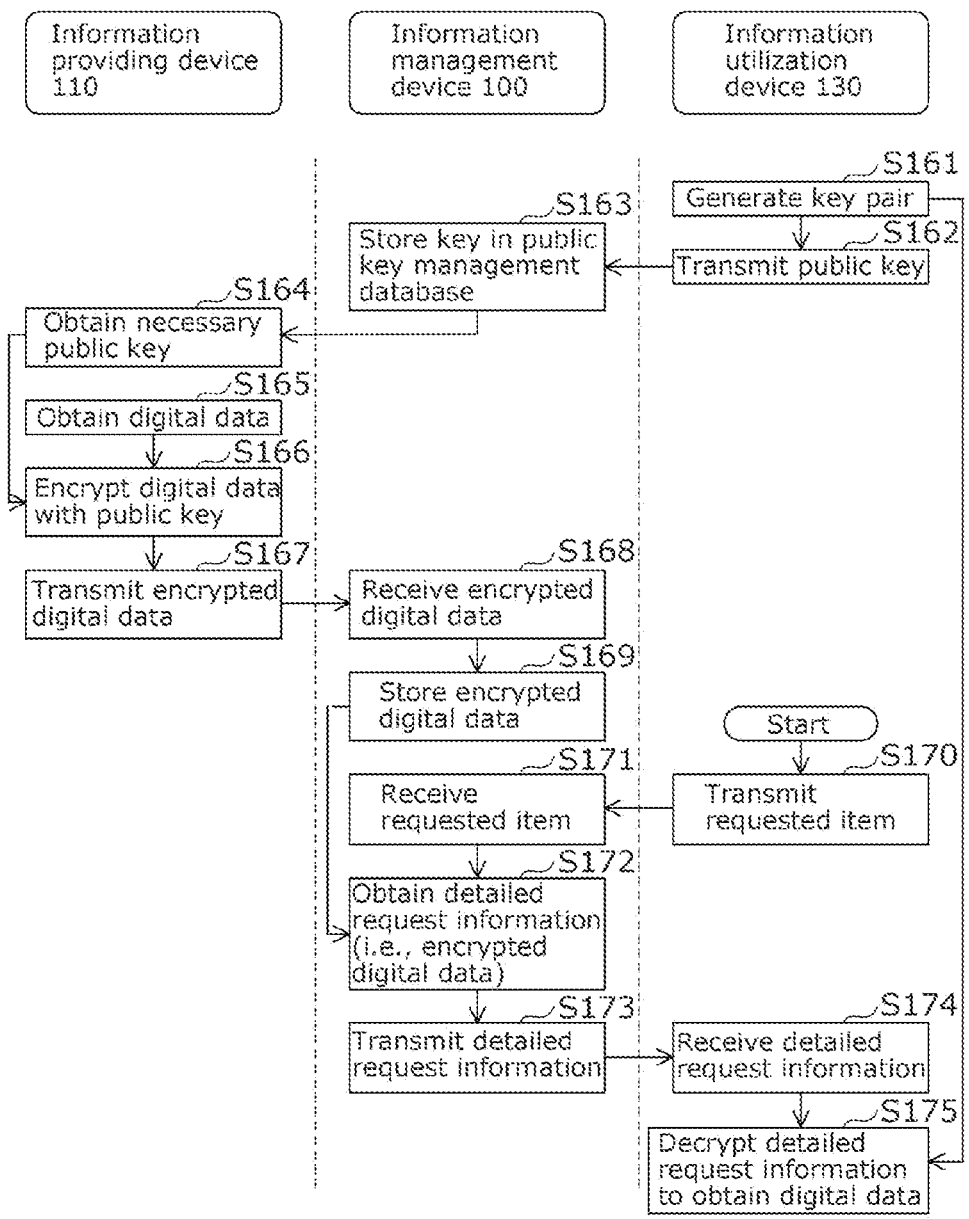
FIG. 31 is a table showing an example configuration of the public key management data stored in information management device 100.
FIG. 32 is a sequence diagram showing an example operation of information management system 1 according to Embodiment 8.

FIG. 30 shows an example of information management system 1 according to Embodiment 8. FIG. 31 is a table showing an example configuration of the public key management data stored in information management device 100. FIG. 32 is a sequence diagram showing an example operation of information management system 1 according to Embodiment 8.

An example has been described in Embodiment 5 where the digital data is directly provided from the source to the destination, if the information disclosing company wishes not to disclose information to a specific company that utilizes information. In the present embodiment, all the personal information and company information are protected by an encryption technique, that is, the encrypted personal information and the encrypted company information are provided to information management device 100. Accordingly, only a company whose access to the information is permitted by the information disclosing company can decrypt the protected digital data and utilized.

First, information utilization device 130 generate a pair of public and private keys according to the public-key cryptography (S161), and transmits the public key of the pair to information management device 100 (S162). Note that the public-key cryptography may be based on any algorithm, such as the RSA or the ECC.

Next, information management device 100 receives the public key from information utilization device 130, stores the received public key in a public key management database (S163), and transmits the public key to information providing device 110. In this manner, information utilization device 130 does not directly provide the public key to information providing device 110, but information management device 100 owns the public key of each company, and the information disclosing company obtains, from information management device 100, the public key of the company to which the disclosure is permitted. In a preferred embodiment, information management device 100 may manage the public key for each business type as shown in FIG. 31. That is, for example, company A is a processed food manufacturer and highly likely to wish not to provide information to competitive processed food manufacturing companies or providers of agricultural or fishery products as ingredients throughout the business field.

After that, information providing device 110 of the information disclosing company obtains a necessary public key from information management device 100 (S164). On the other hand, information providing device 110 obtains digital data including company information and personal information (S165). Company information holder 111 accumulates the company information and the personal information holder stores the personal information. Next, information providing device 110 encrypts the digital data with the obtained public key (S166) and transmits the obtained encrypted digital data to information management device 100 (S167). Note that the disclosure destination may include a plurality of companies. The digital data may not be directly encrypted using a public key, but digital data may be encrypted under the AES, for example, using a randomly generated data key, which is encrypted using a public key provided by each company.

Then, information management device 100 receives the encrypted digital data from information providing device 110 (S168), and stores, out of the encrypted digital data, the encrypted company information in company information storage 102 and the encrypted personal information in personal information storage 103 (S169).

Information utilization device 130 receives an instruction from terminal 150 of user U1 and transmits a requested data item to information management device 100 (S170).

Next, information management device 100 receives the requested item from information utilization device 130 (S171), and obtains detailed request information according to the received requested item from the encrypted digital data (S172). Then, information management device 100 transmits the obtained detailed request information to information utilization device 130 (S173).

After that, information utilization device 130 receives the detailed request information from information management device 100 (S174). Then, information utilization device 130 decrypts the received detailed request information with the private key to obtain the digital data (S175).

Embodiment 9

Now, Embodiment 9 will be described.

Figure 33:
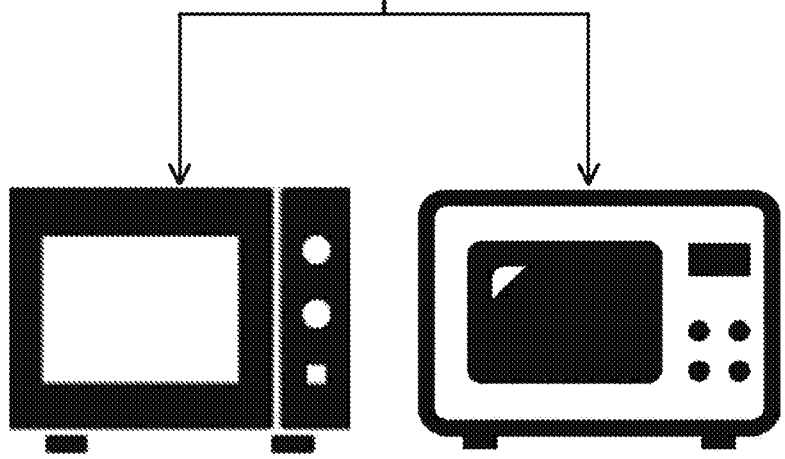
FIG. 33 illustrates a method of making a cooking setting for a microwave oven in accordance with heat up information on a package.

For example, when cooking a frozen food in a microwave oven, a user refers to the heat up information on the package of the frozen food as indicated by the table of FIG. 33, and makes the cooking setting for the microwave oven in accordance with the heat up information. However, the setting time (i.e., watts and the irradiation time) on the package is not necessarily written with the same parameter as the microwave oven of the user, causing the problem of unstable cooking quality.

Figure 34:
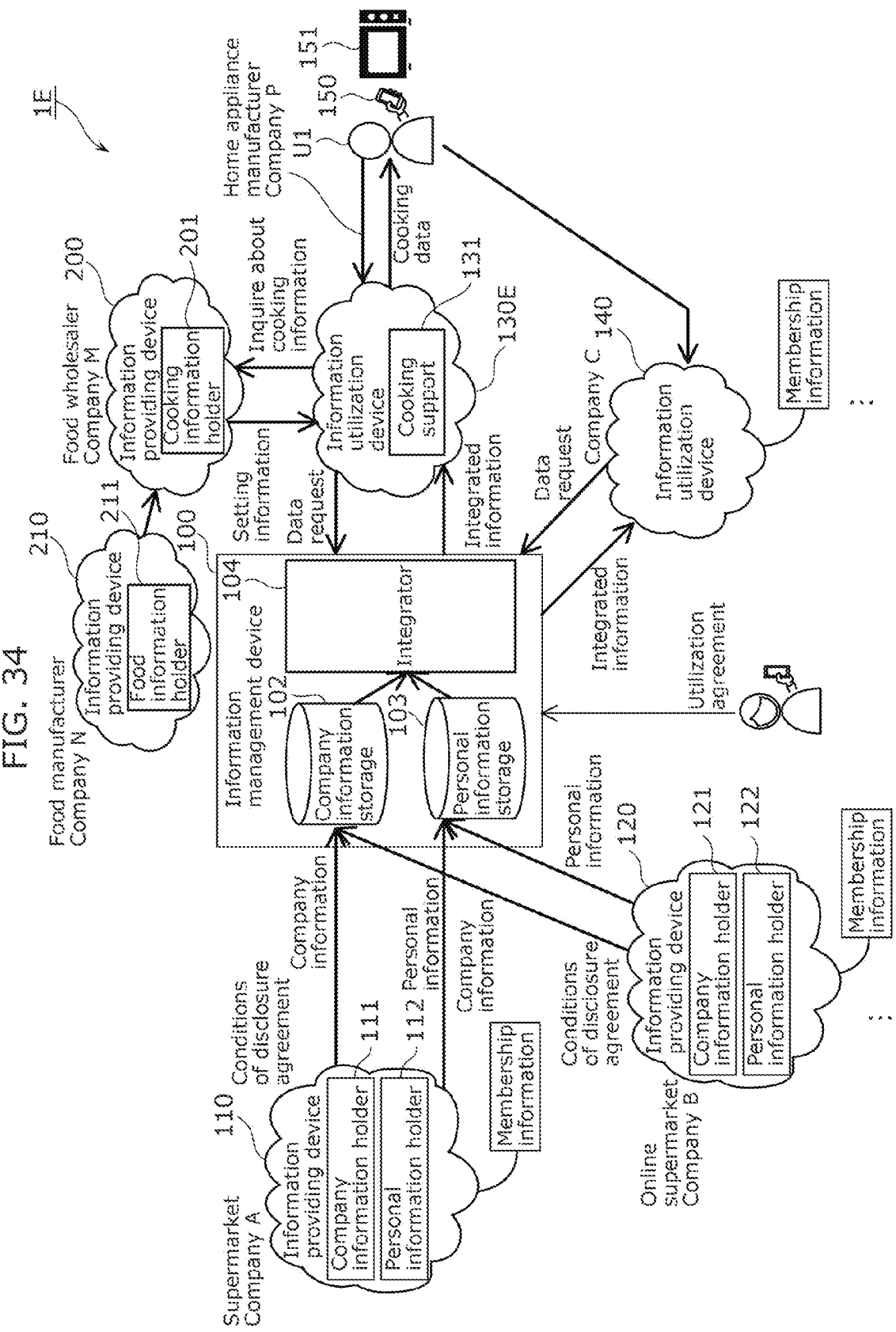
FIG. 34 shows an example of information management system 1E according to Embodiment 9.
Figure 35:
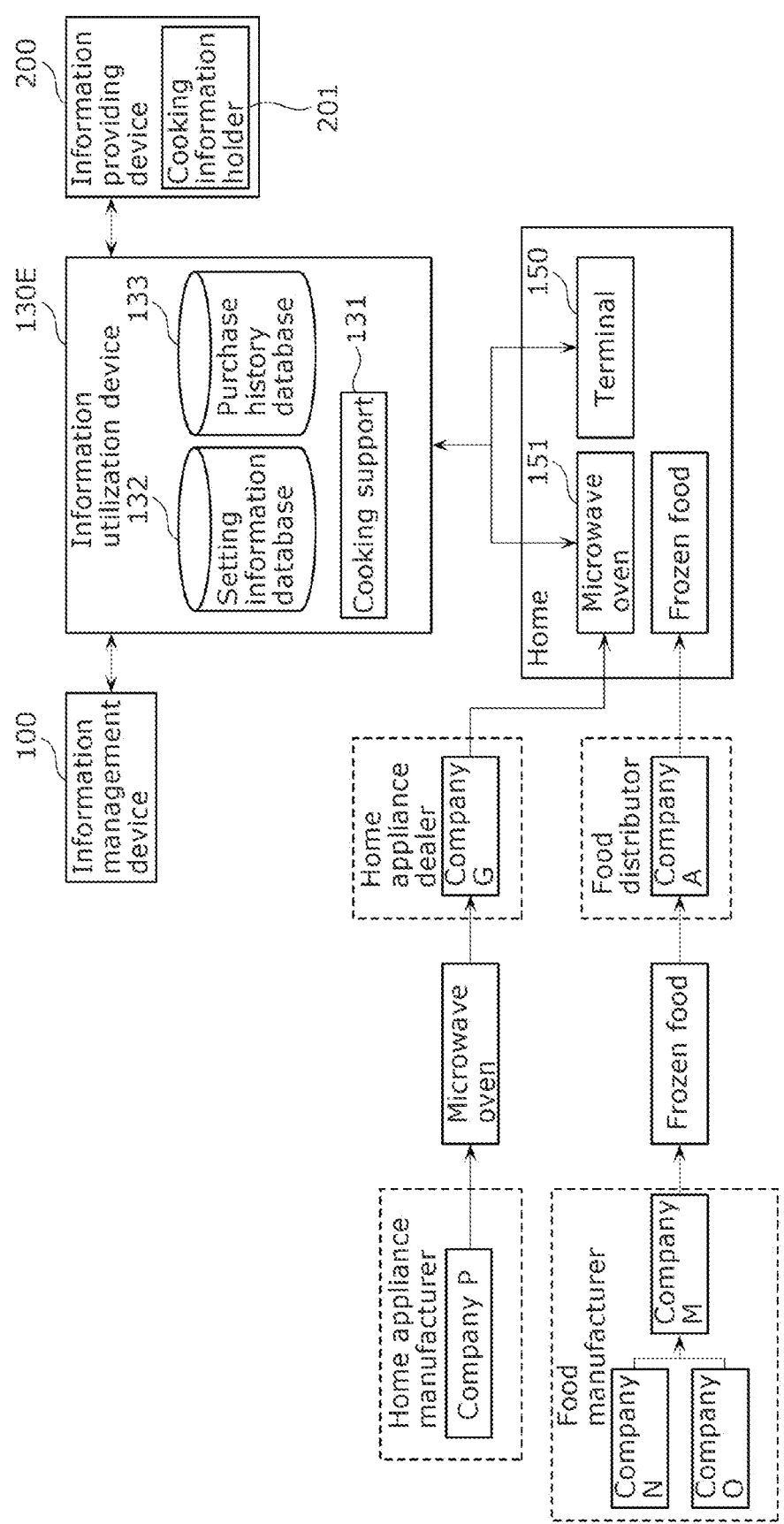
FIG. 35 shows a relationship between information management system 1E and purchase routes of a device at home and a product for use in the device.

FIG. 34 shows an example of information management system 1E according to Embodiment 9. FIG. 35 shows a relationship between information management system 1E and purchase routes of a device at home and a product for use in the device. Information management system 1E is a first example of Embodiment 9.

Described in the first example is a method of obtaining a cooking setting for a home appliance in coordination with a food manufacturer that is the manufacturer, using the obtained purchase data. That is, in the method according to the first example, based on the obtained purchase data, a home appliance manufacturer directly coordinates with a food trader and holds a database related to setting information.

Information management system 1E differs from information management system 1 in the configuration of information utilization device 130E and further includes information providing devices 200 and 210.

As shown in FIG. 35, information utilization device 130E includes cooking support 131, setting information database 132, and purchase history database 133. Setting information database 132 holds most suitable setting information (i.e., the parameters such as watts and the irradiation time) on a certain frozen food in a microwave oven. The setting information may be determined by the food manufacturer or may be optimized at an individual home appliance based on the information provided by the food manufacturer. In addition, the setting information may be updated through the utilization by the user. That is, the setting information may be updated based on the tendency statistically obtained from the use history of the user. Purchase history database 133 holds, as the purchase history, the information on the frozen food obtained from information management device 100.

Setting information database 132 is linked with purchase history database 133. For example, if a new frozen food product is added to purchase history database 133, information utilization device 130E obtains the cooking information on the frozen food from cooking information holder 201 of information providing device 200 of the food trader. Next, information utilization device 130E updates setting information database 132 based on the obtained cooking information. Then, cooking support 131 of information utilization device 130E push notifies microwave oven 151 or terminal 150 of the update of setting information database 132. With this configuration, a user obtains the latest setting information as necessary using microwave oven 151 or terminal 150, for example.

Accordingly, the user selects a setting according to the setting information obtained via the GUI of microwave oven 151 or applies a setting according to the setting information obtained via the UI of terminal 150 to microwave oven 151 to appropriately cook a frozen food. Note that the product to be added to purchase history database 133 may be not only a frozen food but a processed food that is finished by heating up. The processed food may be a lunch box, for example.

Note that the setting information is not necessarily obtained by microwave oven 151 or terminal 150, but may be obtained by a refrigerator. In this case, once a user selects the setting for a certain frozen food in the refrigerator, the cooking setting selected for the frozen food in the refrigerator is automatically reflected to the microwave oven.

While generally used microwave ovens often function as an oven as well, a lot of frozen foods are assumed to be subjected to the "heat-up" function. A new frozen food to be subjected to the oven function may developed with a food trader, and new cooking information including the oven function may be obtained and operated in coordination.

In this manner, user U1 purchases a frozen food at a supermarket. Then, the purchase information indicating that user U1 has purchased the frozen food is transmitted, as the company information, together with the personal information on user U1 from information providing device 110 to information management device 100. Accordingly, company information storage 102 of information management device 100 stores the company information including the purchase information.

Information utilization device 130E obtains, from information management device 100, the information on the fact that user U1 has purchased the frozen food at the supermarket. Accordingly, the purchase information on the frozen food is added to purchase history database 133. Setting information database 132 linked with purchase history database 133 accesses information providing device 200 to obtain cooking information (or setting information) for appropriately cooking the frozen food whose information has been added. Here, the cooking information includes the output level and cooking time for heating up the processed food in a microwave oven. Upon obtainment of the cooking information, information utilization device 130E may obtain the most suitable setting information on microwave oven 151 owned by user U1 from a storage device of information utilization device 130E or an external storage device based on the cooking information. In addition, information utilization device 130E transmits the obtained setting information to terminal 150 of user U1 or microwave oven 151. As a result, user U1 easily cooks the purchased frozen food in microwave oven 151 at a most suitable setting without checking the most suitable setting information for heating up the purchased frozen food in microwave oven 151.

Figure 36:
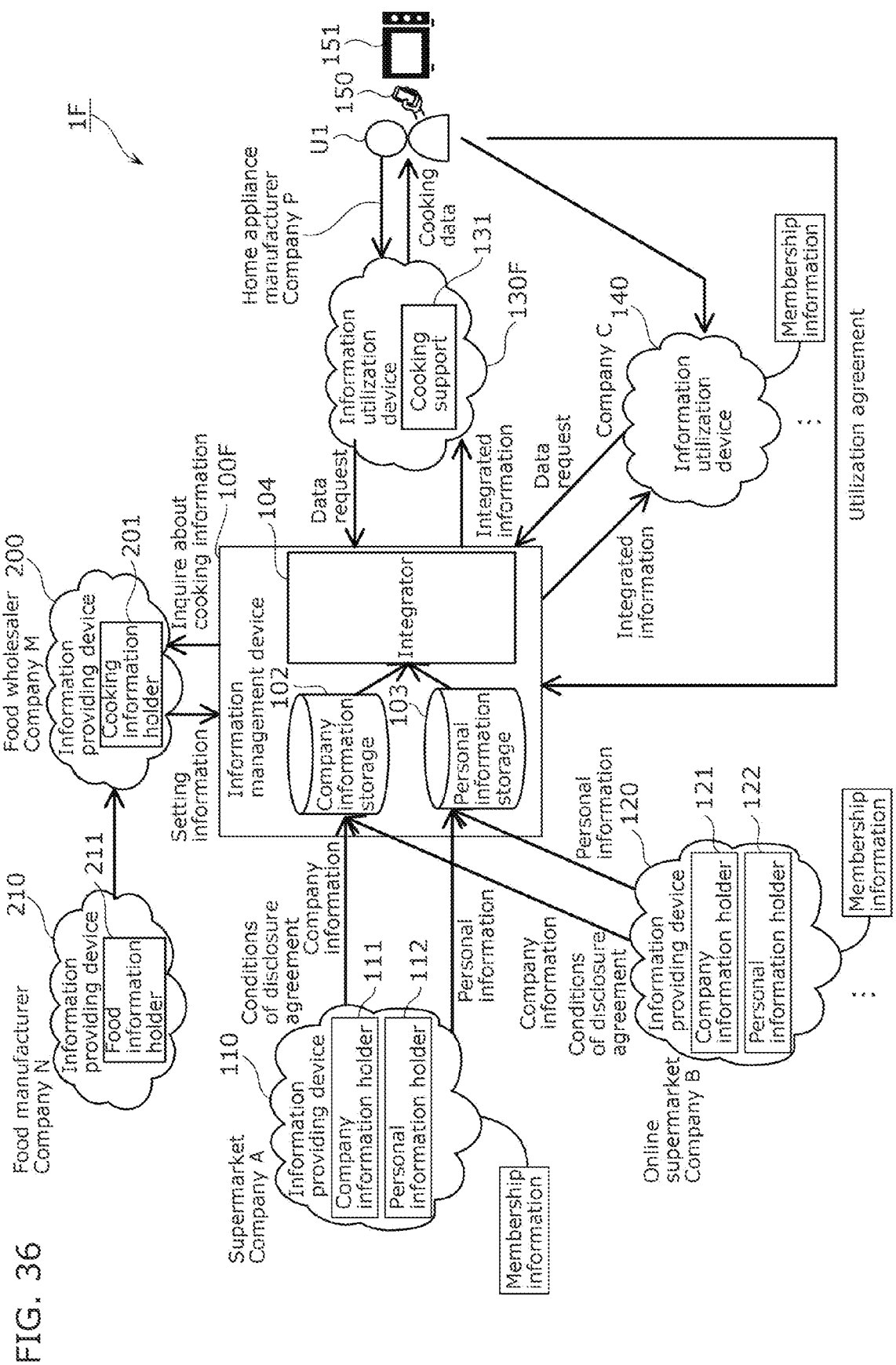
FIG. 36 shows an example of information management system 1F according to Embodiment 9.
Figure 37:
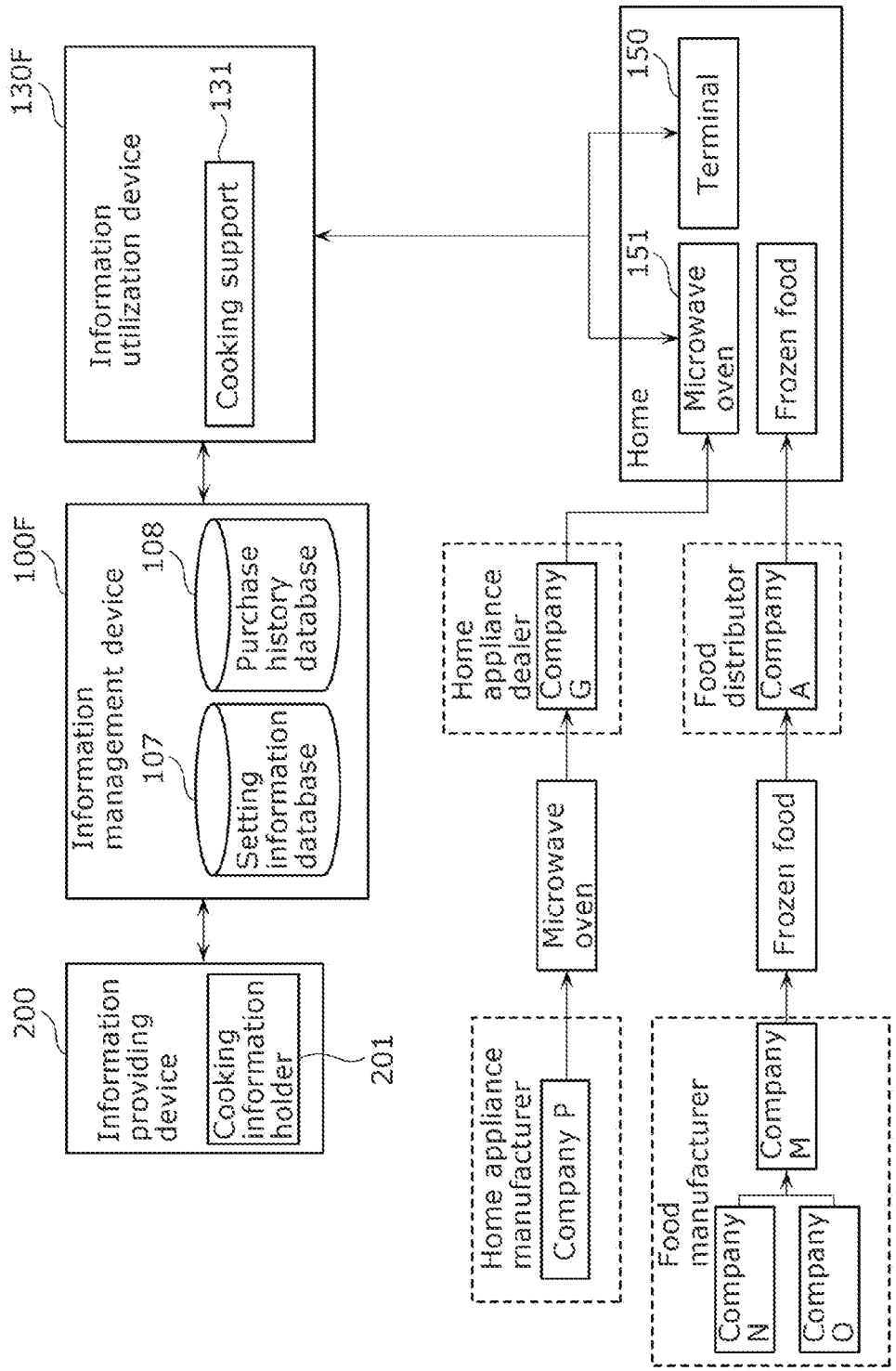
FIG. 37 shows a relationship between information management system 1F and purchase routes of a device at home and a product for use in the device.

FIG. 36 shows an example of information management system 1F according to Embodiment 9. FIG. 37 shows a relationship between information management system 1F and purchase routes of a device at home and a product for use in the device. Information management system 1F is a second example of Embodiment 9.

The second example differs from the first example as follows. In place of information utilization device 130E, information management device 100F includes setting information database 107 and purchase history database 108. Note that setting information database 107 and purchase history database 108 have the same functions as setting information database 132 and purchase history database 133 according to the first example, respectively. Accordingly, like information utilization device 130E in the first example, information management device 100F obtains the cooking information from cooking information holder 201 of information providing device 200.

Specifically, once user U1 purchases a frozen food at a supermarket, the purchase information indicating that user U1 has purchased the frozen food is transmitted, as the company information, together with the personal information on user U1 from information providing device 110 to information management device 100. Accordingly, company information storage 102 of information management device 100 stores the company information including the purchase information.

Accordingly, the purchase history of the frozen food is added to purchase history database 108. Setting information database 107 linked with purchase history database 108 accesses information providing device 200 to obtain cooking information (or setting information) for appropriately cooking the frozen food whose information has been added. Upon obtainment of the cooking information, information management device 100F may obtain the most suitable setting information on microwave oven 151 owned by user U1 from a storage device of information utilization device 130E or an external storage device based on the cooking information. In addition, information management device 100F transmits the obtained setting information via cooking support 131 of information utilization device 130F to terminal 150 of user U1 or microwave oven 151. As a result, user U1 easily cooks the purchased frozen food in microwave oven 151 at a most suitable setting without checking the most suitable setting information on the purchased frozen food.

Note that the setting information is not only obtained by a food manufacturer or a food wholesaler registered in information management device 100F but may be held in company information holder 111 of information providing device 110 of a supermarket.

As in the first example, in information management system 1E, information utilization device 130E exchanges information with information providing device 200 to obtain the cooking information. In the system, in place of information management device 100, information management device 100F may be used which includes setting information database 107 and purchase history database 108 as in the second example. In this case, information management device 100F exchanges information with information providing device 200 via information utilization device 130E to obtain the cooking information.

Embodiment 10

Now, Embodiment 10 will be described.

For example, convenience stores provide the service of heating up a food, such as a lunch box, purchased by a customer in a commercial microwave oven. However, in this case, it takes time for heating up the food such as the lunch box, which causes the problem of a longer operation period per customer.

Figure 38:
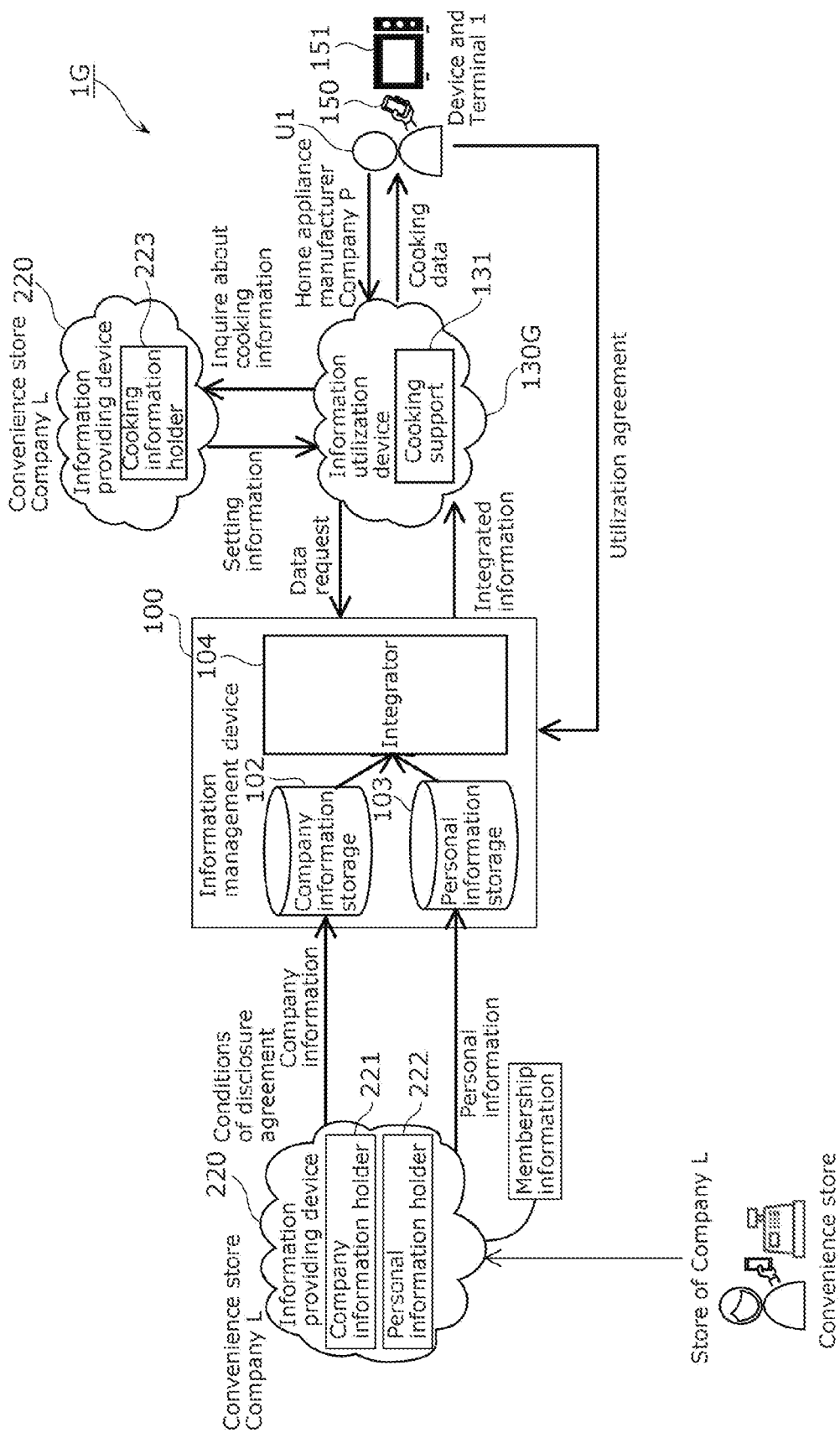
FIG. 38 shows an example of information management system 1G according to Embodiment 10.
Figure 39:
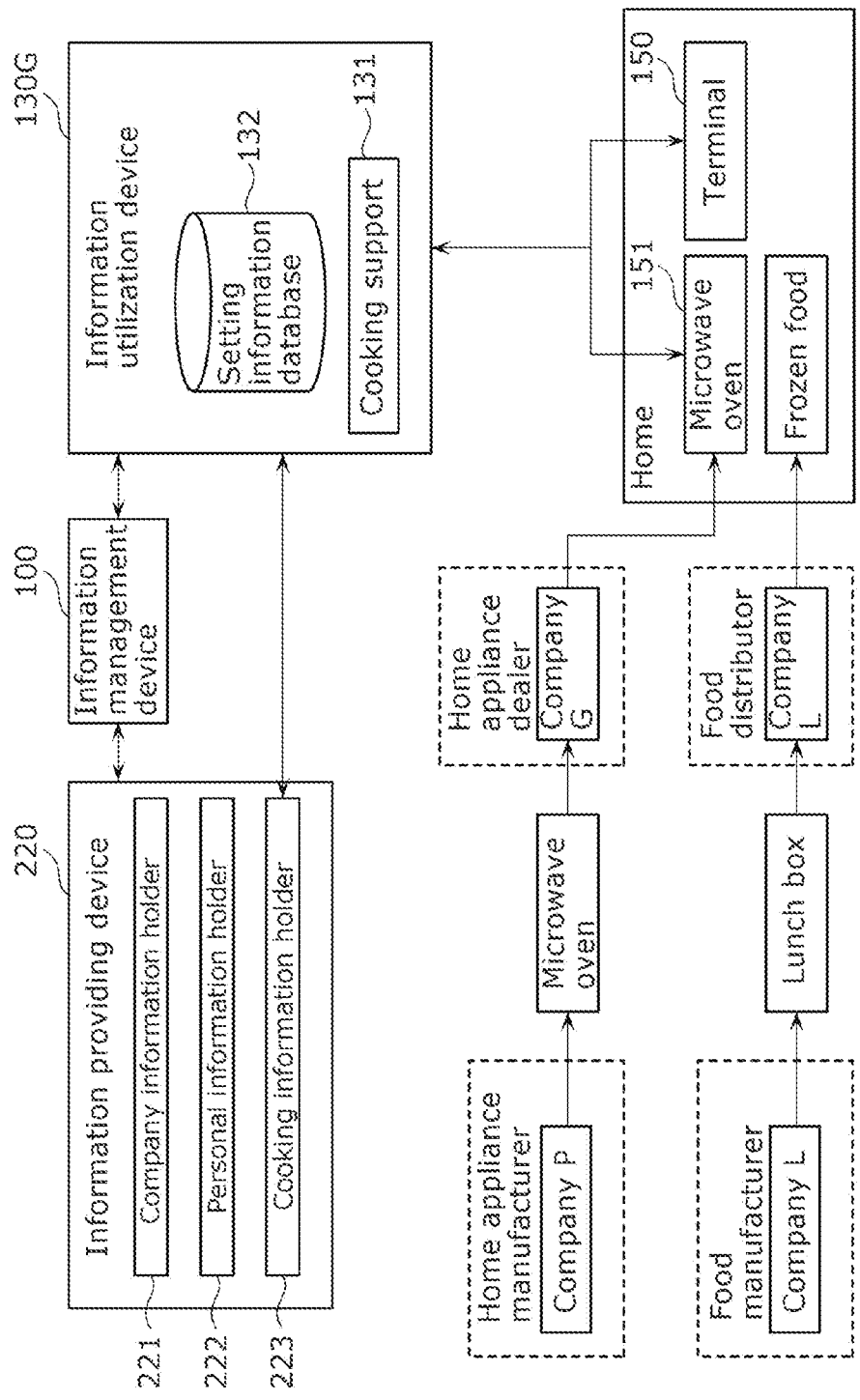
FIG. 39 shows a relationship between information management system 1G and purchase routes of a device at home and a product for use in the device.

FIG. 38 shows an example of information management system 1G according to Embodiment 10. FIG. 39 shows a relationship between information management system 1G and purchase routes of a device at home and a product for use in the device. Information management system 1G is a first example of Embodiment 10.

Described in the first example is a method of obtaining a cooking setting for a home appliance in coordination with a retailer that is the manufacturer, using the obtained purchase data. That is, in the method according to the first example, based on the obtained purchase data, a home appliance manufacturer directly obtains the cooking setting information from the retailer and holds the setting information.

In coordination with a retailer (e.g., a convenience store: company L) that is the seller, information management system 1G allows coordination of the cooking setting for the purchased product with a home appliance. Accordingly, the store causes the user to heat up the lunch box not at the store but in a home appliance at home or office, which reduces the operation costs and time per customer.

Information management system 1G differs from information management system 1E as follows. Information providing device 220 that provides purchase information is owned by the same company as information providing device 220 that provides cooking information. In addition, information utilization device 130G includes no purchase history database 133.

Information utilization device 130G obtains integrated information (e.g., product purchase information) from information management device 100. Information utilization device 130G inquiries about the cooking information at cooking information holder 223 of information providing device 220 in retailer company L, and holds setting information (i.e., the parameters such as watts and the irradiation time) on the obtained lunch box in setting information database 132.

As in Embodiment 9, microwave oven 151 or terminal 150 is push notified of the setting information. With this configuration, a user obtains the latest setting information as necessary using microwave oven 151 or terminal 150, selects a setting according to the information obtained via the GUI of microwave oven 151, or applies a setting according to the setting information obtained via the UI of terminal 150 to microwave oven 151 to appropriately cook the food such as the lunch box purchased at the convenience store.

Note that the setting information described above may be transmitted from a POS terminal of a store to terminal 150 of user U1 at the time of purchase, and transmitted via terminal 150 to another information device such as a server device.

Figure 40:
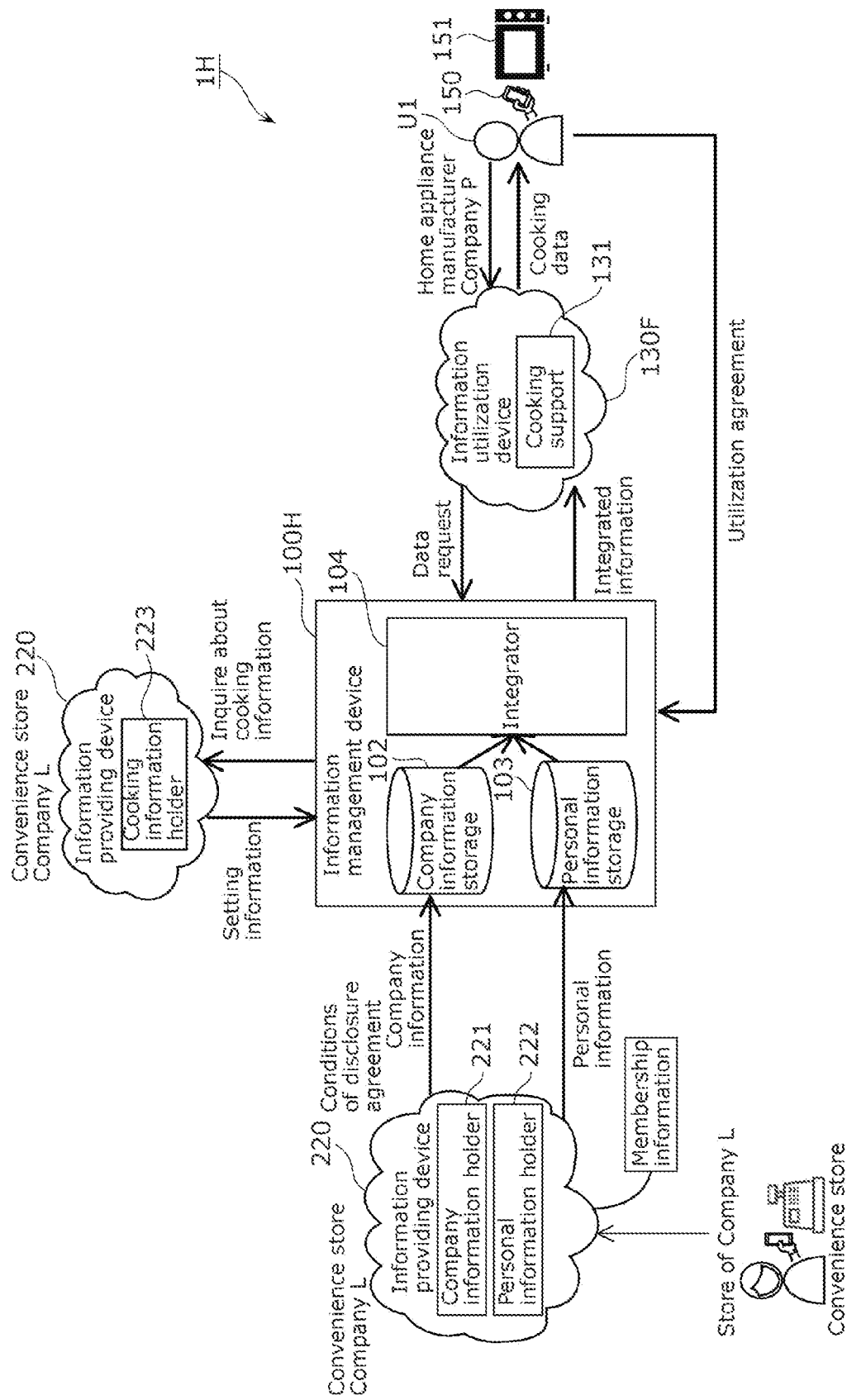
FIG. 40 shows an example of information management system 1H according to Embodiment 10.
Figure 41:
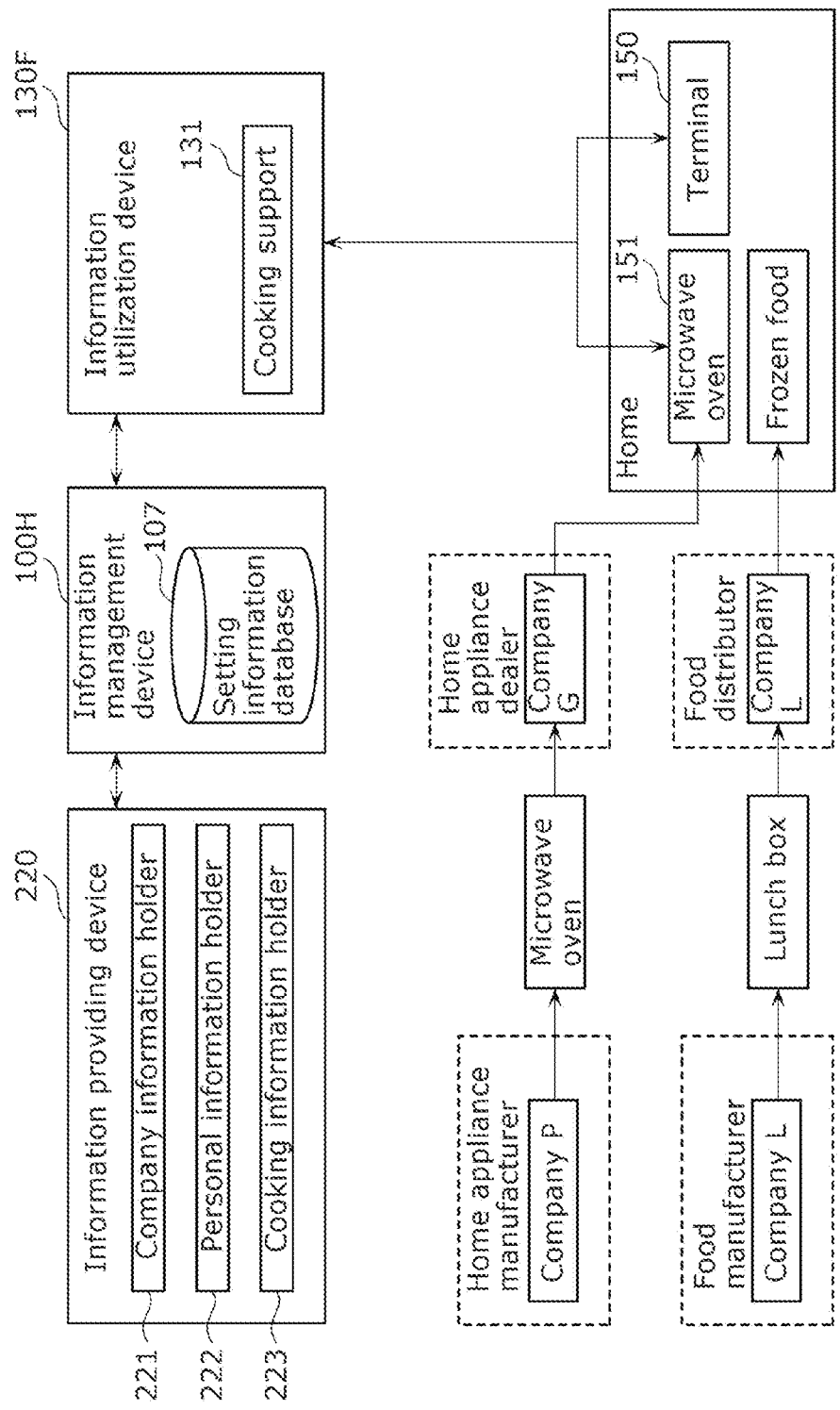
FIG. 41 shows a relationship between information management system 1H and purchase routes of a device at home and a product for use in the device.

FIG. 40 shows an example of information management system 1H according to Embodiment 10. FIG. 41 shows a relationship between information management system 1H and purchase routes of a device at home and a product for use in the device. Information management system 1H is a second example of Embodiment 10.

The second example differs from the first example as follows. In place of information utilization device 130G, information management device 100H includes setting information database 107.

Information management device 100H obtains setting information (i.e., the parameters such as watts and the irradiation time) necessary for the home appliance used for cooking from cooking information holder 223 of information providing device 220 of a convenience store that is the product provider, for example, and holds the obtained information in setting information database 107.

Microwave oven 151 or terminal 150 is push notified of the setting information through cooking support 131 of information utilization device 130F. Note that the setting information may be included together with the product purchase information in the integrated information obtained from information management device 100H.

As in the first example, in information management system 1G, information utilization device 130G exchanges information with information providing device 220 to obtain the cooking information. In the system, in place of information management device 100, information management device 100H may be used which includes setting information database 107 as in the second example. In this case, information management device 100H exchanges information with information providing device 220 via information utilization device 130G to obtain the cooking information.

Embodiment 11

Now, Embodiment 11 will be described.

Embodiment 11 is an example where a home appliance is a refrigerator, and a product is a food including a perishable product to be kept refrigerated or frozen.

For example, when storing a food such as a perishable product in a refrigerator, each user determines the storage setting for the refrigerator based on the expiration date and the date on which the food is to be cooked. The storage setting for the refrigerator includes various storage modes such as "refrigerating", "freezing", "storing at a controlled freezing point", "chilling", and "partially freezing". It is difficult for the user to select the storage setting suitable for the food. Accordingly, storing a food in a refrigerator is needed to maintain the freshness or flavor of the food.

Figure 42:
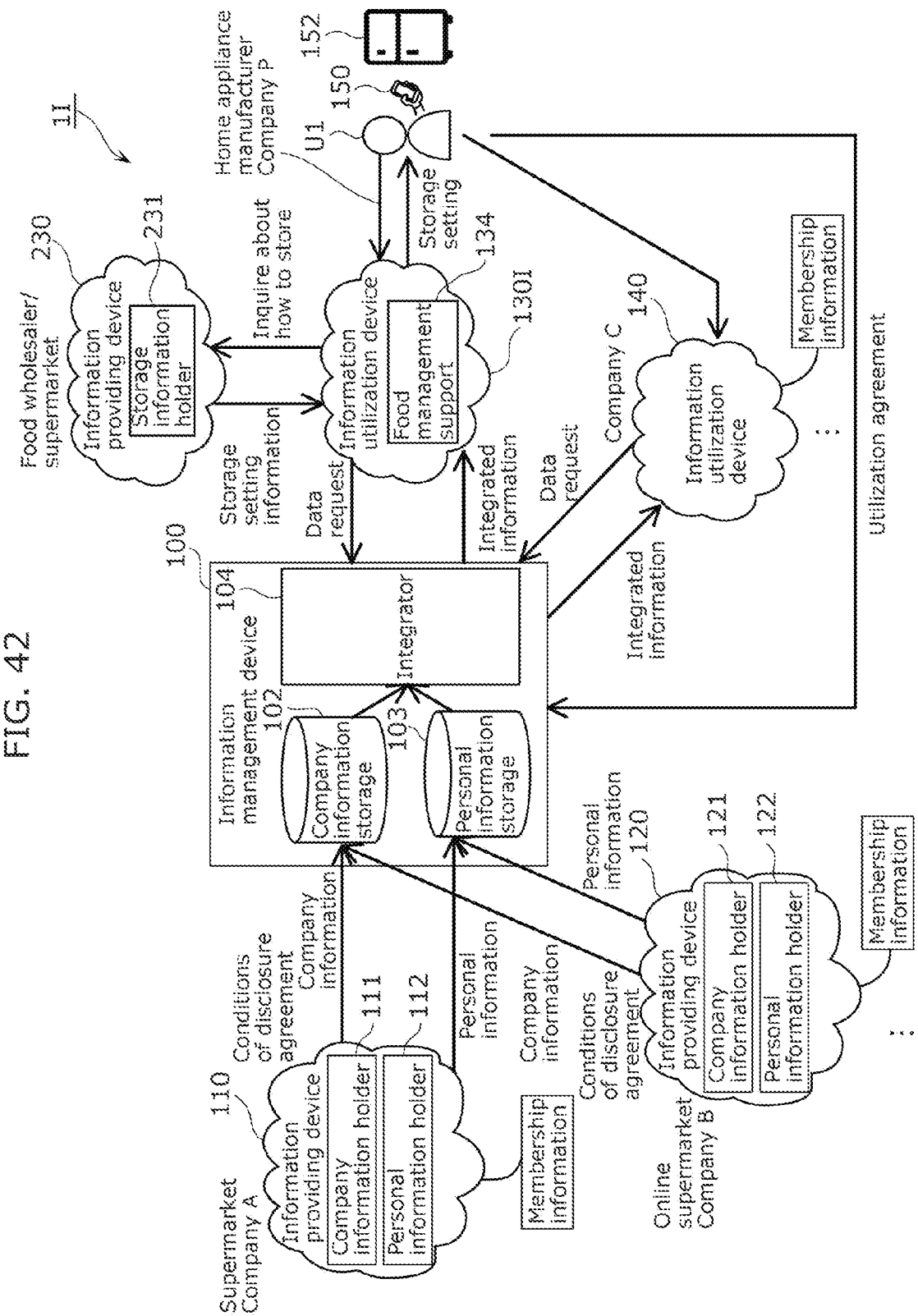
FIG. 42 shows an example of information management system 1I according to Embodiment 11.
Figure 43:
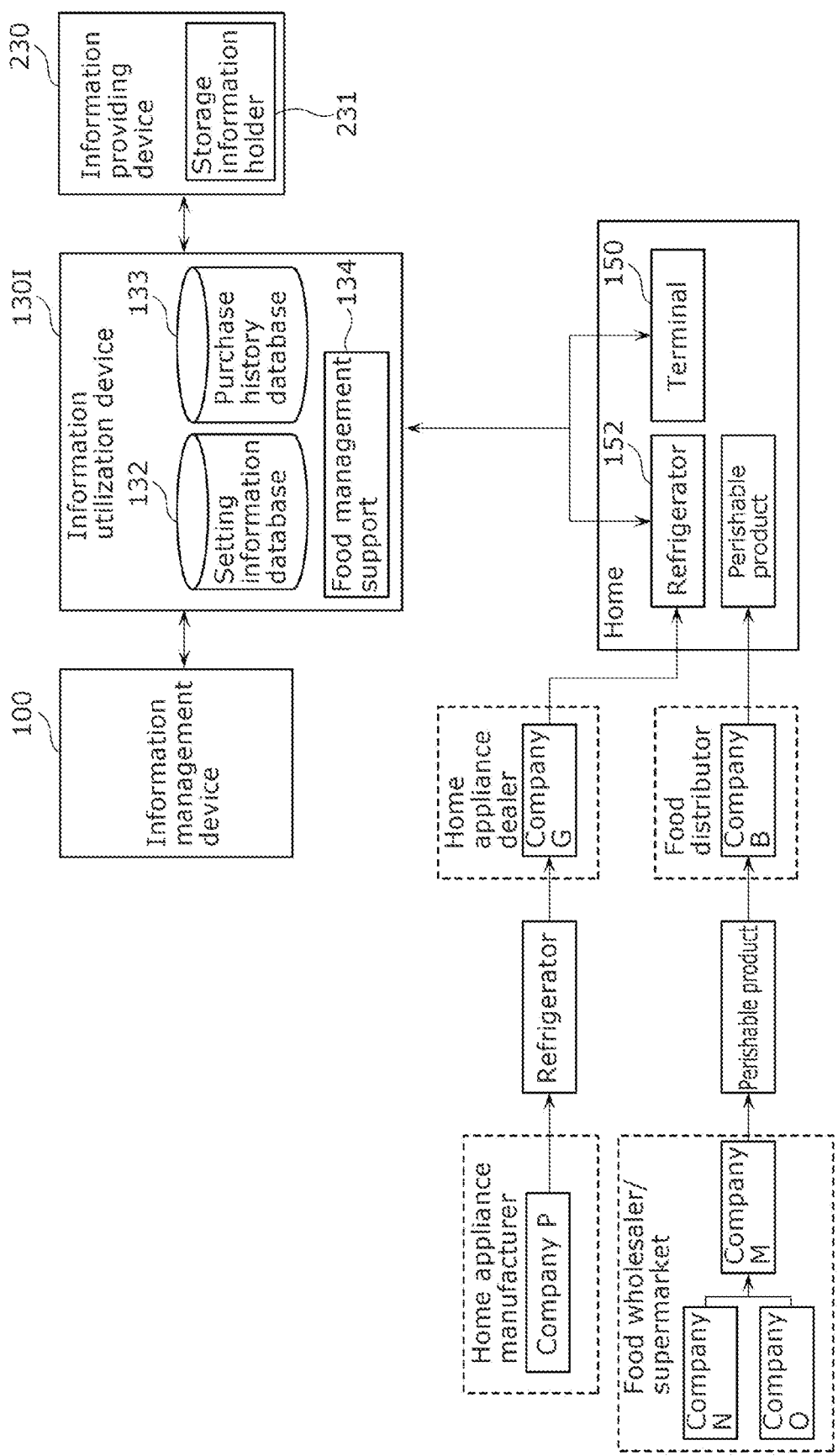
FIG. 43 shows a relationship between information management system 1I and purchase routes of a device at home and a product for use in the device.

FIG. 42 shows an example of information management system 1I according to Embodiment 11. FIG. 43 shows a relationship between information management system 1I and purchase routes of a device at home and a product for use in the device. Information management system 1I is a first example of Embodiment 11.

Described in the first example is a method of obtaining storage setting for a home appliance in coordination with a food wholesaler or a supermarket that is the manufacturer of the perishable product, using the obtained purchase data. In the method according to the first example, a home appliance manufacturer directly obtains information from the food wholesaler or the supermarket that is the manufacturer of the perishable product.

Information management system 1I differs from information management system 1E in the configuration of information utilization device 1301 and further includes information providing device 230 in place of information providing devices 200 and 210.

As shown in FIG. 43, information utilization device 1301 includes setting information database 132, purchase history database 133, and food management support 134. That is, unlike information utilization device 130E, information utilization device 1301 includes food management support 134 in place of cooking support 131 of information utilization device 130E. Setting information database 132 holds expiration date information on a certain perishable product and most suitable storage setting information on the quality retention. The storage setting information may be determined by the food wholesaler/supermarket or may be optimized at an individual home appliance in accordance with the cooking details according to a menu/recipe or the cooking date, or may be updated through the utilization by the user. That is, the storage setting information may be updated based on the tendency statistically obtained from the use history of the user. Purchase history database 133 holds, as the purchase history, the information on the frozen food obtained from information management device 100.

Setting information database 132 is linked with purchase history database 133. Once information on a fresh perishable product is added to purchase history database 133, for example, information utilization device 1301 obtains the storage setting information on the perishable product from storage information holder 231 of information providing device 230 of a food wholesaler/supermarket. Next, information utilization device 1301 updates setting information database 132 based on the obtained storage setting information. Food management support 134 of information utilization device 1301 push notifies refrigerator 152 or terminal 150 of the update of setting information database 132. With this configuration, a user obtains the latest setting information as necessary using refrigerator 152 or terminal 150, for example, and applies, to refrigerator 152, a setting according to the storage setting information obtained via the GUI of refrigerator 152 to appropriately store a perishable product.

Note that a storage setting may also be made for storing a cooked food in refrigerator 152.

In this manner, user U1 purchases a perishable product at a supermarket. Then, the purchase information indicating that user U1 has purchased the perishable product is transmitted, as the company information, together with the personal information on user U1 from information providing device 110 to information management device 100. Accordingly, company information storage 102 of information management device 100 stores the company information including the purchase information.

Information utilization device 1301 obtains, from information management device 100, the information on the fact that user U1 has purchased the perishable product at the supermarket. Accordingly, the purchase information on the perishable product is added to purchase history database 133. Setting information database 132 linked with purchase history database 133 accesses information providing device 230 to obtain storage setting information for appropriately cooking the perishable product whose information has been added. Here, the storage setting information includes a most suitable temperature for keeping the perishable product frozen or refrigerated in a refrigerator. Upon obtainment of the storage setting information, information utilization device 1301 may obtain the most suitable storage setting information on refrigerator 152 owned by user U1 from a storage device of information utilization device 1301 or an external storage device based on the storage setting information. In addition, information utilization device 1301 transmits the obtained setting information to terminal 150 of user U1 or refrigerator 152. As a result, user U1 easily stores the purchased perishable product in refrigerator 152 at a most suitable setting without checking the most suitable setting information for keeping the purchased perishable product frozen or refrigerated in refrigerator 152.

Figure 44:
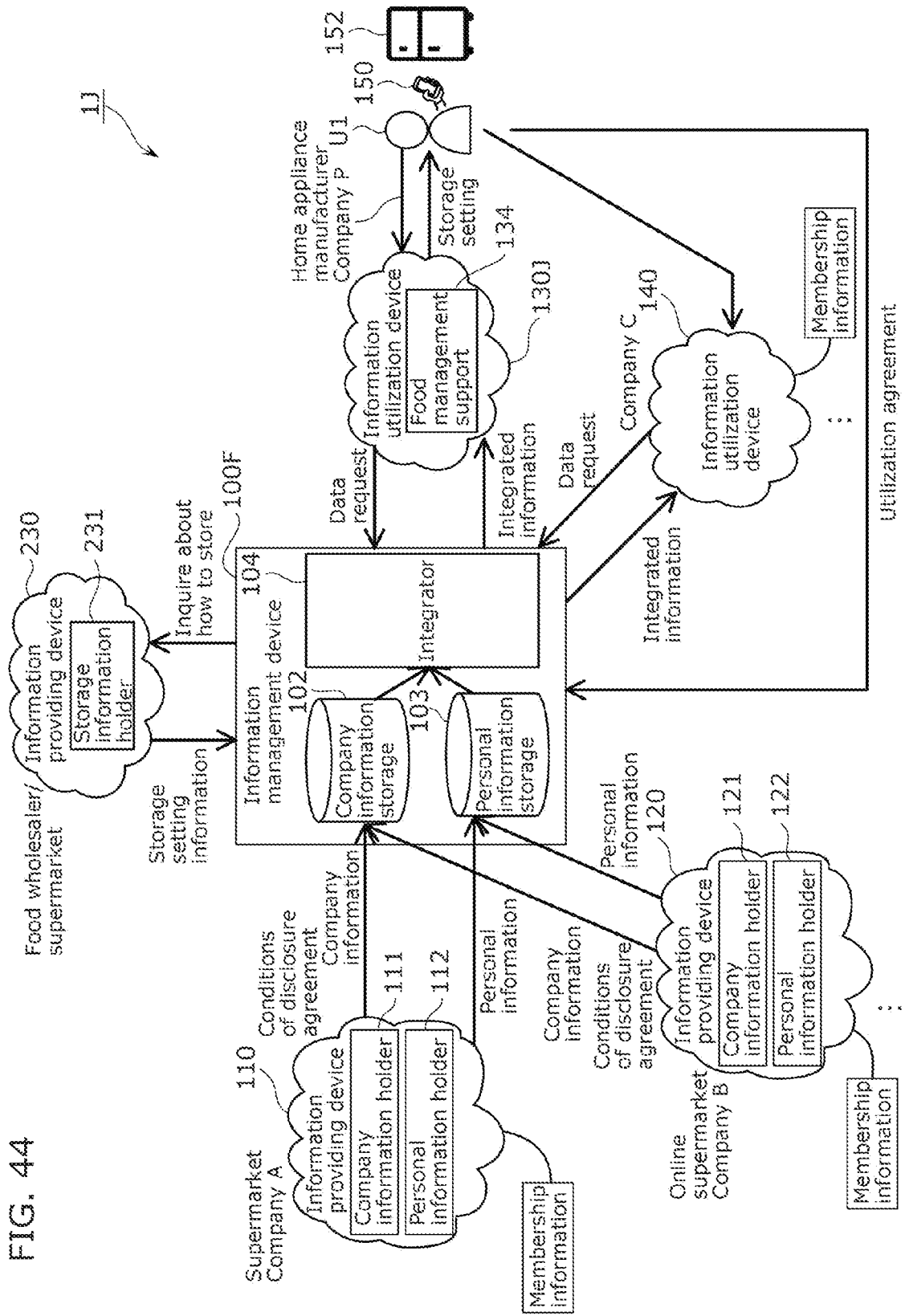
FIG. 44 shows an example of information management system 1J according to Embodiment 11.
Figure 45:
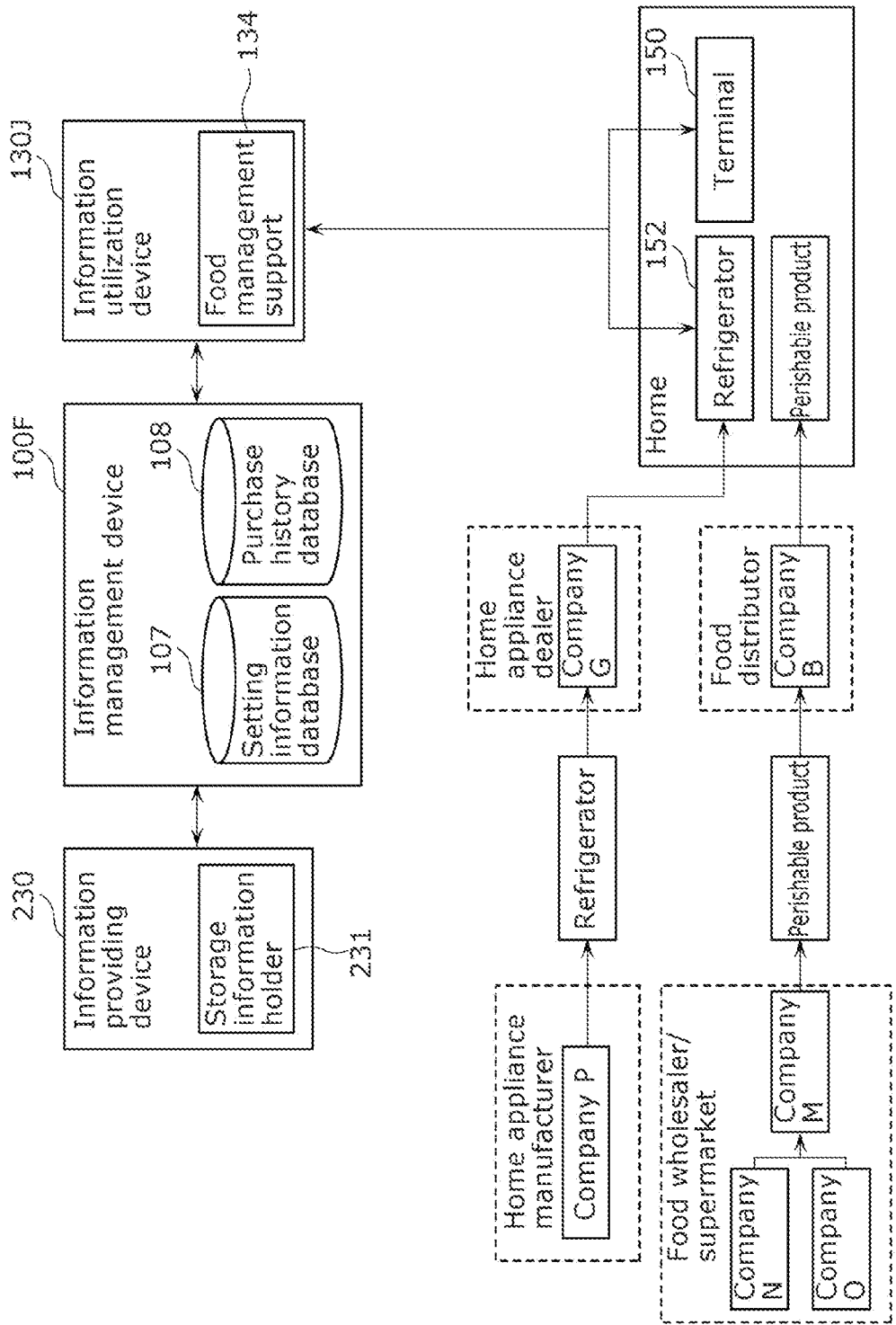
FIG. 45 shows a relationship between information management system 1J and purchase routes of a device at home and a product for use in the device.

FIG. 44 shows an example of information management system 1J according to Embodiment 11. FIG. 45 shows a relationship between information management system 1J and purchase routes of a device at home and a product for use in the device. Information management system 1J is a second example of Embodiment 11.

The second example differs from the first example as follows. In place of information utilization device 1301, information management device 100F includes setting information database 107 and purchase history database 108. Note that setting information database 107 and purchase history database 108 have the same functions as setting information database 132 and purchase history database 133 according to the first example, respectively. Accordingly, like information utilization device 130E in the first example, information management device 100F obtains the storage setting information from storage information holder 231 of information providing device 230.

Specifically, once user U1 purchases a perishable product at a supermarket, the purchase information indicating that user U1 has purchased the perishable product is transmitted, as the company information, together with the personal information on user U1 from information providing device 110 to information management device 100. Accordingly, company information storage 102 of information management device 100 stores the company information including the purchase information.

Accordingly, the purchase history of the perishable product is added to purchase history database 108. Setting information database 107 linked with purchase history database 108 accesses information providing device 200 to obtain storage setting information for appropriately storing the perishable product whose information has been added. Upon obtainment of the storage setting information, information management device 100F may obtain most suitable storage setting information on refrigerator 152 owned by user U1 from a storage device of information utilization device 130J or an external storage device based on the storage setting information. In addition, information management device 100F transmits the obtained setting information via food management support 134 of information utilization device 130J to terminal 150 of user U1 or refrigerator 152. As a result, user U1 easily stores the purchased perishable product in refrigerator 152 at a most suitable setting without checking most suitable storage setting information on the purchased perishable product.

Note that the storage setting information is not only obtained by a food manufacturer or a food wholesaler registered in information management device 100F but may be held in company information holder 111 of information providing device 110 of a supermarket.

As in the first example, in information management system 1I, information utilization device 130I exchanges information with information providing device 230 to obtain the storage setting information. In the system, in place of information management device 100, information management device 100F may be used which includes setting information database 107 and purchase history database 108 as in the second example. In this case, information management device 100F exchanges information with information providing device 230 via information utilization device 130I to obtain the storage setting information.

Examples has been described in Embodiments 9 and 10 where setting information is obtained from an information providing device of a company that manufactured or sold a processed food. The setting information is for setting a microwave oven at an output level and for a cooking time that are most suitable for heating up the processed food in the microwave oven. However, the home appliance for use is not necessarily a microwave oven but may be a refrigerator as described in Embodiment 12. In addition, the product to be cooked is not necessarily a processed food but may be a perishable product.

In this manner, the information management system may obtain the setting information from the information providing device of the company that manufactured or sold the first product based on the purchase information indicating that the user has purchased the product. The setting information indicates a most suitable setting for using the product in a home appliance of the user. The information management system may output the obtained setting information to the information processing device at the user so that the user easily sets the home appliance of the user based on the obtained setting information.

An information management system includes: an obtainer that obtains first company information and personal information from a first company, the first company information relating to a first product or service of the first company, the personal information relating to a user who has purchased the first product or who has been provided with the service; a company information storage that stores the first company information obtained; a personal information storage that stores the personal information obtained; and an integrator that integrates the first company information and the personal information, based on a purchase record or a use record to generate integrated information, the purchase record indicating that the user has purchased the first product, the use record indicating that the user has used the service. The first company information includes purchase information indicating that the user has purchased the first product. The obtainer further obtains setting information from a company that manufactured or sold the first product, the setting information indicating a most suitable setting when the first product according to the purchase information is used in a home appliance of the user. The manager outputs, to the information processing device at the user, the setting information obtained.

Embodiment 12

Now, Embodiment 12 will be described.

If a user wishes to purchase a product, there are options of: subscribing to the product at an online supermarket or on an EC site, for example; and purchasing the product at a physical store. The user does shopping through a plurality of purchase paths. Even when making a setting for subscribing to a product, most users may also purchase the product at a physical store or purchase another product in the same category due to various reasons such as a lack of the product. In this case, there is no method of automatically adjusting one purchase path in accordance with purchase at the other purchase path. For example, assume that the amount of subscription product A is most suitable for a user for a unit time period. In this case, while the user has made the contract for the subscription, the user may purchase product B of the same type as product A in a physical store. Subscription product A to be delivered next may be then excessive. Note that product B may be the same product as product A.

Figure 46:
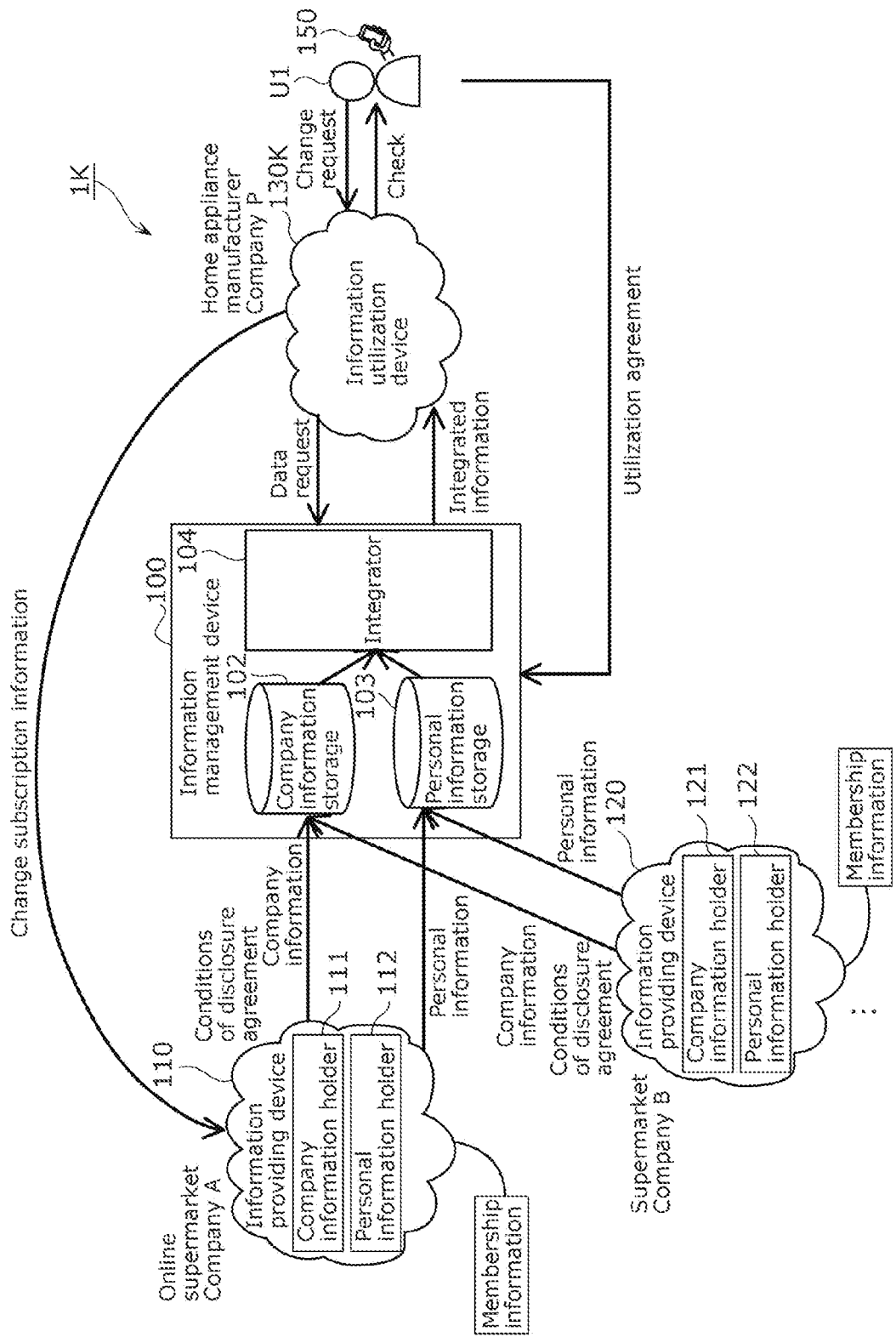
FIG. 46 shows an example of information management system 1K according to Embodiment 12.
Figure 47:
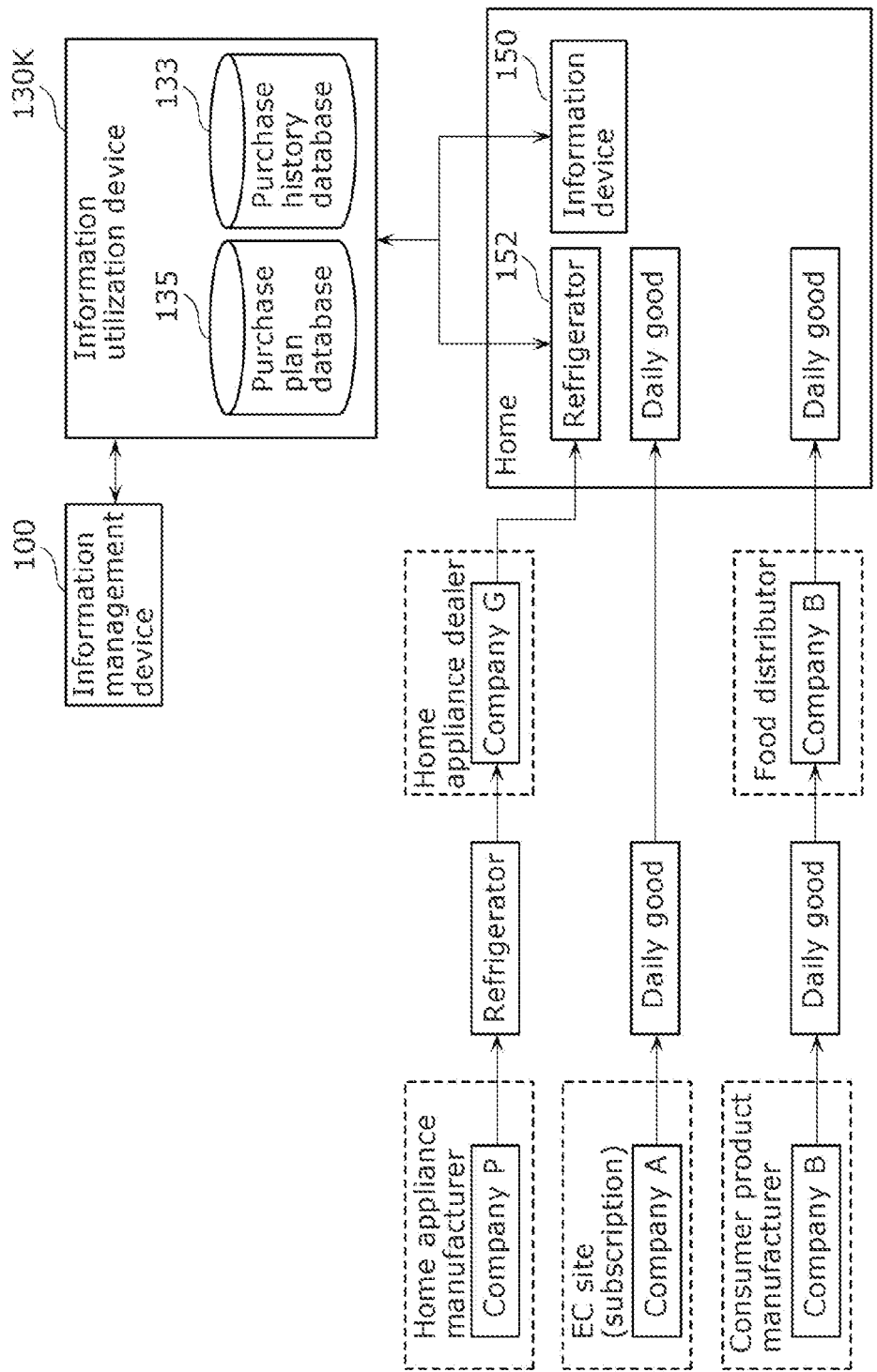
FIG. 47 shows a relationship between information management system 1K and purchase routes of a device at home and a product for use in the device.

FIG. 46 shows an example of information management system 1K according to Embodiment 12. FIG. 47 shows a relationship between information management system 1K and purchase routes of a device at home and a product for use in the device. Information management system 1K is a first example of Embodiment 12.

Described in the first example is a method of updating the details/interval of the subscription product based on the obtained purchase data even in a plurality of purchases. In the method according to the first example, a home appliance manufacturer directly updates the amount of the subscription product and the subscription interval in coordination with a supermarket that is the subscription provider based on the obtained purchase data.

Information management system 1K differs from information management system 1 in the configuration of information utilization device 130K. As shown in FIG. 47, information utilization device 130K includes purchase plan database 135 and purchase history database 133. Purchase plan database 135 holds the product information on future purchases such as subscription and a delivery schedule. Purchase history database 133 holds, as a purchase history, the information on the purchase records obtained from information management device 100.

Purchase plan database 135 is linked with purchase history database 133. Assume that a user has purchased, at a physical store, a product in the same category, that is, of the same type as the subscription product, for example. In this case, information utilization device 130K adds, to purchase history database 133, as the latest information, the purchase information indicating that the user has purchased the product at the physical store. Information utilization device 130K detects the update of the information on the product in the same category as in purchase plan database 135, and inquires terminal 150 of the user, for example, about whether to change the amount of the subscription product or the delivery schedule. If the user selects to change the amount or the delivery schedule using terminal 150, information utilization device 130K changes the amount of the product stored in purchase plan database 135, changes the product in purchase plan database 135 to a product in the same category in purchase history database 133, or changes the delivery schedule as designated by the user.

Note that refrigerator 152 or terminal 150 is push notified of the update. User U1 may change at least one of: the amount of the subscription product via the GUI of refrigerator 152, the product to another product of the same type, or the delivery schedule. The change(s) may be set not only via the GUI of refrigerator 152 but also via terminal 150 of user U1.

In this manner, once user U1 purchases product B of the same type as subscription product A at a supermarket, the purchase information indicating that user U1 has purchased product B is transmitted, as the company information, together with the personal information on user U1 from information providing device 120 to information management device 100. Accordingly, company information storage 102 of information management device 100 stores the company information including the purchase information.

Information utilization device 130K obtains, from information management device 100, the information on the fact that user U1 has purchased product B of the same type as product A at a supermarket.

Accordingly, the purchase information on the product B is added to purchase history database 133. Purchase plan database 135 linked with purchase history database 133 changes the amount of the product, changes the product in purchase plan database 135 to a product in the same category in purchase history database 133, or changes the delivery schedule as designated by the user. Accordingly, information utilization device 130K changes the subscription information managed in purchase plan database 135 and indicating that user U1 subscribes to product A at online supermarket company A. After that, information utilization device 130K outputs the changed subscription information to information providing device 110 of online supermarket company A.

Figure 48:
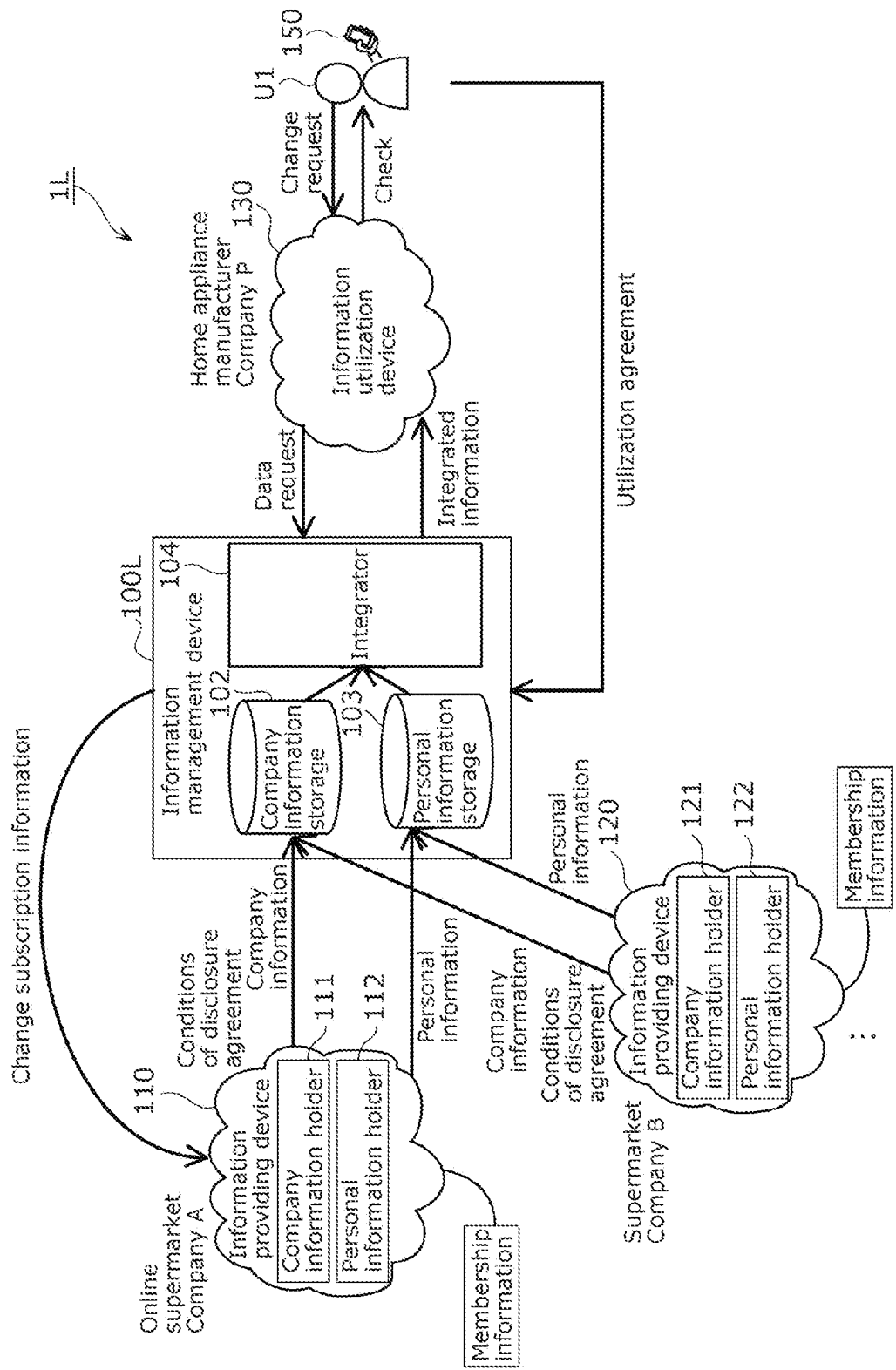
FIG. 48 shows an example of information management system 1L according to Embodiment 12.
Figure 49:
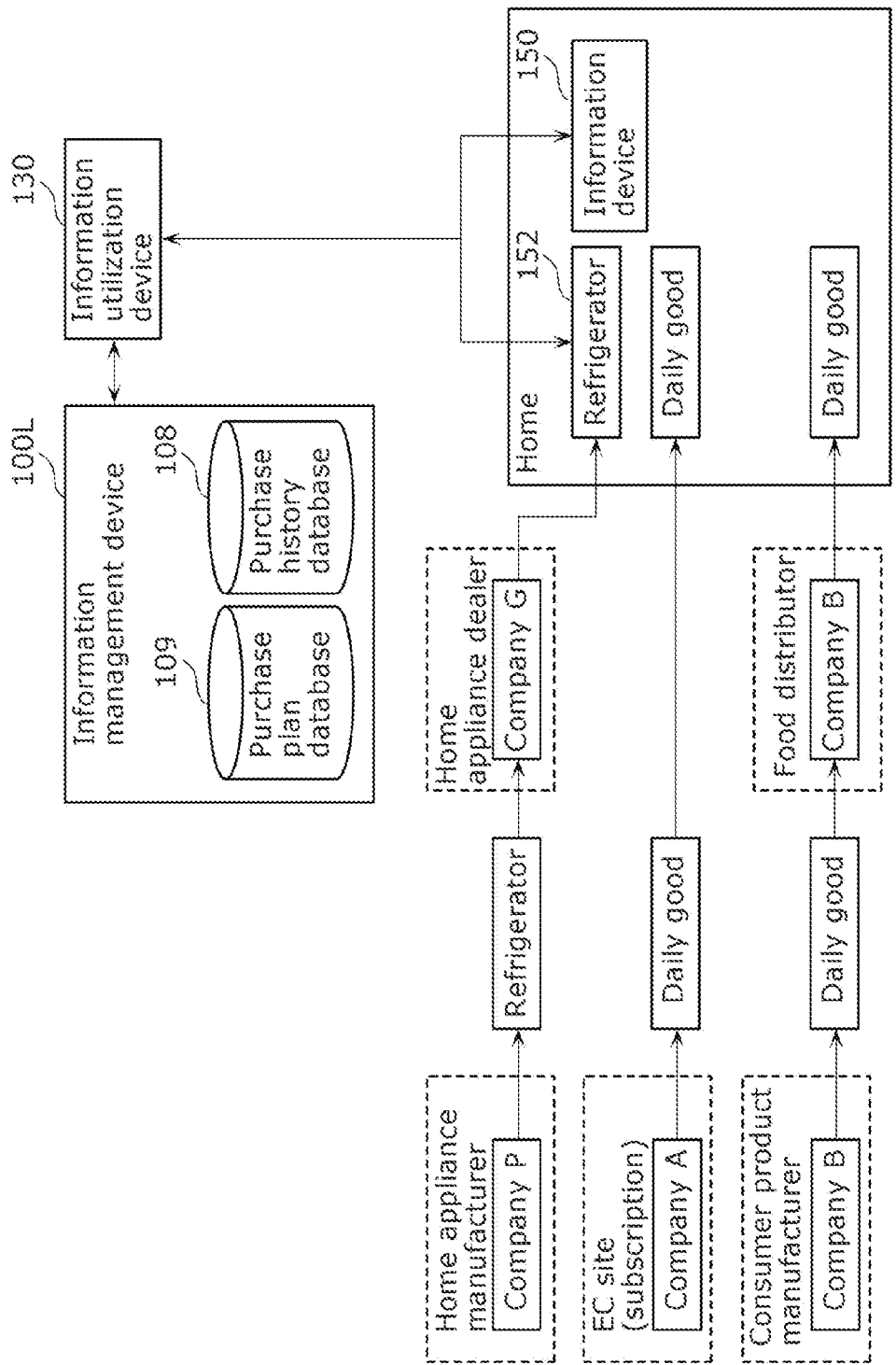
FIG. 49 shows a relationship between information management system 1L and purchase routes of a device at home and a product for use in the device.

FIG. 48 shows an example of information management system 1L according to Embodiment 12. FIG. 49 shows a relationship between information management system 1L and purchase routes of a device at home and a product for use in the device. Information management system 1L is a second example of Embodiment 12.

The second example differs from the first example as follows. In place of information utilization device 130K, information management device 100L includes purchase plan database 109 and purchase history database 108. Note that purchase plan database 109 and purchase history database 108 have the same functions as purchase plan database 135 and purchase history database 133 according to the first example, respectively. Accordingly, like information utilization device 130K according to the first example, information management device 100L changes the subscription information stored in purchase plan database 109 and outputs the changed subscription information to information providing device 110 of online supermarket company A.

Specifically, once user U1 purchases product B of the same type as subscription product A at a supermarket, the purchase information indicating that user U1 has purchased product B is transmitted, as the company information, together with the personal information on user U1 from information providing device 110 to information management device 100L. Accordingly, company information storage 102 of information management device 100L stores the company information including the purchase information.

The purchase history of product B is added to purchase history database 108. Purchase plan database 109 linked with purchase history database 108 changes the amount of the product, changes the product in purchase plan database 109 to a product in the same category in purchase history database 108, or changes the delivery schedule. Accordingly, information management device 100L changes the subscription information managed in purchase plan database 109 and indicating that user U1 subscribes to product A at online supermarket company A. After that, information management device 100L outputs the changed subscription information to information providing device 110 of online supermarket company A.

An information management system includes: an obtainer that obtains first company information and personal information from a first company, the first company information relating to a first product or service of the first company, the personal information relating to a user who has purchased the first product or who has been provided with the service; a company information storage that stores the first company information obtained; a personal information storage that stores the personal information obtained; an integrator that integrates the first company information and the personal information, based on a purchase record or a use record to generate integrated information, the purchase record indicating that the user has purchased the first product, the use record indicating that the user has used the service; and a manager. The first company information includes subscription information indicating that the user subscribes to the first product from the first company. The obtainer obtains purchase information indicating that the user has purchased a second product from a fourth company. If the first product and the second product are of a same type, the manager reduces an amount of the first product under subscription or increases an interval of the subscription to change the subscription information, and outputs, to the first company, the subscription information changed.

The information management method includes: obtaining, from a first company, first company information on a first product or service of the first company; storing, in a storage device, the first company information obtained; obtaining, from the first company, personal information on a user who has purchased the first product or who has been provided with the service; storing, in the storage device, the personal information obtained; and integrating the first company information and the personal information, based on a purchase record or a use record to generate integrated information, the purchase record indicating that the user has purchased the first product, the use record indicating that the user has used the service. The first company information includes subscription information indicating that the user subscribes to the first product from the first company. The obtaining including obtaining purchase information indicating that the user has purchased a second product from a fourth company. The information management method further includes: reducing an amount of the first product under subscription or increases an interval of the subscription to change the subscription information, and outputting, to the first company, the subscription information changed, if the first product and the second product are of a same type.

In the embodiments described above, the constituent elements may be dedicated hardware or may be implemented by executing software programs suitable for the constituent elements. The constituent elements may be implemented by a program executor such as a CPU or a processor reading and executing software programs recorded in a recoding medium such as a hard disk or a semiconductor memory. Here, the software implemented as an image decrypting device according to the embodiments may be the following program.

Specifically, this program causes a computer to execute an information management method including: obtaining, from a first company, first company information on a first product or service of the first company; storing, in a storage device, the first company information obtained; obtaining, from the first company, personal information on a user who has purchased the first product or who has been provided with the service; storing, in the storage device, the personal information obtained;

integrating the first company information and the personal information, based on a purchase record or a use record to generate integrated information, the purchase record indicating that the user has purchased the first product, the use record indicating that the user has used the service; and managing an output of the integrated information based on restriction information for restricting an output destination of the integrated information.

The embodiments have been described above as example techniques of the present disclosure. The accompanying drawings and detailed description thus have been provided.

Accordingly, the constituent elements included in the accompanying drawings and the detailed description may include not only those essential to achieve the objective, but also those not essential to achieve the objective but for illustrating the techniques. Thus, these non-essential constituent elements should not be immediately construed as being essential based on the fact that they are included in the accompanying drawings or detailed description.

The embodiments described above are illustrative examples of the present disclosure. Various modifications, substitutions, additions, and omissions can be thus made within the scope of the claims or a scope equivalent thereto.

INDUSTRIAL APPLICABILITY

The present disclosure is useful as a device management system and a device management method that allow efficient management of devices.

The invention claimed is:

1. An information management device comprising:
an obtainer that obtains first company information and personal information from a first company, the first company information relating to a first product or service of the first company, the personal information relating to a user who has purchased the first product or who has been provided with the service;
a company information storage that stores the first company information obtained;
a personal information storage that stores the personal information obtained;
an integrator that integrates the first company information and the personal information, based on a purchase record or a use record to generate integrated information, the purchase record indicating that the user has purchased the first product, the use record indicating that the user has used the service; and
a manager that manages an output of the integrated information based on restriction information for restricting an output destination of the integrated information.

2. The information management device according to claim 1, further comprising:
a determiner that determines whether the personal information includes information on a company attribute, wherein the manager outputs, based on the restriction information, the personal information determined to include the company attribute by the determiner.

3. The information management device according to claim 1, wherein
when outputting the integrated information, the manager further outputs identification information indicating that the integrated information includes the personal information.

4. The information management device according to claim 1, wherein
the obtainer further obtains, from the first company, an authorization code to be used for directly obtaining information including the first company information from the first company, and
the manager further outputs, to an information processing device of the user, the authorization code obtained.

5. The information management device according to claim 1, wherein
the obtainer further obtains, from a second company, record information on the purchase record or the use record, and
the integrator further integrates the record information obtained, with the first company information and the personal information, to generate the integrated information.

6. The information management device according to claim 1, wherein
the restriction information includes a flag indicating whether an output to a third company is permitted, and
when the flag indicates that the output to the third company is not permitted, the manager prohibits the output of the integrated information to the third company.

7. The information management device according to claim 1, wherein
the company information storage stores the first company information encrypted using a public key generated by the information processing device,
the personal information storage stores the personal information encrypted using the public key, and
the manager manages the output of the integrated information including the first company information encrypted and the personal information encrypted.

8. The information management device according to claim 1, wherein
the first company information includes purchase information indicating that the user has purchased the first product,
the obtainer further obtains setting information from a company that manufactured or sold the first product, the setting information indicating a most suitable setting when the first product according to the purchase information is used in a home appliance of the user, and
the manager outputs, to the information processing device, the setting information obtained.

9. The information management device according to claim 8, wherein
the first product includes a processed food which is heated up to be finished,
the home appliance is a microwave oven, and
the setting information includes an output level and a cooking time that are most suitable for heating up the processed food in the microwave oven.

10. The information management device according to claim 8, wherein
- the first product includes a perishable product,
- the home appliance is a refrigerator, and
- the setting information includes a temperature most suitable for keeping the perishable product frozen or refrigerated in the refrigerator.

11. The information management device according to claim 1, wherein
- the first company information includes subscription information indicating that the user subscribes to the first product from the first company,
- the obtainer obtains purchase information indicating that the user has purchased a second product from a fourth company, and
- if the first product and the second product are of a same type, the manager reduces an amount of the first product under subscription or increases an interval of the subscription to change the subscription information, and outputs, to the first company, the subscription information changed.

12. An information management method comprising:
- obtaining, from a first company, first company information on a first product or service of the first company;
- storing, in a storage device, the first company information obtained;
- obtaining, from the first company, personal information on a user who has purchased the first product or who has been provided with the service;
- storing, in the storage device, the personal information obtained;
- integrating the first company information and the personal information, based on a purchase record or a use record to generate integrated information, the purchase record indicating that the user has purchased the first product, the use record indicating that the user has used the service; and
- managing an output of the integrated information based on restriction information for restricting an output destination of the integrated information.

* * * * *